United States Patent
Gröger et al.

(10) Patent No.: US 12,522,686 B2
(45) Date of Patent: Jan. 13, 2026

(54) METHOD FOR PRODUCING HYDROXY-FATTY-ACID-BASED POLYOLS

(71) Applicants: U. Windmöller Innovation GmbH & Co. KG, Holte-Stukenbrock (DE); Universität Bielefeld, Bielefeld (DE)

(72) Inventors: Harald Gröger, Bielefeld (DE); Jana Löwe, Detmold (DE); Guido Horst, Kirchlengern (DE); Thomas Hohberg, Bielefeld (DE)

(73) Assignees: U. WINDMÖLLER INNOVATION GMBH & CO. KG, Schloss Holte-Stukenbrock (DE); UNIVERSITÄT BIELEFELD, Bielefeld (DE)

( * ) Notice: Subject to any disclaimer, the term of this patent is extended or adjusted under 35 U.S.C. 154(b) by 509 days.

(21) Appl. No.: 17/924,338

(22) PCT Filed: May 11, 2021

(86) PCT No.: PCT/EP2021/062405
§ 371 (c)(1),
(2) Date: Nov. 9, 2022

(87) PCT Pub. No.: WO2021/228804
PCT Pub. Date: Nov. 18, 2021

(65) Prior Publication Data
US 2023/0312805 A1 Oct. 5, 2023

(30) Foreign Application Priority Data
May 12, 2020 (EP) .................................... 20174135

(51) Int. Cl.
*C12P 7/64* (2022.01)
*C08G 18/36* (2006.01)
*C08G 18/72* (2006.01)
*C08G 18/73* (2006.01)
*C08G 18/75* (2006.01)
*C12N 9/20* (2006.01)
*C12N 9/88* (2006.01)
*C12P 7/6427* (2022.01)
*C12P 7/6431* (2022.01)
*C12P 7/6436* (2022.01)
*C12P 7/6472* (2022.01)

(52) U.S. Cl.
CPC .......... *C08G 18/36* (2013.01); *C08G 18/722* (2013.01); *C08G 18/73* (2013.01); *C08G 18/755* (2013.01); *C12N 9/20* (2013.01); *C12N 9/88* (2013.01); *C12P 7/6427* (2013.01); *C12P 7/6431* (2022.01); *C12P 7/6436* (2013.01); *C12P 7/6472* (2013.01); *C12Y 301/01003* (2013.01); *C12Y 402/01053* (2013.01)

(58) Field of Classification Search
CPC ..... C12P 7/6472; C12P 7/6436; C12P 7/6427; C12P 7/6431; C12N 9/20; C12N 9/88
See application file for complete search history.

(56) References Cited

U.S. PATENT DOCUMENTS

| 2009/0054610 A1* | 2/2009 | Gross | C12P 7/6436 554/223 |
| 2011/0275717 A1* | 11/2011 | Virno | A61K 9/0014 514/567 |
| 2013/0131222 A1* | 5/2013 | Gross | C08G 18/36 528/80 |
| 2014/0051780 A1* | 2/2014 | Gross | C08G 63/06 521/182 |
| 2018/0073046 A1* | 3/2018 | Boeriu | C12N 9/20 |

FOREIGN PATENT DOCUMENTS

| KR | 101492206 B1 | 2/2015 |
| WO | 2011112923 A2 | 9/2011 |
| WO | 2016151115 A1 | 9/2016 |

OTHER PUBLICATIONS

"Structure-Based Mechanism of Oleate Hydratase from Elizabethkingia meningoseptica" to Engleder et al. ChembioChem 2015, 16, 1730-1734.*
Enzyme-Catalyzed Synthesis of Unsaturated Aliphatic Polyesters Based on Green Monomers from Renewable Resources. Biomolecules 2013, 3, 461-480.*
International Search Report and Written Opinion issued Aug. 10, 2021 in PCT/EP2021/062405 (English translation of ISR only).
Woo-Ri Kang, et al., "Gene Cloning of an Efficiency Oleate Hydratase from Stenotrophomonas nitritireducens for Polyunsaturated Fatty Acids and its Application in the Conversion of Plant Oils to 10-Hydroxy Fatty Acids," Biotechnology and Bioengineering, vol. 114. No. 1, pp. 74-82 (2017).
(Continued)

*Primary Examiner* — Michael L Leonard
(74) *Attorney, Agent, or Firm* — Panitch Schwarze Belisario & Nadel LLP

(57) ABSTRACT

A method for producing a hydroxy fatty acid condensate or a mixture of hydroxy fatty acid condensates is provided. The method involves the steps of providing one or more fatty acids having at least one C=C double bond functionality, biotechnologically adding $H_2O$ to at least one C=C double bond functionality of the one or more fatty acids and thus obtaining one or more hydroxy fatty acids, and reacting the one or more hydroxy fatty acids with one or more at least divalent linker groups, thus obtaining a hydroxy fatty acid condensate or a mixture of hydroxy fatty acid condensates. Also provided are a hydroxy fatty acid condensate or a mixture of hydroxy fatty acid condensates obtained by the method, as well as polyurethane, obtained by reacting such a hydroxy fatty acid condensate or mixture of hydroxy fatty acid condensates.

19 Claims, No Drawings
Specification includes a Sequence Listing.

(56) References Cited

OTHER PUBLICATIONS

Ji-Young Park, et al., "Production of 13S-hydroxy-9(Z)-octadecenoic acid from linoleic acid by whole recombinant cells expressing linoleate 13-hydratase from Lactobacillus acidophilus," Journal of Biotechnology, 208, pp. 1-10 (2015).

Office Action issued Jan. 18, 2024 in EP Application No. 21723760.1, with partial English translation.

Löwe et al., "Fatty Acid Hydratases: Versatile Catalysts to Access Hydroxy Fatty Acids in Efficient Syntheses of Industrial Interest," Catalysts, vol. 10, No. 287, pp. 1-12 (2020).

\* cited by examiner

METHOD FOR PRODUCING HYDROXY-FATTY-ACID-BASED POLYOLS

CROSS-REFERENCE TO RELATED APPLICATIONS

This application is a Section 371 of International Application No. PCT/EP2021/062405, filed May 11, 2021, which was published in the German language on Nov. 18, 2021 under International Publication No. WO 2021/228804 A1, which claims priority under 35 U.S.C. § 119(b) to European Application No. 20174135.2, filed May 12, 2020, the disclosures of which are incorporated herein by reference in their entireties.

REFERENCE TO SEQUENCE LISTING SUBMITTED ELECTRONICALLY

This application contains a sequence listing, which is submitted electronically via EFS-Web as an ASCII formatted sequence listing with a file name "Amended_209282_39US_Sequence_Listing", creation date of Nov. 14, 2022, and having a size of 8,916 bytes. The sequence listing submitted via EFS-Web is part of the specification and is herein incorporated by reference in its entirety.

The present invention relates to a method for producing a hydroxy fatty acid condensate or a mixture of hydroxy fatty acid condensates, a hydroxy fatty acid condensate or a mixture of hydroxy fatty acid condensates obtainable by said method, and polyurethane which is obtainable by reacting such a hydroxy fatty acid condensate or mixture of hydroxy fatty acid condensates.

BACKGROUND OF THE INVENTION

Conventional polymers are often based on petrochemical raw materials. Although petrochemical raw materials are only available in finite quantities, bio-based raw materials have not yet been able to establish themselves as substitutes in many areas, especially in the field of polymers, in particular polyurethanes.

Despite the numerous positive properties of bio-based raw materials, there are still many concerns regarding the consistent quality of the products obtained from them. On the other hand, there is an increasing desire to be able to produce products for daily use independently of petrochemical raw materials, even if in many areas the production of bio-based products is still associated with higher costs. The present invention is directed to the provision of bio-based polyols (hereinafter also referred to as hydroxy fatty acid condensates) in particular for the production of polyurethanes.

SUMMARY OF THE INVENTION

The present invention relates to a method for producing a hydroxy fatty acid condensate or a mixture of hydroxy fatty acid condensates, the method comprising the steps of:
providing one or more fatty acids having at least one C═C double bond functionality,
biotechnologically adding H₂O to at least one C═C double bond functionality of the one or more fatty acids and thus obtaining one or more hydroxy fatty acids,
reacting the one or more hydroxy fatty acids with one or more at least divalent linker groups and thus obtaining a hydroxy fatty acid condensate or a mixture of hydroxy fatty acid condensates.

The present invention also relates to a hydroxy fatty acid condensate or a mixture of hydroxy fatty acid condensates obtainable by means of the method according to the present invention.

Moreover, the present invention relates to a polyurethane obtainable by reacting a composition comprising the hydroxy fatty acid condensate or the mixture of hydroxy fatty acid condensates with a diisocyanate, triisocyanate, tetraisocyanate or other polyisocyanates commonly used in the preparation of polyurethanes.

Definitions

The term "fatty acid", as used herein, preferably refers to aliphatic, linear, branched or cyclic (preferably linear) alkanoic acids with 6 to 40 carbon atoms, preferably 10 to 30, more preferably 12 to 24 carbon atoms, wherein in addition to the acid group, the alkanoic acids optionally comprise one or more additional functional groups selected from double bonds, hydroxy, carboxy and carbonyl. Preferably, the term "fatty acid" refers to aliphatic, linear monoalkanoic acids with 6 to 40 carbon atoms, preferably 10 to 30, more preferably 12 to 24 carbon atoms, wherein in addition to the acid group, the alkanoic acid optionally comprises one, two, three, or four double bonds and/or one or two hydroxy groups (e.g. in the case of a fatty acid having at least one C═C double bond and/or a hydroxy fatty acid).

The term "fatty acid having at least one C═C double bond" as used herein preferably refers to aliphatic, linear, branched or cyclic alkanoic acids with 6 to 40 carbon atoms, preferably 10 to 30, more preferably 12 to 24 carbon atoms, wherein in addition to the acid group and the at least one C═C double bond, the alkanoic acids optionally comprise one or more additional functional groups, selected from hydroxy, carboxy and carbonyl. Preferably, the term "fatty acid having at least one C═C double bond" refers to aliphatic, linear monoalkanoic acid with 6 to 40 carbon atoms, preferably 10 to 30, more preferably 12 to 24 carbon atoms, wherein in addition to the acid group, the alkanoic acid comprises one, two, three or four C═C double bonds (preferably one or two, more preferably one) and optionally one or two hydroxy groups. More preferably, the term "fatty acid having at least one C═C double bond" refers to aliphatic, linear monoalkanoic acid with 6 to 40 carbon atoms, preferably 10 to 30, more preferably 12 to 24 carbon atoms, wherein in addition to the acid group, the alkanoic acid comprises one or two C═C double bonds (preferably one).

The term "hydroxy fatty acid" as used herein preferably refers to aliphatic, linear, branched or cyclic alkanoic acids with 6 to 40 carbon atoms, preferably 10 to 30, more preferably 12 to 24 carbon atoms, wherein in addition to the acid group and the at least one hydroxy group, the alkanoic acids optionally comprises one or more additional functional groups selected from C═C double bond, hydroxy, carboxy and carbonyl. Preferably, the term "hydroxy fatty acid" refers to aliphatic, linear monoalkanoic acid with 6 to 40 carbon atoms, preferably 10 to 30, more preferably 12 to 24 carbon atoms, wherein in addition to the acid group, the alkanoic acid comprises one or two hydroxy groups (preferably one) and optionally one or two C═C double bonds. More preferably, the term "hydroxy fatty acid" refers to aliphatic, linear monoalkanoic acid with 6 to 40 carbon atoms, preferably 10 to 30, more preferably 12 to 24 carbon atoms, wherein in addition to the acid group, the alkanoic acid comprises one or two hydroxy groups (preferably one).

Unless otherwise indicated, the term "alkanoic acid" preferably refers to aliphatic and linear, branched or cyclic (preferably aliphatic linear) alkanoic acids with 6 to 40 carbon atoms, which, apart from the one carboxylic acid group (and optional hydroxy and/or C═C double bonds) only contains C—C single bonds and C—H bonds.

Unless otherwise indicated, the term "hydroxy fatty acid condensate" refers to any compounds that can be obtained by reacting one or more hydroxy fatty acids with one or more at least divalent linker groups. Preferably, these are compounds in which one or more hydroxy fatty acids have been reacted with one or more polyols and/or (poly)amino (poly)alcohols, thus forming esters and/or amides. Particularly preferably, the term "hydroxy fatty acid condensate" refers to "hydroxy fatty acid ester".

The term "(poly)amino(poly)alcohol" refers to compounds, preferably aliphatic compounds, comprising at least one amino group and at least one alcohol group. The amino groups can be primary, secondary or tertiary, but are preferably primary. The term "(poly)amino(poly)alcohol" preferably refers to compounds, preferably aliphatic compounds, comprising one, two, or three amino groups and one, two, or three alcohol groups.

The term "polyamine" refers to compounds, preferably aliphatic compounds, which comprise at least two amino groups, preferably at least two primary or secondary amino groups.

The term "polyol" refers to compounds, preferably aliphatic compounds, which comprise at least two alcohol groups, preferably at least two primary or secondary alcohol groups, more preferably at least two primary alcohol groups.

Unless otherwise stated, the term "double bond" refers to a C═C double bond.

Expressions containing "one or more", or grammatical variations thereof, with subsequent nouns in the plural form indicate, on the one hand, the possibility that only one item of the unit designated by the noun is present, but on the other hand also the possibility that two or more items of the unit designated by the noun are present. The use of the plural noun in such a context is therefore not to be interpreted in such a way as to preclude the existence of only one item of the unit designated by the noun.

DETAILED DESCRIPTION OF THE INVENTION

The Method for Producing a Hydroxy Fatty Acid Condensate or a Mixture of Hydroxy Fatty Acid Condensates The present invention relates to a method for producing a hydroxy fatty acid condensate or a mixture of hydroxy fatty acid condensates, the method comprising the steps of:
  providing one or more fatty acids having at least one C═C double bond functionality,
  biotechnologically adding H$_2$O to at least one C═C double bond functionality of the one or more fatty acids and thus obtaining one or more hydroxy fatty acids,
  reacting the one or more hydroxy fatty acids with one or more at least divalent linker groups and thus obtaining a hydroxy fatty acid condensate or a mixture of hydroxy fatty acid condensates.

The One or More Fatty Acids Having at Least One C═C Double Bond Functionality

The one of more fatty acids having at least one C═C double bond functionality are preferably selected from the group consisting of aliphatic C$_{6-40}$ carboxylic acids having one, two or three C═C double bond functionalities, wherein the C$_{6-40}$ carboxylic acids are preferably C$_{10-30}$, more preferably C$_{12-24}$ carboxylic acids.

It is to be understood that the carboxylic acid group (—COOH) in fatty acids is preferably a terminal carboxylic acid group. It is preferred that the carbon atom closest to the carboxylic acid group comprises two hydrogens as substituents.

It is preferred that the "fatty acid having at least one C═C double bond functionality" is a mono- or double-unsaturated alkanoic acid. Preferably, the single or one of the two double bonds is in cis position. If a second double bond is present, it can be either in cis or in trans position, preferably in cis position. This also applies to any optionally present third and fourth double bonds. It is particularly preferred that all C═C double bonds are in cis position.

It is preferred that the "fatty acid having at least one C═C double bond functionality" is a fatty acid with a C═C double bond functionality. As a result, a polyurethane produced from it preferably no longer contains a C═C double bond functionality and is thus more stable against oxidation and/or decomposition by atmospheric oxygen and electromagnetic radiation such as UV light. From the point of view of a lower melting point and thus improved processability, however, it may also be preferred that the "fatty acid having at least one C═C double bond functionality" is a fatty acid with two or three C═C double bond functionalities. In this case, a polyurethane prepared from it may still contain one or two C═C double bond functionalities, whereby a lower melting point of the hydroxy fatty acids and the resulting starting products obtained by reaction with linker molecules for e.g. polyurethanes can be achieved.

It is preferred that the "fatty acid having at least one C═C double bond functionality" is an aliphatic linear fatty acid (n-alkenoic acid).

It is further preferred that in the presence of two or more double bonds, the double bonds are not conjugated. Usually, two double bonds are therefore separated from each other by one or more sp$^3$-hybridized carbons (such as e.g. a —CH$_2$ group).

Preferred examples of fatty acids having a C═C double bond (also called monounsaturated fatty acids) include in particular 3-hexenoic acid, 4-hexenoic acid, 5-hexenoic acid, 3-heptenoic acid, 4-heptenoic acid, 5-heptenoic acid, 6-heptenoic acid, 3-octenoic acid, 4-octenoic acid, 5-octenoic acid, 6-octenoic acid, 7-octenoic acid, 3-nonenoic acid, 4-nonenoic acid, 5-nonenoic acid, 6-nonenoic acid, 7-nonenoic acid, 8-nonenoic acid, 3-decenoic acid, 4-decenoic acid, 5-decenoic acid, 6-decenoic acid, 7-decenoic acid, 8-decenoic acid, 9-decenoic acid, 3-undecenoic acid, 4-undecenoic acid, 5-undecenoic acid, 6-undecenoic acid, 7-undecenoic acid, 8-undecenoic acid, 9-undecenoic acid, 10-undecenoic acid, 3-dodecenoic acid, 4-dodecenoic acid, 5-dodecenoic acid, 6-dodecenoic acid, 7-dodecenoic acid, 8-dodecenoic acid, 9-dodecenoic acid, 10-dodecenoic acid, 11-dodecenoic acid, 3-tridecenoic acid, 4-tridecenoic acid, 5-tridecenoic acid, 6-tridecenoic acid, 7-tridecenoic acid, 8-tridecenoic acid, 9-tridecenoic acid, 10-tridecenoic acid, 11-tridecenoic acid, 12-tridecenoic acid, 3-tetradecenoic acid, 4-tetradecenoic acid, 5-tetradecenoic acid, 6-tetradecenoic acid, 7-tetradecenoic acid, 8-tetradecenoic acid, 9-tetradecenoic acid, 10-tetradecenoic acid, 11-tetradecenoic acid, 12-tetradecenoic acid, 13-tetradecenoic acid, 3-pentadecenoic acid, 4-pentadecenoic acid, 5-pentadecenoic acid, 6-pentadecenoic acid, 7-pentadecenoic acid, 8-pentadeecenoic acid, 9-pentadecenoic acid, 10-pentadecenoic acid, 11-pentadecenoic acid, 12-pentadeecenoic acid, 13-pentadecenoic acid, 14-pentadecenoic acid, 3-hexadecenoic acid, 4-hexadecenoic acid, 5-hexadecenoic acid, 6-hexadecenoic acid, 7-hexadecenoic acid, 8-hexadecenoic acid, 9-hexadecenoic acid, 10-hexadecenoic acid, 11-hexadecenoic acid, 12-hexadecenoic acid, 13-hexadecenoic acid, 14-hexadecenoic acid, 15-hexadecenoic acid, 3-heptadecenoic acid, 4-heptadecenoic acid, 5-heptadecenoic acid, 6-heptadecenoic acid, 7-heptadecenoic acid, 8-heptadecenoic acid, 9-heptadecenoic acid, 10-heptadecenoic acid, 11-heptadecenoic acid, 12-heptadecenoic acid, 13-heptadecenoic acid, 14-heptadecenoic acid, 15-heptadecenoic acid, 16-heptadecenoic acid, 3-octadecenoic acid, 4-octadecenoic acid, 5-octadecenoic acid, 6-octadecenoic acid, 7-octadecenoic acid, 8-octadecenoic acid, 9-octadecenoic acid, 10-octadecenoic acid, 11-octadecenoic acid, 12-octadecenoic acid, 13-octadecenoic acid, 14-octadecenoic acid, 15-octadecenoic acid, 16-octadecenoic acid, 17-octadecenoic acid, 3-nonadecenoic acid, 4-nonadecenoic acid, 5-nonadecenoic acid, 6-nonadecenoic acid, 7-nonadecenoic acid, 8-nonadecenoic acid, 9-nonadecenoic acid, 10-nonadecenoic acid, 11-nonadecenoic acid, 12-nonadecenoic acid, 13-nonadecenoic acid, 14-nonadecenoic acid, 15-nonadecenoic acid, 16-nonadecenoic acid, 17-nonadecenoic acid, 18-nonadecenoic acid, 3-icosanenoic acid, 4-icosanenoic acid, 5-icosanenoic acid, 6-icosanenoic acid, 7-icosanenoic acid, 8-icosanenoic acid, 9-icosanenoic acid, 10-icosanenoic acid, 11-icosanenoic acid, 12-icosanenoic acid, 13-icosanenoic acid, 14-icosanenoic acid, 15-icosanenoic acid, 16-icosanenoic acid, 17-icosanenoic acid, 18-icosanenoic acid, 19-icosanenoic acid, 3-henicosenoic acid, 4-henicosenoic acid, 5-henicosenoic acid, 6-henicosenoic acid, 7-henicosenoic acid, 8-henicosenoic acid, 9-henicosenoic acid, 10-henicosenoic acid, 11-henicosenoic acid, 12-henicosenoic acid, 13-henicosenoic acid, 14-henicosenoic acid, 15-henicosenoic acid, 16-henicosenoic acid, 17-henicosenoic acid, 18-henicosenoic acid, 19-henicosenoic acid, 20-henicosenoic acid, 3-docosenoic acid, 4-docosenoic acid, 5-docosenoic acid, 6-docosenoic acid, 7-docosenoic acid, 8-docosenoic acid, 9-docosenoic acid, 10-docosenoic acid, 11-docosenoic acid, 12-docosenoic acid, 13-docosenoic acid, 14-docosenoic acid, 15-docosenoic acid, 16-docosenoic acid, 17-docosenoic acid, 18-docosenoic acid, 19-docosenoic acid, 20-docosenoic acid, 21-docosenoic acid, 3-tricosenoic acid, 4-tricosenoic acid, 5-tricosenoic acid, 6-tricosenoic acid, 7-tricosenoic acid, 8-tricosenoic acid, 9-tricosenoic acid, 10-tricosenoic acid, 11-tricosenoic acid, 12-tricosenoic acid, 13-tricosenoic acid, 14-tricosenoic acid, 15-tricosenoic acid, 16-tricosenoic acid, 17-tricosenoic acid, 18-tricosenoic acid, 19-tricosenoic acid, 20-tricosenoic acid, 21-tricosenoic acid, 22-tricosenoic acid, 3-tetracosenoic acid, 4-tetracosenoic acid, 5-tetracosenoic acid, 6-tetracosenoic acid, 7-tetracosenoic acid, 8-tetracosenoic acid, 9-tetracosenoic acid, 10-tetracosenoic acid, 11-tetracosenoic acid, 12-tetracosenoic acid, 13-tetracosenoic acid, 14-tetracosenoic acid, 15-tetracosenoic acid, 16-tetracosenoic acid, 17-tetracosenoic acid, 18-tetracosenoic acid, 19-tetracosenoic acid, 20-tetracosenoic acid, 21-tetracosenoic acid, 22-tetracosenoic acid, 23-tetracosenoic acid, 3-pentacosenoic acid, 4-pentacosenoic acid, 5-pentacosenoic acid, 6-pentacosenoic acid, 7-pentacosenoic acid, 8-pentacosenoic acid, 9-pentacosenoic acid, 10-pentacosenoic acid, 11-pentacosenoic acid, 12-pentacosenoic acid, 13-pentacosenoic acid, 14-pentacosenoic acid, 15-pentacosenoic acid, 16-pentacosenoic acid, 17-pentacosenoic acid, 18-pentacosenoic acid, 19-pentacosenoic acid, 20-pentacosenoic acid, 21-pentacosenoic acid, 22-pentacosenoic acid, 23-pentacosenoic acid, 24-pentacosenoic acid, 3-hexacosenoic acid, 4-hexacosenoic acid, 5-hexacosenoic acid, 6-hexacosenoic acid, 7-hexacosenoic acid, 8-hexacosenoic acid, 9-hexacosenoic acid, 10-hexacosenoic acid, 11-hexacosenoic acid, 12-hexacosenoic acid, 13-hexacosenoic acid, 14-hexacosenoic acid, 15-hexacosenoic acid, 16-hexacosenoic acid, 17-hexacosenoic acid, 18-hexacosenoic acid, 19-hexacosenoic acid, 20-hexacosenoic acid, 21-hexacosenoic acid, 22-hexacosenoic acid, 23-hexacosenoic acid, 24-hexacosenoic acid, 25-hexacosenoic acid, 3-heptacosenoic acid, 4-heptacosenoic acid, 5-heptacosenoic acid, 6-heptacosenoic acid, 7-heptacosenoic acid, 8-heptacosenoic acid, 9-heptacosenoic acid, 10-heptacosenoic acid, 11-heptacosenoic acid, 12-heptacosenoic acid, 13-heptacosenoic acid, 14-heptacosenoic acid, 15-heptacosenoic acid, 16-heptacosenoic acid, 17-heptacosenoic acid, 18-heptacosenoic acid, 19-heptacosenoic acid, 20-heptacosenoic acid, 21-heptacosenoic acid, 22-heptacosenoic acid, 23-heptacosenoic acid, 24-heptacosenoic acid, 25-heptacosenoic acid, 26-heptacosenoic acid, 3-octacosenoic acid, 4-octacosenoic acid, 5-octacosenoic acid, 6-octacosenoic acid, 7-octacosenoic acid, 8-octacosenoic acid, 9-octacosenoic acid, 10-octacosenoic acid, 11-octacosenoic acid, 12-octacosenoic acid, 13-octacosenoic acid, 14-octacosenoic acid, 15-octacosenoic acid, 16-octacosenoic acid, 17-octacosenoic acid, 18-octacosenoic acid, 19-octacosenoic acid, 20-octacosenoic acid, 21-octacosenoic acid, 22-octacosenoic acid, 23-octacosenoic acid, 24-octacosenoic acid, 25-octacosenoic acid, 26-octacosenoic acid, 27-octacosenoic acid, 3-nonacosenoic acid, 4-nonacosenoic acid, 5-nonacosenoic acid, 6-nonacosenoic acid, 7-nonacosenoic acid, 8-nonacosenoic acid, 9-nonacosenoic acid, 10-nonacosenoic acid, 11-nonacosenoic acid, 12-nonacosenoic acid, 13-nonacosenoic acid, 14-nonacosenoic acid, 15-nonacosenoic acid, 16-nonacosenoic acid, 17-nonacosenoic acid, 18-nonacosenoic acid, 19-nonacosenoic acid, 20-nonacosenoic acid, 21-nonacosenoic acid, 22-nonacosenoic acid, 23-nonacosenoic acid, 24-nonacosenoic acid, 25-nonacosenoic acid, 26-nonacosenoic acid, 27-nonacosenoic acid, 28-nonacosenoic acid, 3-triacontenoic acid, 4-triacontenoic acid, 5-triacontenoic acid, 6-triacontenoic acid, 7-triacontenoic acid, 8-triacontenoic acid, 9-triacontenoic acid, 10-triacontenoic acid, 11-triacontenoic acid, 12-triacontenoic acid, 13-triacontenoic acid, 14-triacontenoic acid, 15-triacontenoic acid, 16-triacontenoic acid, 17-triacontenoic acid, 18-triacontenoic acid, 19-triacontenoic acid, 20-triacontenoic acid, 21-triacontenoic acid, 22-triacontenoic acid, 23-triacontenoic acid, 24-triacontenoic acid, 25-triacontenoic acid, 26-triacontenoic acid, 27-triacontenoic acid, 28-triacontenoic acid, and 29-triacontenoic acid. These can each have a cis or trans (preferably cis) configuration. The above alkenoic acids are preferably linear alkenoic acids (n-alkenoic acids).

It is to be understood that the number assigned to a double bond in an unsaturated fatty acid (i.e. a fatty acid comprising one or more C=C double bonds) indicates the position of the double bond in the fatty acid. The same applies to several numbers for polyunsaturated fatty acids. In that case, the number indicates the carbon atom of the double bond closest to the carboxyl group. For example, a 12-tetradecenoic acid is a fatty acid with 14 carbon atoms in which the double bond is located between C12 and C13 (whereby the carbon atom C1 is the carbon atom of the carboxyl group).

Preferred examples of fatty acids with two C=C double bonds include fatty acids as listed above, in which an additional C=C double bond is present, preferably in a non-conjugated position, more preferably at a position set off by a $CH_2$ group.

It is preferred that the first (or only) double bond is located between C9 and C 10 (or further away from the carboxyl group) and that the double bond to be hydrated has a cis conformation. In addition, it is preferred that the double bond is not a terminal double bond. Accordingly, the fatty acids with one, two or three C=C double bonds are preferably selected from 9-undecenoic acid, 9-dodecenoic acid, 10-dodecenoic acid, 9-tridecenoic acid, 10-tridecenoic acid, 11-tridecenoic acid, 9-tetradecenoic acid, 10-tetradecenoic acid, 11-tetradecenoic acid, 12-tetradecenoic acid, 9-pentadecenoic acid, 10-pentadecenoic acid, 11-pentadecenoic acid, 12-pentadecenoic acid, 13-pentadecenoic acid, 9-hexadecenoic acid, 10-hexadecenoic acid, 11-hexadecenoic acid, 12-hexadecenoic acid, 13-hexadecenoic acid, 14-hexadecenoic acid, 9-heptadecenoic acid, 10-heptadecenoic acid, 11-heptadecenoic acid, 12-heptadecenoic acid, 13-heptadecenoic acid, 14-heptadecenoic acid, 15-heptadecenoic acid, 9-octadecenoic acid, 10-octadecenoic acid, 11-octadecenoic acid, 12-octadecenoic acid, 13-octadecenoic acid, 14-octadecenoic acid, 15-octadecenoic acid, 16-octadecenoic acid, 9-nonadecenoic acid, 10-nonadecenoic acid, 11-nonadecenoic acid, 12-nonadecenoic acid, 13-nonadecenoic acid, 14-nonadecenoic acid, 15-nonadecenoic acid, 16-nonadecenoic acid, 17-nonadecenoic acid, 9-icosanenoic acid, 10-icosanenic acid, 11-icosanenoic acid, 12-icosanenoic acid, 13-icosanenoic acid, 14-icosanenoic acid, 15-icosanenoic acid, 16-icosanenoic acid, 17-icosanenoic acid, 18-icosanenoic acid, 9-heneicosenoic acid, 10-heneicosenoic acid, 11-heneicosenoic acid, 12-heneicosenoic acid, 13-heneicosenoic acid, 14-heneicosenoic acid, 15-heneicosenoic acid, 16-heneicosenoic acid, 17-heneicosenoic acid, 18-heneicosenoic acid, 19-heneicosenoic acid, 9-docosenoic acid, 10-docosenoic acid, 11-docosenoic acid, 12-docosenoic acid, 13-docosenoic acid, 14-docosenoic acid, 15-docosenoic acid, 16-docosenoic acid, 17-docosenoic acid, 18-docosenoic acid, 19-docosenoic acid, 20-docosenoic acid, 9-tricosenoic acid, 10-tricosenoic acid, 11-tricosenoic acid, 12-tricosenoic acid, 13-tricosenoic acid, 14-tricosenoic acid, 15-tricosenoic acid, 16-tricosenoic acid, 17-tricosenoic acid, 18-tricosenoic acid, 19-tricosenoic acid, 20-tricosenoic acid, 21-tricosenoic acid, 9-tetracosenoic acid, 10-tetracosenoic acid, 11-tetracosenoic acid, 12-tetracosenoic acid, 13-tetracosenoic acid, 14-tetracosenoic acid, 15-tetracosenoic acid, 16-tetracosenoic acid, 17-tetracosenoic acid, 18-tetracosenoic acid, 19-tetracosenoic acid, 20-tetracosenoic acid, 21-tetracosenoic acid, 22-tetracosenoic acid, 9-pentacosenoic acid, 10-pentacosenoic acid, 11-pentacosenoic acid, 12-pentacosenoic acid, 13-pentacosenoic acid, 14-pentacosenoic acid, 15-pentacosenoic acid, 16-pentacosenoic acid, 17-pentacosenoic acid, 18-pentacosenoic acid, 19-pentacosenoic acid, 20-pentacosenoic acid, 21-pentacosenoic acid, 22-pentacosenoic acid, 23-pentacosenoic acid, 9-hexacosenoic acid, 10-hexacosenoic acid, 11-hexacosenoic acid, 12-hexacosenoic acid, 13-hexacosenoic acid, 14-hexacosenoic acid, 15-hexacosenoic acid, 16-hexacosenoic acid, 17-hexacosenoic acid, 18-hexacosenoic acid, 19-hexacosenoic acid, 20-hexacosenoic acid, 21-hexacosenoic acid, 22-hexacosenoic acid, 23-hexacosenoic acid, 24-hexacosenoic acid, 9-heptacosenoic acid, 10-heptacosenoic acid, 11-heptacosenoic acid, 12-heptacosenoic acid, 13-heptacosenoic acid, 14-heptacosenoic acid, 15-heptacosenoic acid, 16-heptacosenoic acid, 17-heptacosenoic acid, 18-heptacosenoic acid, 19-heptacosenoic acid, 20-heptacosenoic acid, 21-heptacosenoic acid, 22-heptacosenoic acid, 23-heptacosenoic acid, 24-heptacosenoic acid, 25-heptacosenoic acid, 9-octacosenoic acid, 10-octacosenoic acid, 11-octacosenoic acid, 12-octacosenoic acid, 13-octacosenoic acid, 14-octacosenoic acid, 15-octacosenoic acid, 16-octacosenoic acid, 17-octacosenoic acid, 18-octacosenoic acid, 19-octacosenoic acid, 20-octacosenoic acid, 21-octacosenoic acid, 22-octacosenoic acid, 23-octacosenoic acid, 24-octacosenoic acid, 25-octacosenoic acid, 26-octacosenoic acid, 9-nonacosenoic acid, 10-nonacosenoic acid, 11-nonacosenoic acid, 12-nonacosenoic acid, 13-nonacosenoic acid, 14-nonacosenoic acid, 15-nonacosenoic acid, 16-nonacosenoic acid, 17-nonacosenoic acid, 18-nonacosenoic acid, 19-nonacosenoic acid, 20-nonacosenoic acid, 21-nonacosenoic acid, 22-nonacosenoic acid, 23-nonacosenoic acid, 24-nonacosenoic acid, 25-nonacosenoic acid, 26-nonacosenoic acid, 27-nonacosenoic acid, 9-triacontenoic acid, 10-triacontenoic acid, 11-triacontenoic acid, 12-triacontenoic acid, 13-triacontenoic acid, 14-triacontenoic acid, 15-triacontenoic acid, 16-triacontenoic acid, 17-triacontenoic acid, 18-triacontenoic acid, 19-triacontenoic acid, 20-triacontenoic acid, 21-triacontenoic acid, 22-triacontenoic acid, 23-triacontenoic acid, 24-triacontenoic acid, 25-triacontenoic acid, 26-triacontenoic acid, 27-triacontenoic acid, 28-triacontenoic acid, tetradeca-9,12-dienoic acid, pentadeca-9,12-dienoic acid, pentadeca-10,13-dienoic acid, hexadeca-9,12-dienoic acid, hexadeca-10,13-dienoic acid, hexadeca-11,14-dienoic acid, heptadeca-9,12-dienoic acid, heptadeca-10,13-dienoic acid, heptadeca-11,14-dienoic acid, heptadeca-12,15-dienoic acid, octadeca-9,12-dienoic acid, octadeca-10,13-dienoic acid, octadeca-11,14-dienoic acid, octadeca-12,15-dienoic acid, octadeca-13,16-dienoic acid, nonadeca-9,12-dienoic acid, nonadeca-10,13-dienoic acid, nonadeca-11,14-dienoic acid, nonadeca-12,15-dienoic acid, nonadeca-13,16-dienoic acid, nonadeca-14,17-dienoic acid, icosana-9,12-dienoic acid, icosana-10,13-dienoic acid, icosana-11,14-dienoic acid, icosana-12,15-dienoic acid, icosana-13,16-dienoic acid, icosana-14,17-dienoic acid, icosana-15,18-dienoic acid, heneicosa-9,12-dienoic acid, heneicosa-10,13-dienoic acid, heneicosa-11,14-dienoic acid, heneicosa-12,15-dienoic acid, heneicosa-13,16-dienoic acid, heneicosa-14,17-dienoic acid, heneicosa-15,18-dienoic acid, heneicosa-16,19-dienoic acid, docosa-9,12-dienoic acid, docosa-10,13-dienoic acid, docosa-11,14-dienoic acid, docosa-12,15-dienoic acid, docosa-13,16-dienoic acid, docosa-14,17-dienoic acid, docosa-15,18-dienoic acid, docosa-16,19-dienoic acid, docosa-17,20-dienoic acid, tricosa-9,12-dienoic acid, tricosa-10,13-dienoic acid, tricosa-11,14-dienoic acid, tricosa-12,15-dienoic acid, tricosa-13,16-dienoic acid, tricosa-14,17-dienoic acid, tricosa-15,18-dienoic acid, tricosa-16,19-dienoic acid, tricosa-17,20-dienoic acid, tricosa-18,21-dienoic acid, tetracosa-9,12-dienoic acid, tetracosa-10,13-dienoic acid, tetracosa-11,14-dienoic acid, tetracosa-12,15-dienoic acid, tetracosa-13,16-dienoic acid, tetracosa-14,17-dienoic acid, tetracosa-15,18-dienoic acid, tetracosa-16,19-dienoic acid, tetracosa-17,20-dienoic acid, tetracosa-18,21-dienoic acid, tetracosa-19,22-dienoic acid, pentacosa-9,12-dienoic acid, pentacosa-10,13-dienoic acid, pentacosa-11,14-dienoic acid, pentacosa-12,15-dienoic acid, pentacosa-13,16-dienoic acid, pentacosa-14,17-dienoic acid, pentacosa-15,18-dienoic acid, pentacosa-16,19-dienoic acid, pentacosa-17,20-dienoic acid, pentacosa-18,21-dienoic acid, pentacosa-19,22-dienoic acid, pentacosa-20,23-dienoic acid, hexacosa-9,12-dienoic acid, hexacosa-10,13-dienoic acid, hexacosa-11,14-dienoic acid, hexacosa-12,15-dienoic acid, hexacosa-13,16-dienoic acid, hexacosa-14,17-dienoic acid, hexacosa-15,18-dienoic acid, hexacosa-16,19-dienoic acid, hexacosa-17,20-dienoic acid, hexacosa-18,21-dienoic acid, hexacosa-19,22-dienoic acid, hexacosa-20,23-dienoic acid, hexacosa-21,24- dienoic acid, heptacosa-9,12-dienoic acid, heptacosa-10,13-dienoic acid, heptacosa-11,14-dienoic acid, heptacosa-12,15-dienoic acid, heptacosa-13,16-dienoic acid, heptacosa-14,17-dienoic acid, heptacosa-15,18-dienoic acid, heptacosa-16,19-dienoic acid, heptacosa-17,20-dienoic acid, heptacosa-18,21-dienoic acid, heptacosa-19,22-dienoic acid, heptacosa-20,23-dienoic acid, heptacosa-21,24-dienoic acid, heptacosa-22,25-dienoic acid, octacosa-9,12-dienoic acid, octacosa-10,13-dienoic acid, octacosa-11,14-dienoic acid, octacosa-12,15-dienoic acid, octacosa-13,16-dienoic acid, octacosa-14,17-dienoic acid, octacosa-15,18-dienoic acid, octacosa-16,19-dienoic acid, octacosa-17,20-dienoic acid, octacosa-18,21-dienoic acid, octacosa-19,22-dienoic acid, octacosa-20,23-dienoic acid, octacosa-21,24-dienoic acid, octacosa-22,25-dienoic acid, octacosa-23,26-dienoic acid, nonacosa-9,12-dienoic acid, nonacosa-10,13-dienoic acid, nonacosa-11,14-dienoic acid, nonacosa-12,15-dienoic acid, nonacosa-13,16-dienoic acid, nonacosa-14,17-dienoic acid, nonacosa-15,18-dienoic acid, nonacosa-16,19-dienoic acid, nonacosa-17,20-dienoic acid, nonacosa-18,21-dienoic acid, nonacosa-19,22-dienoic acid, nonacosa-20,23-dienoic acid, nonacosa-21,24-dienoic acid, nonacosa-22,25-dienoic acid, nonacosa-23,26-dienoic acid, nonacosa-24,27-dienoic acid, triaconta-9,12-dienoic acid, triaconta-10,13-dienoic acid, triaconta-11,14-dienoic acid, triaconta-12,15-dienoic acid, triaconta-13,16-dienoic acid, triaconta-14,17-dienoic acid, triaconta-15,18-dienoic acid, triaconta-16,19-dienoic acid, triaconta-17,20-dienoic acid, triaconta-18,21-dienoic acid, triaconta-19,22-dienoic acid, triaconta-20,23-dienoic acid, triaconta-21,24-dienoic acid, triaconta-22,25-dienoic acid, triaconta-23,26-dienoic acid, triaconta-24,27-dienoic acid, triaconta-25,28-dienoic acid, heptadeca-9,12,15-trienoic acid, octadeca-9,12,15-trienoic acid, octadeca-10,13,16-trienoic acid, nonadeca-9,12,15-trienoic acid, nonadeca-10,13,16-trienoic acid, nonadeca-11,14,17-trienoic acid, icosana-9,12,15-trienoic acid, icosana-10,13,16-trienoic acid, icosana-11,14,17-trienoic acid, icosana-12,15,18-trienoic acid, heneicosa-9,12,15-trienoic acid, heneicosa-10,13,16-trienoic acid, heneicosa-11,14,17-trienoic acid, heneicosa-12,15,18-trienoic acid, heneicosa-13,16,19-trienoic acid, docosa-9,12,15-trienoic acid, docosa-10,13,16-trienoic acid, docosa-11,14,17-trienoic acid, docosa-12,15,18-trienoic acid, docosa-13,16,19-trienoic acid, docosa-14,17,20-trienoic acid, tricosa-9,12,15-trienoic acid, tricosa-10,13,16-trienoic acid, tricosa-11,14,17-trienoic acid, tricosa-12,15,18-trienoic acid, tricosa-13,16,19-trienoic acid, tricosa-14,17,20-trienoic acid, tricosa-15,18,21-trienoic acid, tetracosa-9,12,15-trienoic acid, tetracosa-10,13,16-trienoic acid, tetracosa-11,14,17-trienoic acid, tetracosa-12,15,18-trienoic acid, tetracosa-13,16,19-trienoic acid, tetracosa-14,17,20-trienoic acid, tetracosa-15,18,21-trienoic acid, tetracosa-16,19,22-trienoic acid, pentacosa-9,12,15-trienoic acid, pentacosa-10,13,16-trienoic acid, pentacosa-11,14,17-trienoic acid, pentacosa-12,15,18-trienoic acid, pentacosa-13,16,19-trienoic acid, pentacosa-14,17,20-trienoic acid, pentacosa-15,18,21-trienoic acid, pentacosa-16,19,22-trienoic acid, pentacosa-17,20,23-trienoic acid, hexacosa-9,12,15-trienoic acid, hexacosa-10,13,16-trienoic acid, hexacosa-11,14,17-trienoic acid, hexacosa-12,15,18-trienoic acid, hexacosa-13,16,19-trienoic acid, hexacosa-14,17,20-trienoic acid, hexacosa-15,18,21-trienoic acid, hexacosa-16,19,22-trienoic acid, hexacosa-17,20,23-trienoic acid, hexacosa-18,21,24-trienoic acid, heptacosa-9,12,15-trienoic acid, heptacosa-10,13,16-trienoic acid, heptacosa-11,14,17-trienoic acid, heptacosa-12,15,18-trienoic acid, heptacosa-13,16,19-trienoic acid, heptacosa-14,17,20-trienoic acid, heptacosa-15,18,21-trienoic acid, heptacosa-16,19,22-trienoic acid, heptacosa-17,20,23-trienoic acid, heptacosa-18,21,24-trienoic acid, heptacosa-19,22,25-trienoic acid, octacosa-9,12,15-trienoic acid, octacosa-10,13,16-trienoic acid, octacosa-11,14,17-trienoic acid, octacosa-12,15,18-trienoic acid, octacosa-13,16,19-trienoic acid, octacosa-14,17,20-trienoic acid, octacosa-15,18,21-trienoic acid, octacosa-16,19,22-trienoic acid, octacosa-17,20,23-trienoic acid, octacosa-18,21,24-trienoic acid, octacosa-19,22,25-trienoic acid, octacosa-20,23,26-trienoic acid, nonacosa-9,12,15-trienoic acid, nonacosa-10,13,16-trienoic acid, nonacosa-11,14,17-trienoic acid, nonacosa-12,15,18-trienoic acid, nonacosa-13,16,19-trienoic acid, nonacosa-14,17,20-trienoic acid, nonacosa-15,18,21-trienoic acid, nonacosa-16,19,22-trienoic acid, nonacosa-17,20,23-trienoic acid, nonacosa-18,21,24-trienoic acid, nonacosa-19,22,25-trienoic acid, nonacosa-20,23,26-trienoic acid, nonacosa-21,24,27-trienoic acid, triaconta-9,12,15-trienoic acid, triaconta-10,13,16-trienoic acid, triaconta-11,14,17-trienoic acid, triaconta-12,15,18-trienoic acid, triaconta-13,16,19-trienoic acid, triaconta-14,17,20-trienoic acid, triaconta-15,18,21-trienoic acid, triaconta-16,19,22-trienoic acid, triaconta-17,20,23-trienoic acid, triaconta-18,21,24-trienoic acid, triaconta-19,22,25-trienoic acid, triaconta-20,23,26-trienoic acid, triaconta-21,24,27-trienoic acid and triaconta-22,25,28-trienoic acid. Preferably, at least the C═C double bond closest to the carboxylic acid function, but preferably all C═C double bonds, have a cis conformation.

For the preparation of particularly oxidation-resistant and UV-stable products, the fatty acids with a C═C double bond are more preferably selected, among these, from 9-undecenoic acid, 9-dodecenoic acid, 10-dodecenoic acid, 9-tridecenoic acid, 10-tridecenoic acid, 11-tridecenoic acid, 9-tetradecenoic acid, 10-tetradecenoic acid, 11-tetradecenoic acid, 12-tetradecenoic acid, 9-pentadecenoic acid, 10-pentadecenoic acid, 11-pentadecenoic acid, 12-pentadecenoic acid, 13-pentadecenoic acid, 9-hexadecenoic acid, 10-hexadecenoic acid, 11-hexadecenoic acid, 12-hexadecenoic acid, 13-hexadecenoic acid, 14-hexadecenoic acid, 9-heptadecenoic acid, 10-heptadecenoic acid, 11-heptadecenoic acid, 12-heptadecenoic acid, 13-heptadecenoic acid, 14-heptadecenoic acid, 15-heptadecenoic acid, 9-octadecenoic acid, 10-octadecenoic acid, 11-octadecenoic acid, 12-octadecenoic acid, 13-octadecenoic acid, 14-octadecenoic acid, 15-octadecenoic acid, 16-octadecenoic acid, 9-nonadecenoic acid, 10-nonadecenoic acid, 11-nonadecenoic acid, 12-nonadecenoic acid, 13-nonadecenoic acid, 14-nonadecenoic acid, 15-nonadecenoic acid, 16-nonadecenoic acid, 17-nonadecenoic acid, 9-icosanenoic acid, 10-icosanenoic acid, 11-icosanenoic acid, 12-icosanenoic acid, 13-icosanenoic acid, 14-icosanenoic acid, 15-icosanenoic acid, 16-icosanenoic acid, 17-icosanenoic acid, 18-icosanenoic acid, 9-heneicosenoic acid, 10-heneicosenoic acid, 11-heneicosenoic acid, 12-heneicosenoic acid, 13-heneicosenoic acid, 14-heneicosenoic acid, 15-heneicosenoic acid, 16-heneicosenoic acid, 17-heneicosenoic acid, 18-heneicosenoic acid, 19-heneicosenoic acid, 9-docosenoic acid, 10-docosenoic acid, 11-docosenoic acid, 12-docosenoic acid, 13-docosenoic acid, 14-docosenoic acid, 15-docosenoic acid, 16-docosenoic acid, 17-docosenoic acid, 18-docosenoic acid, 19-docosenoic acid, 20-docosenoic acid, 9-tricosenoic acid, 10-tricosenoic acid, 11-tricosenoic acid, 12-tricosenoic acid, 13-tricosenoic acid, 14-tricosenoic acid, 15-tricosenoic acid, 16-tricosenoic acid, 17-tricosenoic acid, 18-tricosenoic acid, 19-tricosenoic acid, 20-tricosenoic acid, 21-tricosenoic acid, 9-tetracosenoic acid, 10-tetracosenoic acid, 11-tetracosenoic acid, 12-tetracosenoic acid, 13-tetracosenoic acid, 14-tetracosenoic acid, 15-tetracosenoic acid, 16-tetracosenoic acid, 17-tetracosenoic acid, 18-tetracosenoic acid, 19-tetracosenoic acid, 20-tetracosenoic acid, 21-tetracosenoic acid, 22-tetracosenoic acid, 9-pentacosenoic acid, 10-pentacosenoic acid, 11-pentacosenoic acid, 12-pentacosenoic acid, 13-pentacosenoic acid, 14-pentacosenoic acid, 15-pentacosenoic acid, 16-pentacosenoic acid, 17-pentacosenoic acid, 18-pentacosenoic acid, 19-pentacosenoic acid, 20-pentacosenoic acid, 21-pentacosenoic acid, 22-pentacosenoic acid, 23-pentacosenoic acid, 9-hexacosenoic acid, 10-hexacosenoic acid, 11-hexacosenoic acid, 12-hexacosenoic acid, 13-hexacosenoic acid, 14-hexacosenoic acid, 15-hexacosenoic acid, 16-hexacosenoic acid, 17-hexacosenoic acid, 18-hexacosenoic acid, 19-hexacosenoic acid, 20-hexacosenoic acid, 21-hexacosenoic acid, 22-hexacosenoic acid, 23-hexacosenoic acid, 24-hexacosenoic acid, 9-heptacosenoic acid, 10-heptacosenoic acid, 11-heptacosenoic acid, 12-heptacosenoic acid, 13-heptacosenoic acid, 14-heptacosenoic acid, 15-heptacosenoic acid, 16-heptacosenoic acid, 17-heptacosenoic acid, 18-heptacosenoic acid, 19-heptacosenoic acid, 20-heptacosenoic acid, 21-heptacosenoic acid, 22-heptacosenoic acid, 23-heptacosenoic acid, 24-heptacosenoic acid, 25-heptacosenoic acid, 9-octacosenoic acid, 10-octacosenoic acid, 11-octacosenoic acid, 12-octacosenoic acid, 13-octacosenoic acid, 14-octacosenoic acid, 15-octacosenoic acid, 16-octacosenoic acid, 17-octacosenoic acid, 18-octacosenoic acid, 19-octacosenoic acid, 20-octacosenoic acid, 21-octacosenoic acid, 22-octacosenoic acid, 23-octacosenoic acid, 24-octacosenoic acid, 25-octacosenoic acid, 26-octacosenoic acid, 9-nonacosenoic acid, 10-nonacosenoic acid, 11-nonacosenoic acid, 12-nonacosenoic acid, 13-nonacosenoic acid, 14-nonacosenoic acid, 15-nonacosenoic acid, 16-nonacosenoic acid, 17-nonacosenoic acid, 18-nonacosenoic acid, 19-nonacosenoic acid, 20-nonacosenoic acid, 21-nonacosenoic acid, 22-nonacosenoic acid, 23-nonacosenoic acid, 24-nonacosenoic acid, 25-nonacosenoic acid, 26-nonacosenoic acid, 27-nonacosenoic acid, 9-triacontenoic acid, 10-triacontenoic acid, 11-triacontenoic acid, 12-triacontenoic acid, 13-triacontenoic acid, 14-triacontenoic acid, 15-triacontenoic acid, 16-triacontenoic acid, 17-triacontenoic acid, 18-triacontenoic acid, 19-triacontenoic acid, 20-triacontenoic acid, 21-triacontenoic acid, 22-triacontenoic acid, 23-triacontenoic acid, 24-triacontenoic acid, 25-triacontenoic acid, 26-triacontenoic acid, 27-triacontenoic acid, and 28-triacontenoic acid. Preferably, the C=C double bond has a cis conformation.

In order to improve the processability of the hydroxy fatty acids, in particular to obtain hydroxy fatty acids liquid at room temperature as much as possible, it is preferred that the fatty acids with at least one C=C double bond comprise two or three C=C double bonds. These can preferably be selected from fatty acids with two C=C double bonds, such as tetradeca-9,12-dienoic acid, pentadeca-9,12-dienoic acid, pentadeca-10,13-dienoic acid, hexadeca-9,12-dienoic acid, hexadeca-10,13-dienoic acid, hexadeca-11,14-dienoic acid, heptadeca-9,12-dienoic acid, heptadeca-10,13-dienoic acid, heptadeca-11,14-dienoic acid, heptadeca-12,15-dienoic acid, octadeca-9,12-dienoic acid, octadeca-10,13-dienoic acid, octadeca-11,14-dienoic acid, octadeca-12,15-dienoic acid, octadeca-13,16-dienoic acid, nonadeca-9,12-dienoic acid, nonadeca-10,13-dienoic acid, nonadeca-11,14-dienoic acid, nonadeca-12,15-dienoic acid, nonadeca-13,16-dienoic acid, nonadeca-14,17-dienoic acid, icosana-9,12-dienoic acid, icosana-10,13-dienoic acid, icosana-11,14-dienoic acid, icosana-12,15-dienoic acid, icosana-13,16-dienoic acid, icosana-14,17-dienoic acid, icosana-15,18-dienoic acid, heneicosa-9,12-dienoic acid, heneicosa-10,13-dienoic acid, heneicosa-11,14-dienoic acid, heneicosa-12,15-dienoic acid, heneicosa-13,16-dienoic acid, heneicosa-14,17-dienoic acid, heneicosa-15,18-dienoic acid, heneicosa-16,19-dienoic acid, docosa-9,12-dienoic acid, docosa-10,13-dienoic acid, docosa-11,14-dienoic acid, docosa-12,15-dienoic acid, docosa-13,16-dienoic acid, docosa-14,17-dienoic acid, docosa-15,18-dienoic acid, docosa-16,19-dienoic acid, docosa-17,20-dienoic acid, tricosa-9,12-dienoic acid, tricosa-10,13-dienoic acid, tricosa-11,14-dienoic acid, tricosa-12,15-dienoic acid, tricosa-13,16-dienoic acid, tricosa-14,17-dienoic acid, tricosa-15,18-dienoic acid, tricosa-16,19-dienoic acid, tricosa-17,20-dienoic acid, tricosa-18,21-dienoic acid, tetracosa-9,12-dienoic acid, tetracosa-10,13-dienoic acid, tetracosa-11,14-dienoic acid, tetracosa-12,15-dienoic acid, tetracosa-13,16-dienoic acid, tetracosa-14,17-dienoic acid, tetracosa-15,18-dienoic acid, tetracosa-16,19-dienoic acid, tetracosa-17,20-dienoic acid, tetracosa-18,21-dienoic acid, and tetracosa-19,22-dienoic acid.

Fatty acids with three C=C double bonds can preferably be selected from heptadeca-9,12,15-trienoic acid, octadeca-9,12,15-trienoic acid, octadeca-10,13,16-trienoic acid, nonadeca-9,12,15-trienoic acid, nonadeca-10,13,16-trienoic acid, nonadeca-11,14,17-trienoic acid, icosana-9,12,15-trienoic acid, icosana-10,13,16-trienoic acid, icosana-11,14,17-trienoic acid, icosana-12,15,18-trienoic acid, heneicosa-9,12,15-trienoic acid, heneicosa-10,13,16-trienoic acid, heneicosa-11,14,17-trienoic acid, heneicosa-12,15,18-trienoic acid, heneicosa-13,16,19-trienoic acid, docosa-9,12,15-trienoic acid, docosa-10,13,16-trienoic acid, docosa-11,14,17-trienoic acid, docosa-12,15,18-trienoic acid, docosa-13,16,19-trienoic acid, docosa-14,17,20-trienoic acid, tricosa-9,12,15-trienoic acid, tricosa-10,13,16-trienoic acid, tricosa-11,14,17-trienoic acid, tricosa-12,15,18-trienoic acid, tricosa-13,16,19-trienoic acid, tricosa-14,17,20-trienoic acid, tricosa-15,18,21-trienoic acid, tetracosa-9,12,15-trienoic acid, tetracosa-10,13,16-trienoic acid, tetracosa-11,14,17-trienoic acid, tetracosa-12,15,18-trienoic acid, tetracosa-13,16,19-trienoic acid, tetracosa-14,17,20-trienoic acid, tetracosa-15,18,21-trienoic acid, and tetracosa-16,19,22-trienoic acid.

Among these, in turn, the alkenoic acids with 24 or fewer, preferably 22 or fewer, carbon atoms are particularly preferred, wherein the (single or most distant from the carboxyl group) double bond is preferably located at C18=C19 or closer to the carboxyl group (but preferably not closer to the carboxyl group than C9=C10).

It is preferred that the "fatty acid having at least one C=C double bond functionality" is a C14 to C20 fatty acid, more preferably a C14, C16, C18 or C20 fatty acid (particularly preferred a C14, C16 or C18 fatty acid).

More preferably, the one or more fatty acids with at least one C=C double bond functionality are selected from the group consisting of monounsaturated fatty acids, preferably selected from undecylenic acid, myristoleic acid, palmitoleic acid, margaroleic acid, petroselinic acid, oleic acid, elaidic acid, vaccenic acid, gadoleic acid, gondoic acid, cetoleic acid, erucic acid, vemolic acid, cis-5-eicosenoic acid, brassidic acid, and nervonic acid, and/or from the group consisting of polyunsaturated fatty acids, preferably selected from linoleic acid, linolenic acid, calendulic acid, punicic acid, eleostearic acid, arachidonic acid, timnodonic acid, clupanodonic acid, lesquerolic acid, licanoic acid, and cervonic acid.

Among these, the monounsaturated fatty acids, preferably selected from undecylenic acid, myristoleic acid, palmitoleic acid, margaroleic acid, petroselinic acid, oleic acid, elaidic acid, vaccenic acid, gadoleic acid, gondoic acid, cetoleic acid, erucic acid, vernolic acid, cis-5-eicosenoic acid, brassidic acid, and nervonic acid, are preferred.

Even more preferably, the one or more fatty acids with at least one C═C double bond functionality are selected from oleic acid, linoleic acid, linolenic acid and palmitoleic acid, wherein the one or more fatty acids are preferably selected from oleic acid, linoleic acid and linolenic acid, and even more preferred it is oleic acid.

It is preferred that the one or more fatty acids with at least one C═C double bond functionality are a mixture of at least 2, preferably at least 3, more preferably at least 4, even more preferably at least 5, fatty acids with at least one C═C double bond functionality.

It is further preferred that the one or more fatty acids with at least one C═C double bond functionality comprise at least 70 mol-%, preferably at least 85 mol-%, more preferably at least 90 mol-% of one or more, preferably two or three, selected from oleic acid, linoleic acid and linolenic acid. Such fatty acid mixtures can be obtained, for example, from so-called "high oleic sunflower oil" by means of hydrolysis. It is preferred that the mixture comprises at least 40 mol-%, at least 50 mol-% or even at least 60 mol-%, but 90 mol-% or less, preferably 80 mol-% or less of oleic acid, based on all fatty acids with at least one C═C double bond functionality.

The unsaturated fatty acids used in the present invention can be obtained in particular by means of hydrolysis of triglycerides (fats, oils, etc.). For this purpose, the alkaline saponification or hydrolysis of trigylcerides as well as the enzymatic hydrolysis of the ester groups can be used. Preferred triglycerides for the purposes of the present invention are selected from the group consisting of rapeseed oil, sunflower oil, soybean oil, olive oil, castor oil, safflower oil, crambe oil, linseed oil, jatropha oil, palm oil, sea animal oils, sesame oil, beef tallow, peanut oil, lard, consumed frying oil, consumed hydraulic oil, and consumed industrial oil. It is to be understood that these oils naturally usually represent a mixture of triglycerides. Triglycerides with a high proportion of oleic acid are preferred. These oils or triglycerides can be used individually or as a mixture. The use of a mixture of two or more oils may be desired to adjust a desired fatty acid ratio.

Unless expressly stated otherwise, all unsaturated fatty acids specified herein are preferably unsaturated fatty acids in which at least one double bond, preferably all double bonds, have a cis conformation.

The Biotechnological Addition of H$_2$O

The biotechnological addition of H$_2$O for the purposes of the present invention relates to the addition of H$_2$O to a non-aromatic, and preferably non-conjugated, C═C double bond under mediation (in particular catalysis) of a protein.

By means of the biotechnological H$_2$O addition, for example, a partial structural unit

can be converted into a partial structural unit

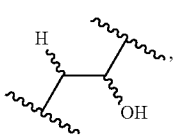

wherein the carboxy group of the fatty acid can be to the left or the right of the partial structural units shown. However, it is preferred that the carboxy group of the fatty acid is to the left of the partial structural units shown. In other words, it is preferred that the C═C double bond is hydrated in such a way that the hydroxy group formed by the hydration is located on the carbon atom that was previously the one of the two carbon atoms of the C═C double bond which was further away from the carboxy group. For example, if the fatty acid with at least one C═C double bond functionality was a 9-octadecenoic acid, the product is preferably a 10-hydroxyoctadecanoic acid.

Depending on the biotechnological H$_2$O addition mechanism used and the configuration of the double bond in the substrate, the resulting alcoholic OH group may have the stereo configuration R or S or be any mixture of R and S. It is preferred that to a degree of 80 mol-% or more, the biotechnological H$_2$O addition leads to only R or only S configuration. More preferably, to a degree of 50 mol-% or more, 70 mol-% or more, 90 mol-% or more or even 95 mol-% or more, the biotechnological H$_2$O addition leads to only R configuration. By means of such a degree of selectivity of the biotechnological H$_2$O addition, more uniform hydroxy fatty acids can be obtained as products, which in turn allow the production of more uniform and more clearly defined polyurethane products.

The term "protein" as used herein refers to polypeptides (i.e. compounds with at least 9 peptide bonds, wherein a peptide bond describes an amide bond between the carboxy group of an amino acid and the amino group of the a carbon atom ((C atom) of another amino acid) with at least 10 amino acids, preferably at least 50 amino acids, preferably at least 100 amino acids, even more preferably at least 200 amino acids. These polypeptides preferably comprise no more than 50,000 amino acids, more preferably no more than 20,000 amino acids, more preferably no more than 10,000 amino acids, more preferably no more than 5,000 amino acids, most preferably no more than 1,000 amino acids.

The biotechnological H$_2$O addition for the purposes of the present invention refers to the addition of H$_2$O to a non-aromatic, and preferably non-conjugated, C═C double bond under mediation of a hydratase. The suitability of such enzymes for the hydration of unsaturated fatty acids under mild reaction conditions and using water as both a reagent and also a cost-effective and environmentally friendly solvent is known. Such hydratases suitable for water attachment to unsaturated fatty acids are known as so-called fatty acid hydratases and the state of the science and the art in this field was recently described, for example, in a detailed review article (J. Löwe, H. Gröger, "Fatty Acid Hydratases: Versatile Catalysts to Access Hydroxy Fatty Acids in Efficient Syntheses of Industrial Interest", *Catalysts* 2020, 10, 287; DOI: 10.3390/catal10030287).

In the present case, a biotechnological H$_2$O addition is used since it can provide more uniform products and proceeds under milder reaction conditions than is the case with a typical chemical hydration. For example, a biotechnological H$_2$O addition can lead to a hydration of a specific double bond (if several double bonds per fatty acid molecule are present). In addition, as described above, a biotechnological H$_2$O addition can lead to stereoselective hydration. These effects result in a usually very high purity of the hydroxy fatty acids obtained, and, in particular, the amounts of regioisomers and stereoisomers can be kept low. This makes it possible to obtain polyurethanes whose properties can be adjusted with a high degree of precision and consistency.

It is known from the literature that many bio-based raw materials have an insufficiently uniform and/or unsuitable OH functionality per molecule. Such raw materials can only be integrated into a polyurethane network partially or very irregularly. In addition, typical accompanying substances vary greatly depending on the origin of the raw material and can damage and/or contaminate plants during industrial production and processing. Enzymatic modifications offer the possibility to evenly adjust a raw material at a low temperature, preferably with water as a solvent and with little to no impurities.

The problem with the established chemical synthesis pathways is that a hydration of unsaturated C=C groups is always provided for with additional, chemical or chemo-enzymatic measures, i.e. always with a combination of established measures. For example, for the production of plant-based polyols, 'Plant Oils as Platform Chemicals for Polyurethane Synthesis' (Biomacromolecules 2010, 11, 2825-2835), suggests to chemically introduce an acid group, reduce it with $NaBH_4$ and then hydrogenate remaining double bonds with a platinum catalyst. The products of such syntheses are therefore always present as a mixture of different isomers and products. Even after chemical fractionation, the fractions still contain irregular proportions of stereoisomers. The polymeric products accessible in this way are irregular in their bulk structure and the bulk properties fluctuate. Precise softening points, high uniform strengths or electrotechnically uniform and stable bulk properties (wherein polyurethanes are often used as so-called electronic potting compounds, in which the excellent electrical insulation properties of polyurethanes are exploited) are only accessible by way of very complex processes and at very high costs in synthesis pathways with established, technical-chemical synthesis stages.

These problems are solved by the present invention with the biotechnological $H_2O$ addition. The person skilled in the art is familiar with a variety of enzymes from a wide range of gram-negative and gram-positive bacteria (inter alia, *Bifidobacterium animalis*, *B. breve*, *Chryseobacterium gleum*, *Desulfomicrobium baculatum*, *E. meningoseptica*, *Gemella morbillorum*, *Lactobacillus acidophilus*, *L. hammesii*, *L. plantarum*, *L. reuteri*, *L. rhamnosus*, *L. spicheri*, *Lysinibacillus fusiformis*, *Macrococcus caseolyticus*, *Rhodococcus erythropolis*, *Stenotrophomonas maltophilia*, *S. nitritireducens*, *Streptococcus pyogenes*), which were recombinantly expressed, characterized and identified as oleic acid hydratases (OAH), linoleic acid hydratases (LAH) or general fatty acid hydratases (listed on page 25 of the dissertation of Rebecca M. Demming at Faculty 4 of the University of Stuttgart of Mar. 22, 2018 with the title "Enzymatic hydration of short-chain fatty acids and alkenes").

Furthermore, in 2016, a hydratase database (Hydratase Engineering Database; URL: https://hyed.biocatnet.de/) was created with 2046 sequences of known or putative hydratases. The majority of these hydratases are bacterial proteins, but 103 and 24 sequences of fungi and archaea, respectively, were included as well. Consequently, a variety of hydratases are known to the person skilled in the art, with the help of which monounsaturated or polyunsaturated fatty acids can be hydrated one or multiple times.

In the method of the present invention, an oleic acid hydratase of the organism *Stenotrophomonas nitritireducens* is preferably used, which is described by Kang et al. in Biotechnology and Bioengineering, 2017, 114, 74-82. It can be used as a crude extract, in the form of whole cells, as a lyophilisate or in immobilized form. Enzyme immobilization is a versatile tool for optimizing catalyst conditions. Advantages such as the increase in stability, the reusability of the supported enzyme as well as a better separation of the enzyme and the desired product can be mentioned. The known methods for enzyme immobilization are the binding to a carrier, the inclusion or the crosslinking of enzymes (R. A. Sheldon and S. van Pelt, Enzyme immobilization in biocatalysis: why, what and how, *Chemical Society Reviews*, 2013, 42, 6223-6235). More preferably, the Sn-Ohy hydratase of the organism *Stenotrophomonas nitritireducens* is used. In the examples relevant to the invention, this biocatalyst was used for the hydration of oleic acid as a substrate component. At the same time, the skilled person is free in the choice of hydratase and will preferably use those hydratases that are most suitable for the respective substrate. Detailed descriptions of the substrate spectrum of the respective hydratases are available in the literature. For example, in addition to oleic acid, linolenic acid is also known as suitable substrate, wherein another fatty acid hydratase tailored precisely to linolenic acid can also be used for this purpose. An overview of such fatty acid hydratases is given, for example, in the following review article: J. Löwe, H. Gröger, "Fatty Acid Hydratases: Versatile Catalysts to Access Hydroxy Fatty Acids in Efficient Syntheses of Industrial Interest", Catalysts 2020, 10, 287; DOI: 10.3390/catal10030287.

Preferably, the hydration is carried out by means of a hydratase, wherein the concentration of the one or more fatty acids with at least one C=C double bond is maintained in a range, wherein the minimum value of the range is selected from the group consisting of 100 g/L, 150 g/L, 200 g/L, and the optional maximum value is preferably selected from the group consisting of 250 g/L, 280 g/L, 300 g/L. It is particularly preferred that the concentration of the one or more fatty acids having at least one C=C double bond is in a range of 200 to 300 g/L.

Examples of suitable buffers for the hydration of fatty acids include:
  Citrate buffer (50 mM; pH 3.0-4.0),
  Sodium succinate buffer (50 mM; pH 4.0-6.0),
  KPB buffer (50 mM; pH 5.0-8.0),
  Tris-HCl buffer (50 mM; pH 7.0-9.0).

Preferred buffers for hydration of fatty acids in the preferred pH range of 5.5-7.5 have been described, for example, by Kim et al., *Appl. Microbiol. Biotechnol.* 2012, 95 (4), 929-937; Takeuchi et al., *J. Biosci. Bioeng.* 2015, 119 (6), 636-641; Park et al., *J. Biotechnol.* 2015, 208, 1-10). These include in particular:
  Phosphate buffer (Park et al., *J Biotechnol.* 2015, 208, 1-10),
  TRIS-HCl (Jo et al., *J Agric. Food Chem.* 2014, 62 (28), 6736-6745),
  Citrate buffer (Park et al., *J Biotechnol.* 2015, 208, 1-10; Kang et al., *Biotechnol. Bioeng.* 2017, 114 (1), 74-82),
  HEPES buffer (Kang et al., *Appl. Environ. Microbiol.* 2017, 83 (9)), and
  PIPES buffer (Seo et al., *Appl. Microbiol. Biotechnol.* 2013, 97 (20), 8987-8995).

In all of the above buffer systems, a salt concentration of the buffers of 50 mM or 100 mM is preferred.

In a preferred embodiment, a recombinant enzyme is used as the enzyme in the synthesis, which is at least one recombinant enzyme selected from the group consisting of hydratase from *Streptococcus pyogenes*; hydratase from *Elizabethkingia Meningoseptica*; proteins with a structure homologous to *Elizabethkingia meningoseptica* selected from at least one source of the group of sources consisting of *Psychroflexus torquis*, *Rhodopseudomonas palustris*, *Lactobacillus plantarum*, *Lactobacillus acidophilus*, *Stenotrophomonas nitritireducens*, *Lactobacillus rhamnosus*, *Lysinibacillus fusiformis*, *Macrococcus caseolyticus*, *Stenotrophomas maltophilia*, *Bifidobacterium breve*, *Bifidobacterium animalis*.

Examples of suitable host organisms as expression strains are bacterial systems such as *Escherichia coli*, *Corynebacterium glutamicum* or eucaryotic systems/yeasts such as *Saccharomyces cerevisiae* or *Pichia pastoris*.

In a preferred embodiment of the synthesis, at least one of the enzymes is subjected to at least one modification in preparation. The at least one modification is selected from the group of measures consisting of molecular weight increase of the enzyme; immobilization of the enzyme; immobilization of the enzyme on a particulate carrier easily separated from liquid phases; immobilization of the enzyme on a particulate carrier comprising superparamagnetic nanoparticles which enable a magnetic separation of the carriers; immobilization of the enzyme on a polymeric carrier based on acrylate; immobilization of the enzyme in a ion exchang-carrier matrix; immobilization of the enzyme on a polyparticulate, cross-linked composite material support; immobilization of the enzyme on a layered silicate; immobilization of cells producing or containing the enzyme on a carrier; immobilization of the enzyme on a bio-based silicate scaffold; hydrophilization of the enzyme with an hydrophilic anchor group; oleophilization of the enzyme with an oleophilic anchor group; genetic modification by inserting at least one mutation; genetic modification by inserting at least one sequence of a hydrophobic group; genetic modification by inserting at least one sequence of a hydrophilic group; genetic modification of the partial sequence that defines the active pocket of an enzyme; fusion of the gene sequence of the enzyme with a transport-active, membrane-permeative protein gene sequence; fusion of the gene sequence of the enzyme with another enzyme gene sequence; fusion of the gene sequence of a hydratase with a lipase gene sequence; fusion of the gene sequence of an enzyme with a stabilizing protein gene sequence from an extremophilic host organism, thereby increasing thermal resistance, shear resistance, salt resistance and pH resistance; increasing the thermal resistance of an enzyme; fusion of the gene sequence of an enzyme with an amphiphilic protein gene sequence increasing solubility in various media; randomized mutation, screening and selection; selective mutation of the polar section of the active pocket; selective mutation of the hydrophobic section of the active pocket; selective mutation of the terminal-hydrophilic sections of the enzyme; micellization of the enzyme in a cascade of lipid layers with respective changes from lipophilia to hydrophilia of the outward-pointing end groups, wherein preferably outward-pointing, transport-promoting anchor groups support permeation through phase boundaries; expression and/or provision of the enzyme in permeabilized cells; expression and/or provision of the enzyme in periplasmatically expressing cells.

The One or More Hydroxy Fatty Acids

The one or more hydroxy fatty acids obtained by the method according to the present invention preferably only differ from the one or more fatty acids with at least one C=C double bond in that at least one (preferably one) of the at least one C=C double bonds is hydrated in the fatty acids, i.e. that a partial structural unit

has been converted into a partial structural unit

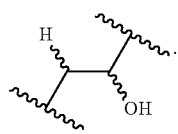

If several C=C double bonds per fatty acid molecule are present, it is preferred that only one of the C=C double bonds per fatty acid molecule is hydrated.

Preferred examples of hydroxy fatty acids include in particular 3-hydroxy-hexanoic acid, 4-hydroxy-hexanoic acid, 5-hydroxy-hexanoic acid, 6-hydroxy-hexanoic acid, 3-hydroxy-heptanoic acid, 4-hydroxy-heptanoic acid, 5-hydroxy-heptanoic acid, 6-hydroxy-heptanoic acid, 7-hydroxy-heptanoic acid, 3-hydroxy-octanoic acid, 4-hydroxy-octanoic acid, 5-hydroxy-octanoic acid, 6-hydroxy-octanoic acid, 7-hydroxy-octanoic acid, 8-hydroxy-octanoic acid, 3-hydroxy-nonanoic acid, 4-hydroxy-nonanoic acid, 5-hydroxy-nonanoic acid, 6-hydroxy-nonanoic acid, 7-hydroxy-nonanoic acid, 8-hydroxy-nonanoic acid, 9-hydroxy-nonanoic acid, 3-hydroxy-decanoic acid, 4-hydroxy-decanoic acid, 5-hydroxy-decanoic acid, 6-hydroxy-decanoic acid, 7-hydroxy-decanoic acid, 8-hydroxy-decanoic acid, 9-hydroxy-decanoic acid, 10-hydroxy-decanoic acid, 3-hydroxy-undecanoic acid, 4-hydroxy-undecanoic acid, 5-hydroxy-undecanoic acid, 6-hydroxy-undecanoic acid, 7-hydroxy-undecanoic acid, 8-hydroxy-undecanoic acid, 9-hydroxy-undecanoic acid, 10-hydroxy-undecanoic acid, 11-hydroxy-undecanoic acid, 3-hydroxy-dodecanoic acid, 4-hydroxy-dodecanoic acid, 5-hydroxy-dodecanoic acid, 6-hydroxy-dodecanoic acid, 7-hydroxy-dodecanoic acid, 8-hydroxy-dodecanoic acid, 9-hydroxy-dodecanoic acid, 10-hydroxy-dodecanoic acid, 11-hydroxy-dodecanoic acid, 12-hydroxy-dodecanoic acid, 3-hydroxy-tridecanoic acid, 4-hydroxy-tridecanoic acid, 5-hydroxy-tridecanoic acid, 6-hydroxy-tridecanoic acid, 7-hydroxy-tridecanoic acid, 8-hydroxy-tridecanoic acid, 9-hydroxy-tridecanoic acid, 10-hydroxy-tridecanoic acid, 11-hydroxy-tridecanoic acid, 12-hydroxy-tridecanoic acid, 13-hydroxy-tridecanoic acid, 3-hydroxy-tetradecanoic acid, 4-hydroxy-tetradecanoic acid, 5-hydroxy-tetradecanoic acid, 6-hydroxy-tetradecanoic acid, 7-hydroxy-tetradecanoic acid, 8-hydroxy-tetradecanoic acid, 9-hydroxy-tetradecanoic acid, 10-hydroxy-tetradecanoic acid, 11-hydroxy-tetradecanoic acid, 12-hydroxy-tetradecanoic acid, 13-hydroxy-tetradecanoic acid, 14-hydroxy-tetradecanoic acid, 3-hydroxy-pentadecanoic acid, 4-hydroxy-pentadecanoic acid, 5-hydroxy-pentadecanoic acid, 6-hydroxy-pentadecanoic acid, 7-hydroxy-pentadecanoic acid, 8-hydroxy-pentadecanoic acid, 9-hydroxy-pentadecanoic acid, 10-hydroxy-pentadecanoic acid, 11-hydroxy-pentadecanoic acid, 12-hydroxy-pentadecanoic acid, 13-hydroxy-pentadecanoic acid, 14-hydroxy-pentadecanoic acid, 15-hydroxy-pentadecanoic acid, 3-hydroxy-hexadecanoic acid, 4-hydroxy-hexadecanoic acid, 5-hydroxy-hexadecanoic acid, 6-hydroxy-hexadecanoic acid, 7-hydroxy-hexadecanoic acid, 8-hydroxy-hexadecanoic acid, 9-hydroxy-hexadecanoic acid, 10-hydroxy-hexadecanoic acid, 11-hydroxy-hexadecanoic acid, 12-hydroxy-hexadecanoic acid, 13-hydroxy-hexadecanoic acid, 14-hydroxy-hexadecanoic acid, 15-hydroxy-hexadecanoic acid, 16-hydroxy-hexadecanoic acid, 3-hydroxy-heptadecanoic acid, 4-hydroxy-heptadecanoic acid, 5-hydroxy-heptadecanoic acid, 6-hydroxy-heptadecanoic acid, 7-hydroxy-heptadecanoic acid, 8-hydroxy-heptadecanoic acid, 9-hydroxy-heptadecanoic acid, 10-hydroxy-heptadecanoic acid, 11-hydroxy-heptadecanoic acid, 12-hydroxy-heptadecanoic acid, 13-hydroxy-heptadecanoic acid, 14-hydroxy-heptadecanoic acid, 15-hydroxy-heptadecanoic acid, 16-hydroxy-heptadecanoic acid, 17-hydroxy-heptadecanoic acid, 3-hydroxy-octadecanoic acid, 4-hydroxy-octadecanoic acid, 5-hydroxy-octadecanoic acid, 6-hydroxy-octadecanoic acid, 7-hydroxy-octadecanoic acid, 8-hydroxy-octadecanoic acid, 9-hydroxy-octadecanoic acid, 10-hydroxy-octadecanoic acid, 11-hydroxy-octadecanoic acid, 12-hydroxy-octadecanoic acid, 13-hydroxy-octadecanoic acid, 14-hydroxy-octadecanoic acid, 15-hydroxy-octadecanoic acid, 16-hydroxy-octadecanoic acid, 17-hydroxy-octadecanoic acid, 18-hydroxy-octadecanoic acid, 3-hydroxy-nonadecanoic acid, 4-hydroxy-nonadecanoic acid, 5-hydroxy-nonadecanoic acid, 6-hydroxy-nonadecanoic acid, 7-hydroxy-nonadecanoic acid, 8-hydroxy-nonadecanoic acid, 9-hydroxy-nonadecanoic acid, 10-hydroxy-nonadecanoic acid, 11-hydroxy-nonadecanoic acid, 12-hydroxy-nonadecanoic acid, 13-hydroxy-nonadecanoic acid, 14-hydroxy-nonadecanoic acid, 15-hydroxy-nonadecanoic acid, 16-hydroxy-nonadecanoic acid, 17-hydroxy-nonadecanoic acid, 18-hydroxy-nonadecanoic acid, 19-hydroxy-nonadecanoic acid, 3-hydroxy-icosananoic acid, 4-hydroxy-icosananoic acid, 5-hydroxy-icosananoic acid, 6-hydroxy-icosananoic acid, 7-hydroxy-icosananoic acid, 8-hydroxy-icosananoic acid, 9-hydroxy-icosananoic acid, 10-hydroxy-icosananoic acid, 11-hydroxy-icosananoic acid, 12-hydroxy-icosananoic acid, 13-hydroxy-icosananoic acid, 14-hydroxy-icosananoic acid, 15-hydroxy-icosananoic acid, 16-hydroxy-icosananoic acid, 17-hydroxy-icosananoic acid, 18-hydroxy-icosananoic acid, 19-hydroxy-icosananoic acid, 20-hydroxy-icosananoic acid, 3-hydroxy-heneicosanoic acid, 4-hydroxy-heneicosanoic acid, 5-hydroxy-heneicosanoic acid, 6-hydroxy-heneicosanoic acid, 7-hydroxy-heneicosanoic acid, 8-hydroxy-heneicosanoic acid, 9-hydroxy-heneicosanoic acid, 10-hydroxy-heneicosanoic acid, 11-hydroxy-heneicosanoic acid, 12-hydroxy-heneicosanoic acid, 13-hydroxy-heneicosanoic acid, 14-hydroxy-heneicosanoic acid, 15-hydroxy-heneicosanoic acid, 16-hydroxy-heneicosanoic acid, 17-hydroxy-heneicosanoic acid, 18-hydroxy-heneicosanoic acid, 19-hydroxy-heneicosanoic acid, 20-hydroxy-heneicosanoic acid, 21-hydroxy-heneicosanoic acid, 3-hydroxy-docosanoic acid, 4-hydroxy-docosanoic acid, 5-hydroxy-docosanoic acid, 6-hydroxy-docosanoic acid, 7-hydroxy-docosanoic acid, 8-hydroxy-docosanoic acid, 9-hydroxy-docosanoic acid, 10-hydroxy-docosanoic acid, 11-hydroxy-docosanoic acid, 12-hydroxy-docosanoic acid, 13-hydroxy-docosanoic acid, 14-hydroxy-docosanoic acid, 15-hydroxy-docosanoic acid, 16-hydroxy-docosanoic acid, 17-hydroxy-docosanoic acid, 18-hydroxy-docosanoic acid, 19-hydroxy-docosanoic acid, 20-hydroxy-docosanoic acid, 21-hydroxy-docosanoic acid, 22-hydroxy-docosanoic acid, 3-hydroxy-tricosanoic acid, 4-hydroxy-tricosanoic acid, 5-hydroxy-tricosanoic acid, 6-hydroxy-tricosanoic acid, 7-hydroxy-tricosanoic acid, 8-hydroxy-tricosanoic acid, 9-hydroxy-tricosanoic acid, 10-hydroxy-tricosanoic acid, 11-hydroxy-tricosanoic acid, 12-hydroxy-tricosanoic acid, 13-hydroxy-tricosanoic acid, 14-hydroxy-tricosanoic acid, 15-hydroxy-tricosanoic acid, 16-hydroxy-tricosanoic acid, 17-hydroxy-tricosanoic acid, 18-hydroxy-tricosanoic acid, 19-hydroxy-tricosanoic acid, 20-hydroxy-tricosanoic acid, 21-hydroxy-tricosanoic acid, 22-hydroxy-tricosanoic acid, 23-hydroxy-tricosanoic acid, 3-hydroxy-tetracosanoic acid, 4-hydroxy-tetracosanoic acid, 5-hydroxy-tetracosanoic acid, 6-hydroxy-tetracosanoic acid, 7-hydroxy-tetracosanoic acid, 8-hydroxy-tetracosanoic acid, 9-hydroxy-tetracosanoic acid, 10-hydroxy-tetracosanoic acid, 11-hydroxy-tetracosanoic acid, 12-hydroxy-tetracosanoic acid, 13-hydroxy-tetracosanoic acid, 14-hydroxy-tetracosanoic acid, 15-hydroxy-tetracosanoic acid, 16-hydroxy-tetracosanoic acid, 17-hydroxy-tetracosanoic acid, 18-hydroxy-tetracosanoic acid, 19-hydroxy-tetracosanoic acid, 20-hydroxy-tetracosanoic acid, 21-hydroxy-tetracosanoic acid, 22-hydroxy-tetracosanoic acid, 23-hydroxy-tetracosanoic acid, 24-hydroxy-tetracosanoic acid, 3-hydroxy-pentacosanoic acid, 4-hydroxy-pentacosanoic acid, 5-hydroxy-pentacosanoic acid, 6-hydroxy-pentacosanoic acid, 7-hydroxy-pentacosanoic acid, 8-hydroxy-pentacosanoic acid, 9-hydroxy-pentacosanoic acid, 10-hydroxy-pentacosanoic acid, 11-hydroxy-pentacosanoic acid, 12-hydroxy-pentacosanoic acid, 13-hydroxy-pentacosanoic acid, 14-hydroxy-pentacosanoic acid, 15-hydroxy-pentacosanoic acid, 16-hydroxy-pentacosanoic acid, 17-hydroxy-pentacosanoic acid, 18-hydroxy-pentacosanoic acid, 19-hydroxy-pentacosanoic acid, 20-hydroxy-pentacosanoic acid, 21-hydroxy-pentacosanoic acid, 22-hydroxy-pentacosanoic acid, 23-hydroxy-pentacosanoic acid, 24-hydroxy-pentacosanoic acid, 25-hydroxy-pentacosanoic acid, 3-hydroxy-hexacosanoic acid, 4-hydroxy-hexacosanoic acid, 5-hydroxy-hexacosanoic acid, 6-hydroxy-hexacosanoic acid, 7-hydroxy-hexacosanoic acid, 8-hydroxy-hexacosanoic acid, 9-hydroxy-hexacosanoic acid, 10-hydroxy-hexacosanoic acid, 11-hydroxy-hexacosanoic acid, 12-hydroxy-hexacosanoic acid, 13-hydroxy-hexacosanoic acid, 14-hydroxy-hexacosanoic acid, 15-hydroxy-hexacosanoic acid, 16-hydroxy-hexacosanoic acid, 17-hydroxy-hexacosanoic acid, 18-hydroxy-hexacosanoic acid, 19-hydroxy-hexacosanoic acid, 20-hydroxy-hexacosanoic acid, 21-hydroxy-hexacosanoic acid, 22-hydroxy-hexacosanoic acid, 23-hydroxy-hexacosanoic acid, 24-hydroxy-hexacosanoic acid, 25-hydroxy-hexacosanoic acid, 26-hydroxy-hexacosanoic acid, 3-hydroxy-heptacosanoic acid, 4-hydroxy-heptacosanoic acid, 5-hydroxy-heptacosanoic acid, 6-hydroxy-heptacosanoic acid, 7-hydroxy-heptacosanoic acid, 8-hydroxy-heptacosanoic acid, 9-hydroxy-heptacosanoic acid, 10-hydroxy-heptacosanoic acid, 11-hydroxy-heptacosanoic acid, 12-hydroxy-heptacosanoic acid, 13-hydroxy-heptacosanoic acid, 14-hydroxy-heptacosanoic acid, 15-hydroxy-heptacosanoic acid, 16-hydroxy-heptacosanoic acid, 17-hydroxy-heptacosanoic acid, 18-hydroxy-heptacosanoic acid, 19-hydroxy-heptacosanoic acid, 20-hydroxy-heptacosanoic acid, 21-hydroxy-heptacosanoic acid, 22-hydroxy-heptacosanoic acid, 23-hydroxy-heptacosanoic acid, 24-hydroxy-heptacosanoic acid, 25-hydroxy-heptacosanoic acid, 26-hydroxy-heptacosanoic acid, 27-hydroxy-heptacosanoic acid, 3-hydroxy-octacosanoic acid, 4-hydroxy-octacosanoic acid, 5-hydroxy-octacosanoic acid, 6-hydroxy-octacosanoic acid, 7-hydroxy-octacosanoic acid, 8-hydroxy-octacosanoic acid, 9-hydroxy-octacosanoic acid, 10-hydroxy-octacosanoic acid, 11-hydroxy-octacosanoic acid, 12-hydroxy-octacosanoic acid, 13-hydroxy-octacosanoic acid, 14-hydroxy-octacosanoic acid, 15-hydroxy-octacosanoic acid, 16-hydroxy-octacosanoic acid, 17-hydroxy-octacosanoic acid, 18-hydroxy-octacosanoic acid, 19-hydroxy-octacosanoic acid, 20-hydroxy-octacosanoic acid, 21-hydroxy-octacosanoic acid, 22-hydroxy-octacosanoic acid, 23-hydroxy-octacosanoic acid, 24-hydroxy-octacosanoic acid, 25-hydroxy-octacosanoic acid, 26-hydroxy-octacosanoic acid, 27-hydroxy-octacosanoic acid, 28-hydroxy-octacosanoic acid, 3-hydroxy-nonacosanoic acid, 4-hydroxy-nonacosanoic acid, 5-hydroxy-nonacosanoic acid, 6-hydroxy-nonacosanoic acid, 7-hydroxy-nonacosanoic acid, 8-hydroxy-nonacosanoic acid, 9-hydroxy-nonacosanoic acid, 10-hydroxy-nonacosanoic acid, 11-hydroxy-nonacosanoic acid, 12-hydroxy-nonacosanoic acid, 13-hydroxy-nonacosanoic acid, 14-hydroxy-nonacosanoic acid, 15-hydroxy-nonacosanoic acid, 16-hydroxy-nonacosanoic acid, 17-hydroxy-nonacosanoic acid, 18-hydroxy-nonacosanoic acid, 19-hydroxy-nonacosanoic acid, 20-hydroxy-nonacosanoic acid, 21-hydroxy-nonacosanoic acid, 22-hydroxy-nonacosanoic acid, 23-hydroxy-nonacosanoic acid, 24-hydroxy-nonacosanoic acid, 25-hydroxy-nonacosanoic acid, 26-hydroxy-nonacosanoic acid, 27-hydroxy-nonacosanoic acid, 28-hydroxy-nonacosanoic acid, 29-hydroxy-nonacosanoic acid, 3-hydroxy-triacontanoic acid, 4-hydroxy-triacontanoic acid, 5-hydroxy-triacontanoic acid, 6-hydroxy-triacontanoic acid, 7-hydroxy-triacontanoic acid, 8-hydroxy-triacontanoic acid, 9-hydroxy-triacontanoic acid, 10-hydroxy-triacontanoic acid, 11-hydroxy-triacontanoic acid, 12-hydroxy-triacontanoic acid, 13-hydroxy-triacontanoic acid, 14-hydroxy-triacontanoic acid, 15-hydroxy-triacontanoic acid, 16-hydroxy-triacontanoic acid, 17-hydroxy-triacontanoic acid, 18-hydroxy-triacontanoic acid, 19-hydroxy-triacontanoic acid, 20-hydroxy-triacontanoic acid, 21-hydroxy-triacontanoic acid, 22-hydroxy-triacontanoic acid, 23-hydroxy-triacontanoic acid, 24-hydroxy-triacontanoic acid, 25-hydroxy-triacontanoic acid, 26-hydroxy-triacontanoic acid, 27-hydroxy-triacontanoic acid, 28-hydroxy-triacontanoic acid, 29-hydroxy-triacontanoic acid, 30-hydroxy-triacontanoic acid.

In these, each hydroxy group can have an R or S configuration, preferably R. The above alkanoic acids are preferably linear alkanoic acids (n-alkanoic acids).

Preferred examples of fatty acids with two hydroxy groups include hydroxy fatty acids as listed above which comprise an additional hydroxy group. It is preferred that the first (or only) hydroxy group is located at $C_{10}$ (or further away from the carboxyl group). In addition, it is preferred that the hydroxy group furthest away from the carboxyl group is not a terminal hydroxy group. Accordingly, particularly preferred hydroxy fatty acids with one or two hydroxy group(s) are those selected from 10-hydroxy-undecanoic acid, 10-hydroxy-dodecanoic acid, 11-hydroxy-dodecanoic acid, 10-hydroxy-tridecanoic acid, 11-hydroxy-tridecanoic acid, 12-hydroxy-tridecanoic acid, 10-hydroxy-tetradecanoic acid, 11-hydroxy-tetradecanoic acid, 12-hydroxy-tetradecanoic acid, 13-hydroxy-tetradecanoic acid, 10-hydroxy-pentadecanoic acid, 11-hydroxy-pentadecanoic acid, 12-hydroxy-pentadecanoic acid, 13-hydroxy-pentadecanoic acid, 14-hydroxy-pentadecanoic acid, 10-hydroxy-hexadecanoic acid, 11-hydroxy-hexadecanoic acid, 12-hydroxy-hexadecanoic acid, 13-hydroxy-hexadecanoic acid, 14-hydroxy-hexadecanoic acid, 15-hydroxy-hexadecanoic acid, 10-hydroxy-heptadecanoic acid, 11-hydroxy-heptadecanoic acid, 12-hydroxy-heptadecanoic acid, 13-hydroxy-heptadecanoic acid, 14-hydroxy-heptadecanoic acid, 15-hydroxy-heptadecanoic acid, 16-hydroxy-heptadecanoic acid, 10-hydroxy-octadecanoic acid, 11-hydroxy-octadecanoic acid, 12-hydroxy-octadecanoic acid, 13-hydroxy-octadecanoic acid, 14-hydroxy-octadecanoic acid, 15-hydroxy-octadecanoic acid, 16-hydroxy-octadecanoic acid, 17-hydroxy-octadecanoic acid, 10-hydroxy-nonadecanoic acid, 11-hydroxy-nonadecanoic acid, 12-hydroxy-nonadecanoic acid, 13-hydroxy-nonadecanoic acid, 14-hydroxy-nonadecanoic acid, 15-hydroxy-nonadecanoic acid, 16-hydroxy-nonadecanoic acid, 17-hydroxy-nonadecanoic acid, 18-hydroxy-nonadecanoic acid, 10-hydroxy-icosananoic acid, 11-hydroxy-icosananoic acid, 12-hydroxy-icosananoic acid, 13-hydroxy-icosananoic acid, 14-hydroxy-icosananoic acid, 15-hydroxy-icosananoic acid, 16-hydroxy-icosananoic acid, 17-hydroxy-icosananoic acid, 18-hydroxy-icosananoic acid, 19-hydroxy-icosananoic acid, 10-hydroxy-heneicosanoic acid, 11-hydroxy-heneicosanoic acid, 12-hydroxy-heneicosanoic acid, 13-hydroxy-heneicosanoic acid, 14-hydroxy-heneicosanoic acid, 15-hydroxy-heneicosanoic acid, 16-hydroxy-heneicosanoic acid, 17-hydroxy-heneicosanoic acid, 18-hydroxy-heneicosanoic acid, 19-hydroxy-heneicosanoic acid, 20-hydroxy-heneicosanoic acid, 10-hydroxy-docosanoic acid, 11-hydroxy-docosanoic acid, 12-hydroxy-docosanoic acid, 13-hydroxy-docosanoic acid, 14-hydroxy-docosanoic acid, 15-hydroxy-docosanoic acid, 16-hydroxy-docosanoic acid, 17-hydroxy-docosanoic acid, 18-hydroxy-docosanoic acid, 19-hydroxy-docosanoic acid, 20-hydroxy-docosanoic acid, 21-hydroxy-docosanoic acid, 10-hydroxy-tricosanoic acid, 11-hydroxy-tricosanoic acid, 12-hydroxy-tricosanoic acid, 13-hydroxy-tricosanoic acid, 14-hydroxy-tricosanoic acid, 15-hydroxy-tricosanoic acid, 16-hydroxy-tricosanoic acid, 17-hydroxy-tricosanoic acid, 18-hydroxy-tricosanoic acid, 19-hydroxy-tricosanoic acid, 20-hydroxy-tricosanoic acid, 21-hydroxy-tricosanoic acid, 22-hydroxy-tricosanoic acid, 10-hydroxy-tetracosanoic acid, 11-hydroxy-tetracosanoic acid, 12-hydroxy-tetracosanoic acid, 13-hydroxy-tetracosanoic acid, 14-hydroxy-tetracosanoic acid, 15-hydroxy-tetracosanoic acid, 16-hydroxy-tetracosanoic acid, 17-hydroxy-tetracosanoic acid, 18-hydroxy-tetracosanoic acid, 19-hydroxy-tetracosanoic acid, 20-hydroxy-tetracosanoic acid, 21-hydroxy-tetracosanoic acid, 22-hydroxy-tetracosanoic acid, 23-hydroxy-tetracosanoic acid, 10-hydroxy-pentacosanoic acid, 11-hydroxy-pentacosanoic acid, 12-hydroxy-pentacosanoic acid, 13-hydroxy-pentacosanoic acid, 14-hydroxy-pentacosanoic acid, 15-hydroxy-pentacosanoic acid, 16-hydroxy-pentacosanoic acid, 17-hydroxy-pentacosanoic acid, 18-hydroxy-pentacosanoic acid, 19-hydroxy-pentacosanoic acid, 20-hydroxy-pentacosanoic acid, 21-hydroxy-pentacosanoic acid, 22-hydroxy-pentacosanoic acid, 23-hydroxy-pentacosanoic acid, 24-hydroxy-pentacosanoic acid, 10-hydroxy-hexacosanoic acid, 11-hydroxy-hexacosanoic acid, 12-hydroxy-hexacosanoic acid, 13-hydroxy-hexacosanoic acid, 14-hydroxy-hexacosanoic acid, 15-hydroxy-hexacosanoic acid, 16-hydroxy-hexacosanoic acid, 17-hydroxy-hexacosanoic acid, 18-hydroxy-hexacosanoic acid, 19-hydroxy-hexacosanoic acid, 20-hydroxy-hexacosanoic acid, 21-hydroxy-hexacosanoic acid, 22-hydroxy-hexacosanoic acid, 23-hydroxy-hexacosanoic acid, 24-hydroxy-hexacosanoic acid, 25-hydroxy-hexacosanoic acid, 10-hydroxy-heptacosanoic acid, 11-hydroxy-heptacosanoic acid, 12-hydroxy-heptacosanoic acid, 13-hydroxy-heptacosanoic acid, 14-hydroxy-heptacosanoic acid, 15-hydroxy-heptacosanoic acid, 16-hydroxy-heptacosanoic acid, 17-hydroxy-heptacosanoic acid, 18-hydroxy-heptacosanoic acid, 19-hydroxy-heptacosanoic acid, 20-hydroxy-heptacosanoic acid, 21-hydroxy-heptacosanoic acid, 22-hydroxy-heptacosanoic acid, 23-hydroxy-heptacosanoic acid, 24-hydroxy-heptacosanoic acid, 25-hydroxy-heptacosanoic acid, 26-hydroxy-heptacosanoic acid, 10-hydroxy-octacosanoic acid, 11-hydroxy-octacosanoic acid, 12-hydroxy-octacosanoic acid, 13-hydroxy-octacosanoic acid, 14-hydroxy-octacosanoic acid, 15-hydroxy-octacosanoic acid, 16-hydroxy-octacosanoic acid, 17-hydroxy-octacosanoic acid, 18-hydroxy-octacosanoic acid, 19-hydroxy-octacosanoic acid, 20-hydroxy-octacosanoic acid, 21-hydroxy-octacosanoic acid, 22-hydroxy-octacosanoic acid, 23-hydroxy-octacosanoic acid, 24-hydroxy-octacosanoic acid, 25-hydroxy-octacosanoic acid, 26-hydroxy-octacosanoic acid, 27-hydroxy-octacosanoic acid, 10-hydroxy-nonacosanoic acid, 11-hydroxy-nonacosanoic acid, 12-hydroxy-nonacosanoic acid, 13-hydroxy-nonacosanoic acid, 14-hydroxy-nonacosanoic acid, 15-hydroxy-nonacosanoic acid, 16-hydroxy-nonacosanoic acid, 17-hydroxy-nonacosanoic acid, 18-hydroxy-nonacosanoic acid, 19-hydroxy-nonacosanoic acid, 20-hydroxy-nonacosanoic acid, 21-hydroxy-nonacosanoic acid, 22-hydroxy-nonacosanoic acid, 23-hydroxy-nonacosanoic acid, 24-hydroxy-nonacosanoic acid, 25-hydroxy-nonacosanoic acid, 26-hydroxy-nonacosanoic acid, 27-hydroxy-nonacosanoic acid, 28-hydroxy-nonacosanoic acid, 10-hydroxy-triacontanoic acid, 11-hydroxy-triacontanoic acid, 12-hydroxy-triacontanoic acid, 13-hydroxy-triacontanoic acid, 14-hydroxy-triacontanoic acid, 15-hydroxy-triacontanoic acid, 16-hydroxy-triacontanoic acid, 17-hydroxy-triacontanoic acid, 18-hydroxy-triacontanoic acid, 19-hydroxy-triacontanoic acid, 20-hydroxy-triacontanoic acid, 21-hydroxy-triacontanoic acid, 22-hydroxy-triacontanoic acid, 23-hydroxy-triacontanoic acid, 24-hydroxy-triacontanoic acid, 25-hydroxy-triacontanoic acid, 26-hydroxy-triacontanoic acid, 27-hydroxy-triacontanoic acid, 28-hydroxy-triacontanoic acid, 29-hydroxy-triacontanoic acid, 10,13-dihydroxytetradecanoic acid, 10,13-dihydroxypentadecanoic acid, 10,13-dihydroxyhexadecanoic acid, 11,14-dihydroxyhexadecanoic acid, 10,13-dihydroxyheptadecanoic acid, 11,14-dihydroxyheptadecanoic acid, 12,15-dihydroxyheptadecanoic acid, 10,13-dihydroxyoctadecanoic acid, 11,14-dihydroxyoctadecanoic acid, 12,15-dihydroxyoctadecanoic acid, 13,16-dihydroxyoctadecanoic acid, 10,13-dihydroxynonadecanoic acid, 11,14-dihydroxynonadecanoic acid, 12,15-dihydroxynonadecanoic acid, 13,16-dihydroxynonadecanoic acid, 14,17-dihydroxynonadecanoic acid, 10,13-dihydroxyicosananoic acid, 11,14-dihydroxyicosananoic acid, 12,15-dihydroxyicosananoic acid, 13,16-dihydroxyicosananoic acid, 14,17-dihydroxyicosananoic acid, 15,18-dihydroxyicosananoic acid, 10,13-dihydroxyheneicosanoic acid, 11,14-dihydroxyheneicosanoic acid, 12,15-dihydroxyheneicosanoic acid, 13,16-dihydroxyheneicosanoic acid, 14,17-dihydroxyheneicosanoic acid, 15,18-dihydroxyheneicosanoic acid, 16,19-dihydroxyheneicosanoic acid, 10,13-dihydroxydocosanoic acid, 11,14-dihydroxydocosanoic acid, 12,15-dihydroxydocosanoic acid, 13,16-dihydroxydocosanoic acid, 14,17-dihydroxydocosanoic acid, 15,18-dihydroxydocosanoic acid, 16,19-dihydroxydocosanoic acid, 17,20-dihydroxydocosanoic acid, 10,13-dihydroxytricosanoic acid, 11,14-dihydroxytricosanoic acid, 12,15-dihydroxytricosanoic acid, 13,16-dihydroxytricosanoic acid, 14,17-dihydroxytricosanoic acid, 15,18-dihydroxytricosanoic acid, 16,19-dihydroxytricosanoic acid, 17,20-dihydroxytricosanoic acid, 18,21-dihydroxytricosanoic acid, 10,13-dihydroxytetracosanoic acid, 11,14-dihydroxytetracosanoic acid, 12,15-dihydroxytetracosanoic acid, 13,16-dihydroxytetracosanoic acid, 14,17-dihydroxytetracosanoic acid, 15,18-dihydroxytetracosanoic acid, 16,19-dihydroxytetracosanoic acid, 17,20-dihydroxytetracosanoic acid, 18,21-dihydroxytetracosanoic acid, 19,22-dihydroxytetracosanoic acid, 10,13-dihydroxypentacosanoic acid, 11,14-dihydroxypentacosanoic acid, 12,15-dihydroxypentacosanoic acid, 13,16-dihydroxypentacosanoic acid, 14,17-dihydroxypentacosanoic acid, 15,18-dihydroxypentacosanoic acid, 16,19-dihydroxypentacosanoic acid, 17,20-dihydroxypentacosanoic acid, 18,21-dihydroxypentacosanoic acid, 19,22-dihydroxypentacosanoic acid, 20,23-dihydroxypentacosanoic acid, 10,13-dihydroxyhexacosanoic acid, 11,14-dihydroxyhexacosanoic acid, 12,15-dihydroxyhexacosanoic acid, 13,16-dihydroxyhexacosanoic acid, 14,17-dihydroxyhexacosanoic acid, 15,18-dihydroxyhexacosanoic acid, 16,19-dihydroxyhexacosanoic acid, 17,20-dihydroxyhexacosanoic acid, 18,21-dihydroxyhexacosanoic acid, 19,22-dihydroxyhexacosanoic acid, 20,23-dihydroxyhexacosanoic acid, 21,24-dihydroxyhexacosanoic acid, 10,13-dihydroxyheptacosanoic acid, 11,14-dihydroxyheptacosan acid, 12,15-dihydroxyheptacosan acid, 13,16-dihydroxyheptacosanoic acid, 14,17-dihydroxyheptacosan acid, 15,18-dihydroxyheptacosanoic acid, 16,19-dihydroxyheptacosanoic acid, 17,20-dihydroxyheptacosanoic acid, 18,21-dihydroxyheptacosanoic acid, 19,22-dihydroxyheptacosanoic acid, 20,23-dihydroxyheptacosan acid, 21,24-dihydroxyheptacosanoic acid, 22,25-dihydroxyheptacosanoic acid, 10,13-dihydroxyoctacosanoic acid, 11,14-dihydroxyoctacosanoic acid, 12,15-dihydroxyoctacosanoic acid, 13,16-dihydroxyoctacosanoic acid, 14,17-dihydroxyoctacosanoic acid, 15,18-dihydroxyoctacosanoic acid, 16,19-dihydroxyoctacosanoic acid, 17,20-dihydroxyoctacosanoic acid, 18,21-dihydroxyoctacosanoic acid, 19,22-dihydroxyoctacosanoic acid, 20,23-dihydroxyoctacosanoic acid, 21,24-dihydroxctyoacosanoic acid, 22,25-dihydroxyoctacosanoic acid, 23,26-dihydroxyoctacosanoic acid, 10,13-dihydroxynonacosanoic acid, 11,14-dihydroxyoctacosanoic acid, 12,15-dihydroxynonacosanoic acid, 13,16-dihydroxynonacosanoic acid, 14,17-dihydroxynonacosanoic acid, 15,18-dihydroxynonacosanoic acid, 16,19-dihydroxynonacosanoic acid, 17,20-dihydroxynonacosanoic acid, 18,21-dihydroxynonacosanoic acid, 19,22-dihydroxynonacosanoic acid, 20,23-dihydroxynonacosanoic acid, 21,24-dihydroxynonacosanoic acid, 22,25-dihydroxynonacosanoic acid, 23,26-dihydroxynonacosanoic acid, 24,27-dihydroxynonacosanoic acid, 10,13-dihydroxytriacontanoic acid, 11,14-dihydroxytriacontanoic acid, 12,15-dihydroxytriacontanoic acid, 13,16-dihydroxytriacontanoic acid, 14,17-dihydroxytriacontanoic acid, 15,18-dihydroxytriacontanoic acid, 16,19-dihydroxytriacontanoic acid, 17,20-dihydroxytriacontanoic acid, 18,21-dihydroxytriacontanoic acid, 19,22-dihydroxytriacontanoic acid, 20,23-dihydroxytriacontanoic acid, 21,24-dihydroxytriacontanoic acid, 22,25-dihydroxytriacontanoic acid, 23,26-dihydroxytriacontanoic acid, 24,27-dihydroxytriacontanoic acid, and 25,28-dihydroxytriacontanoic acid. Preferably, at least the hydroxy group closest to the carboxylic acid function, but preferably all hydroxy groups, have an R conformation. The remaining C=C double bonds preferably have a cis conformation.

Among these, the monohydroxy fatty acids are more preferred, for example 10-hydroxy-undecanoic acid, 10-hydroxy-dodecanoic acid, 11-hydroxy-dodecanoic acid, 10-hydroxy-tridecanoic acid, 11-hydroxy-tridecanoic acid, 12-hydroxy-tridecanoic acid, 10-hydroxy-tetradecanoic acid, 11-hydroxy-tetradecanoic acid, 12-hydroxy-tetradecanoic acid, 13-hydroxy-tetradecanoic acid, 10-hydroxy-pentadecanoic acid, 11-hydroxy-pentadecanoic acid, 12-hydroxy-pentadecanoic acid, 13-hydroxy-pentadecanoic acid, 14-hydroxy-pentadecanoic acid, 10-hydroxy-hexadecanoic acid, 11-hydroxy-hexadecanoic acid, 12-hydroxy-hexadecanoic acid, 13-hydroxy-hexadecanoic acid, 14-hydroxy-hexadecanoic acid, 15-hydroxy-hexadecanoic acid, 10-hydroxy-heptadecanoic acid, 11-hydroxy-heptadecanoic acid, 12-hydroxy-heptadecanoic acid, 13-hydroxy-heptadecanoic acid, 14-hydroxy-heptadecanoic acid, 15-hydroxy-heptadecanoic acid, 16-hydroxy-heptadecanoic acid, 10-hydroxy-octadecanoic acid, 11-hydroxy-octadecanoic acid, 12-hydroxy-octadecanoic acid, 13-hydroxy-octadecanoic acid, 14-hydroxy-octadecanoic acid, 15-hydroxy-octadecanoic acid, 16-hydroxy-octadecanoic acid, 17-hydroxy-octadecanoic acid, 10-hydroxy-nonadecanoic acid, 11-hydroxy-nonadecanoic acid, 12-hydroxy-nonadecanoic acid, 13-hydroxy-nonadecanoic acid, 14-hydroxy-nonadecanoic acid, 15-hydroxy-nonadecanoic acid, 16-hydroxy-nonadecanoic acid, 17-hydroxy-nonadecanoic acid, 18-hydroxy-nonadecanoic acid, 10-hydroxy-icosananoic acid, 11-hydroxy-icosananoic acid, 12-hydroxy-icosananoic acid, 13-hydroxy-icosananoic acid, 14-hydroxy-icosananoic acid, 15-hydroxy-icosananoic acid, 16-hydroxy-icosananoic acid, 17-hydroxy-icosananoic acid, 18-hydroxy-icosananoic acid, 19-hydroxy-icosananoic acid, 10-hydroxy-heneicosanoic acid, 11-hydroxy-heneicosanoic acid, 12-hydroxy-heneicosanoic acid, 13-hydroxy-heneicosanoic acid, 14-hydroxy-heneicosanoic acid, 15-hydroxy-heneicosanoic acid, 16-hydroxy-heneicosan acid, 17-hydroxy-heneicosanoic acid, 18-hydroxy-heneicosanoic acid, 19-hydroxy-heneicosanoic acid, 20-hydroxy-heneicosanoic acid, 10-hydroxy-docosanoic acid, 11-hydroxy-docosanoic acid, 12-hydroxy-docosanoic acid, 13-hydroxy-docosanoic acid, 14-hydroxy-docosanoic acid, 15-hydroxy-docosanoic acid, 16-hydroxy-docosanoic acid, 17-hydroxy-docosanoic acid, 18-hydroxy-docosanoic acid, 19-hydroxy-docosanoic acid, 20-hydroxy-docosanoic acid, 21-hydroxy-docosanoic acid, 10-hydroxy-tricosanoic acid, 11-hydroxy-tricosanoic acid, 12-hydroxy-tricosanoic acid, 13-hydroxy-tricosanoic acid, 14-hydroxy-tricosanoic acid, 15-hydroxy-tricosanoic acid, 16-hydroxy-tricosanoic acid, 17-hydroxy-tricosanoic acid, 18-hydroxy-tricosanoic acid, 19-hydroxy-tricosanoic acid, 20-hydroxy-tricosanoic acid, 21-hydroxy-tricosanoic acid, 22-hydroxy-tricosanoic acid, 10-hydroxy-tetracosanoic acid, 11-hydroxy-tetracosanoic acid, 12-hydroxy-tetracosanoic acid, 13-hydroxy-tetracosanoic acid, 14-hydroxy-tetracosanoic acid, 15-hydroxy-tetracosanoic acid, 16-hydroxy-tetracosanoic acid, 17-hydroxy-tetracosanoic acid, 18-hydroxy-tetracosanoic acid, 19-hydroxy-tetracosanoic acid, 20-hydroxy-tetracosanoic acid, 21-hydroxy-tetracosanoic acid, 22-hydroxy-tetracosanoic acid, 23-hydroxy-tetracosanoic acid, 10-hydroxy-pentacosanoic acid, 11-hydroxy-pentacosanoic acid, 12-hydroxy-pentacosanoic acid, 13-hydroxy-pentacosanoic acid, 14-hydroxy-pentacosanoic acid, 15-hydroxy-pentacosanoic acid, 16-hydroxy-pentacosanoic acid, 17-hydroxy-pentacosanoic acid, 18-hydroxy-pentacosanoic acid, 19-hydroxy-pentacosanoic acid, 20-hydroxy-pentacosanoic acid, 21-hydroxy-pentacosanoic acid, 22-hydroxy-hexacosanoic acid, 23-hydroxy-pentacosanoic acid, 24-hydroxy-pentacosanoic acid, 10-hydroxy-hexacosanoic acid, 11-hydroxy-hexacosanoic acid, 12-hydroxy-hexacosanoic acid, 13-hydroxy-hexacosanoic acid, 14-hydroxy-hexacosanoic acid, 15-hydroxy-hexacosanoic acid, 16-hydroxy-hexacosanoic acid, 17-hydroxy-hexacosanoic acid, 18-hydroxy-hexacosanoic acid, 19-hydroxy-hexacosanoic acid, 20-hydroxy-hexacosanoic acid, 21-hydroxy-hexacosanoic acid, 22-hydroxy-hexacosanoic acid, 23-hydroxy-hexacosanoic acid, 24-hydroxy-hexacosanoic acid, 25-hydroxy-hexacosanoic acid, 10-hydroxy-heptacosanoic acid, 11-hydroxy-heptacosanoic acid, 12-hydroxy-heptacosanoic acid, 13-hydroxy-heptacosanoic acid, 14-hydroxy-heptacosanoic acid, 15-hydroxy-heptacosanoic acid, 16-hydroxy-heptacosanoic acid, 17-hydroxy-heptacosanoic acid, 18-hydroxy-heptacosanoic acid, 19-hydroxy-heptacosanoic acid, 20-hydroxy-heptacosanoic acid, 21-hydroxy-heptacosanoic acid, 22-hydroxy-heptacosanoic acid, 23-hydroxy-heptacosanoic acid, 24-hydroxy-heptacosanoic acid, 25-hydroxy-heptacosanoic acid, 26-hydroxy-heptacosanoic acid, 10-hydroxy-octacosanoic acid, 11-hydroxy-octacosanoic acid, 12-hydroxy-octacosanoic acid, 13-hydroxy-octacosanoic acid, 14-hydroxy-octacosanoic acid, 15-hydroxy-octacosanoic acid, 16-hydroxy-octacosanoic acid, 17-hydroxy-octacosanoic acid, 18-hydroxy-octacosanoic acid, 19-hydroxy-octacosanoic acid, 20-hydroxy-octacosanoic acid, 21-hydroxy-octacosanoic acid, 22-hydroxy-octacosanoic acid, 23-hydroxy-octacosanoic acid, 24-hydroxy-octacosanoic acid, 25-hydroxy-octacosanoic acid, 26-hydroxy-octacosanoic acid, 27-hydroxy-octacosanoic acid, 10-hydroxy-nonacosanoic acid, 11-hydroxy-nonacosanoic acid, 12-hydroxy-nonacosanoic acid, 13-hydroxy-nonacosanoic acid, 14-hydroxy-nonacosanoic acid, 15-hydroxy-nonacosanoic acid, 16-hydroxy-nonacosanoic acid, 17-hydroxy-nonacosanoic acid, 18-hydroxy-nonacosanoic acid, 19-hydroxy-nonacosanoic acid, 20-hydroxy-nonacosanoic acid, 21-hydroxy-nonacosanoic acid, 22-hydroxy-nonacosanoic acid, 23-hydroxy-nonacosanoic acid, 24-hydroxy-nonacosanoic acid, 25-hydroxy-nonacosanoic acid, 26-hydroxy-nonacosanoic acid, 27-hydroxy-nonacosanoic acid, 28-hydroxy-nonacosanoic acid, 10-hydroxy-triacontanoic acid, 11-hydroxy-triacontanoic acid, 12-hydroxy-triacontanoic acid, 13-hydroxy-triacontanoic acid, 14-hydroxy-triacontanoic acid, 15-hydroxy-triacontanoic acid, 16-hydroxy-triacontanoic acid, 17-hydroxy-triacontanoic acid, 18-hydroxy-triacontanoic acid, 19-hydroxy-triacontanoic acid, 20-hydroxy-triacontanoic acid, 21-hydroxy-triacontanoic acid, 22-hydroxy-triacontanoic acid, 23-hydroxy-triacontanoic acid, 24-hydroxy-triacontanoic acid, 25-hydroxy-triacontanoic acid, 26-hydroxy-triacontanoic acid, 27-hydroxy-triacontanoic acid, 28-hydroxy-triacontanoic acid, and 29-hydroxy-triacontanoic acid. More preferred are 10-hydroxy-hexadecanoic acid, 11-hydroxy-hexadecanoic acid, 12-hydroxy-hexadecanoic acid, 13-hydroxy-hexadecanoic acid, 14-hydroxy-hexadecanoic acid, 10-hydroxy-heptadecanoic acid, 11-hydroxy-heptadecanoic acid, 12-hydroxy-heptadecanoic acid, 13-hydroxy-heptadecanoic acid, 14-hydroxy-heptadecanoic acid, 10-hydroxy-octadecanoic acid, 11-hydroxy-octadecanoic acid, 12-hydroxy-octadecanoic acid, 13-hydroxy-octadecanoic acid, 14-hydroxy-octadecanoic acid, 10-hydroxy-nonadecanoic acid, 11-hydroxy-nonadecanoic acid, 12-hydroxy-nonadecanoic acid, 13-hydroxy-nonadecanoic acid, 14-hydroxy-nonadecanoic acid, 10-hydroxy-icosananoic acid, 11-hydroxy-icosananoic acid, 12-hydroxy-icosananoic acid, 13-hydroxy-icosananoic acid, and 14-hydroxy-icosananoic acid. Further preferred are the monohydroxy fatty acids selected from 10-hydroxy-hexadecanoic acid, 11-hydroxy-hexadecanoic acid, 12-hydroxy-hexadecanoic acid, 13-hydroxy-hexadecanoic acid, 14-hydroxy-hexadecanoic acid, 10-hydroxy-heptadecanoic acid, 11-hydroxy-heptadecanoic acid, 12-hydroxy-heptadecanoic acid, 13-hydroxy-heptadecanoic acid, 14-hydroxy-heptadecanoic acid, 10-hydroxy-octadecanoic acid, 11-hydroxy-octadecanoic acid, 12-hydroxy-octadecanoic acid, 13-hydroxy-octadecanoic acid, 14-hydroxy-octadecanoic acid, 10-hydroxy-nonadecanoic acid, 11-hydroxy-nonadecanoic acid, 12-hydroxy-nonadecanoic acid, 13-hydroxy-nonadecanoic acid, 14-hydroxy-nonadecanoic acid, 10-hydroxy-icosananoic acid, 11-hydroxy-icosananoic acid, 12-hydroxy-icosananoic acid, 13-hydroxy-icosananoic acid, and 14-hydroxy-icosananoic acid. The hydroxy group preferably has an R conformation.

In order to improve the processability of the hydroxy fatty acids, hydroxy fatty acids which are liquid at room temperature (25° C., 1 atm) are especially preferred. From this point of view, it is preferred that the hydroxy fatty acids contain one or two C=C double bonds. Preferably, the C=C double bond closest to the carboxyl group of the fatty acid is hydrated, while the one or two additional C=C double bonds are preserved. In addition, it is also possible that the two C=C double bonds closest to the carboxyl group of the fatty acid are hydrated, while the one additional C=C double bond is preserved.

Preferred hydroxy fatty acids with a C=C double bond include 10-hydroxy-tetradec-12-enoic acid, 10-hydroxy-pentadec-12-enoic acid, 11-hydroxy-pentadec-13-enoic acid, 10-hydroxy-hexadec-12-enoic acid, 11-hydroxy-hexadec-13-enoic acid, 12-hydroxy-hexadec-14-enoic acid, 10-hydroxy-heptadec-12-enoic acid, 11-hydroxy-heptadec-13-enoic acid, 12-hydroxy-heptadec-14-enoic acid, 13-hydroxy-heptadec-15-enoic acid, 10-hydroxy-octadec-12-enoic acid, 11-hydroxy-octadec-13-enoic acid, 12-hydroxy-octadec-14-enoic acid, 13-hydroxy-octadec-15-enoic acid, 14-hydroxy-octadec-16-enoic acid, 10-hydroxy-nonadec-12-enoic acid, 11-hydroxy-nonadec-13-enoic acid, 12-hydroxy-nonadec-14-enoic acid, 13-hydroxy-nonadec-15-enoic acid, 14-hydroxy-nonadec-16-enoic acid, 15-hydroxy-nonadec-17-enoic acid, 10-hydroxy-icosan-12-enoic acid, 11-hydroxy-icosan-13-enoic acid, 12-hydroxy-icosan-14-enoic acid, 13-hydroxy-icosan-15-enoic acid, 14-hydroxy-icosan-16-enoic acid, 15-hydroxy-icosan-17-enoic acid, 16-hydroxy-icosan-18-enoic acid, 10-hydroxy-heneicos-12-enoic acid, 11-hydroxy-heneicos-13-enoic acid, 12-hydroxy-heneicos-14-enoic acid, 13-hydroxy-heneicos-15-enoic acid, 14-hydroxy-heneicos-16-enoic acid, 15-hydroxy-heneicos-17-enoic acid, 16-hydroxy-heneicos-18-enoic acid, 17-hydroxy-heneicos-19-enoic acid, 10-hydroxy-docos-12-enoic acid, 11-hydroxy-docos-13-enoic acid, 12-hydroxy-docos-14-enoic acid, 13-hydroxy-docos-15-enoic acid, 14-hydroxy-docos-16-enoic acid, 15-hydroxy-docos-17-enoic acid, 16-hydroxy-docos-18-enoic acid, 17-hydroxy-docos-19-enoic acid, 18-hydroxy-docos-20-enoic acid, 10-hydroxy-tricos-12-enoic acid, 11-hydroxy-tricos-13-enoic acid, 12-hydroxy-tricos-14-enoic acid, 13-hydroxy-tricos-15-enoic acid, 14-hydroxy-tricos-16-enoic acid, 15-hydroxy-tricos-17-enoic acid, 16-hydroxy-tricos-18-enoic acid, 17-hydroxy-tricos-19-enoic acid, 18-hydroxy-tricos-20-enoic acid, 19-hydroxy-tricos-21-enoic acid, 10-hydroxy-tetracos-12-enoic acid, 11-hydroxy-tetracos-13-enoic acid, 12-hydroxy-tetracos-14-enoic acid, 13-hydroxy-tetracos-15-enoic acid, 14-hydroxy-tetracos-16-enoic acid, 15-hydroxy-tetracos-17-enoic acid, 16-hydroxy-tetracos-18-enoic acid, 17-hydroxy-tetracos-19-enoic acid, 18-hydroxy-tetracos-20-enoic acid, 19-hydroxy-tetracos-21-enoic acid, and 20-hydroxy-tetracos-22-enoic acid.

Additional modifications that interfere with the crystallization or the parallel alignment of the fatty acid residues, as well as mixing with corresponding products for the prevention of crystallization are suitable to improve processability. These products include unsaturated fatty acids, in particular in cis configuration, chain branches e.g. with methyl groups or alkoxy groups, which are available by alcoholysis of epoxidized chains, epoxy groups as well as mixtures of different chain lengths and other mixtures with components that act as solvents or plasticizers.

Preferred hydroxy fatty acids with two C=C double bonds are 10-hydroxy-heptadeca-12,15-dienoic acid, 10-hydroxy-octadeca-12,15-dienaic acid, 11-hydroxy-octadeca-13,16-dienoic acid, 10-hydroxy-nonadeca-12,15-dienoic acid, 11-hydroxy-nonadeca-13,16-dienoic acid, 12-hydroxy-nonadeca-14,17-dienoic acid, 10-hydroxy-icosana-12,15-dienoic acid, 11-hydroxy-icosana-13,16-dienoic acid, 12-hydroxy-icosana-14,17-dienoic acid, 13-hydroxy-icosana-15,18-dienoic acid, 10-hydroxy-heneicosa-12,15-dienoic acid, 11-hydroxy-heneicosa-13,16-dienoic acid, 12-hydroxy-heneicosa-14,17-dienoic acid, 13-hydroxy-heneicosa-15,18-dienoic acid, 14-hydroxy-heneicosa-16,19-dienoic acid, 10-hydroxy-docosa-12,15-dienoic acid, 11-hydroxy-docosa-13,16-dienoic acid, 12-hydroxy-docosa-14,17-dienoic acid, 13-hydroxy-docosa-15,18-dienoic acid, 14-hydroxy-docosa-16,19-dienoic acid, 15-hydroxy-docosa-17,20-dienoic acid, 10-hydroxy-tricosa-12,15-dienoic acid, 11-hydroxy-tricosa-13,16-dienoic acid, 12-hydroxy-tricosa-14,17-dienoic acid, 13-hydroxy-tricosa-15,18-dienoic acid, 14-hydroxy-tricosa-16,19-dienoic acid, 15-hydroxy-tricosa-17,20-dienoic acid, 16-hydroxy-tricosa-18,21-dienoic acid, 10-hydroxy-tetracosa-12,15-dienoic acid, 11-hydroxy-tetracosa-13,16-dienoic acid, 12-hydroxy-tetracosa-14,17-dienoic acid, 13-hydroxy-tetracosa-15,18-dienoic acid, 14-hydroxy-tetracosa-16,19-dienoic acid, 15-hydroxy-tetracosa-17,20-dienoic acid, 16-hydroxy-tetracosa-18,21-dienoic acid, 17-hydroxy-tetracosa-19,22-dienoic acid, 10-hydroxy-pentacosa-12,15-dienoic acid, 11-hydroxy-pentacosa-13,16-dienoic acid, 12-hydroxy-pentacosa-14,17-dienoic acid, 13-hydroxy-pentacosa-15,18-dienoic acid, 14-hydroxy-pentacosa-16,19-dienoic acid, 15-hydroxy-pentacosa-17,20-dienoic acid, 16-hydroxy-pentacosa-18,21-dienoic acid, 17-hydroxy-pentacosa-19,22-dienoic acid, 18-hydroxy-pentacosa-20,23-dienoic acid, 10-hydroxy-hexacosa-12,15-dienoic acid, 11-hydroxy-hexacosa-13,16-dienoic acid, 12-hydroxy-hexacosa-14,17-dienoic acid, 13-hydroxy-hexacosa-15,18-dienoic acid, 14-hydroxy-hexacosa-16,19-dienoic acid, 15-hydroxy-hexacosa-17,20-dienoic acid, 16-hydroxy-hexacosa-18,21-dienoic acid, 17-hydroxy-hexacosa-19,22-dienoic acid, 18-hydroxy-hexacosa-20,23-dienoic acid, 19-hydroxy-hexacosa-21,24-dienoic acid, 10-hydroxy-heptacosa-12,15-dienoic acid, 11-hydroxy-heptacosa-13,16-dienoic acid, 12-hydroxy-heptacosa-14,17-dienoic acid, 13-hydroxy-heptacosa-15,18-dienoic acid, 14-hydroxy-heptacosa-16,19-dienoic acid, 15-hydroxy-heptacosa-17,20-dienoic acid, 16-hydroxy-heptacosa-18,21-dienoic acid, 17-hydroxy-heptacosa-19,22-dienoic acid, 18-hydroxy-heptacosa-20,23-dienoic acid, 19-hydroxy-heptacosa-21,24-dienoic acid, 20-hydroxy-heptacosa-22,25-dienoic acid, 10-hydroxy-octacosa-12,15-dienoic acid, 11-hydroxy-octacosa-13,16-dienoic acid, 12-hydroxy-octacosa-14,17-dienoic acid, 13-hydroxy-octacosa-15,18-dienoic acid, 14-hydroxy-octacosa-16,19-dienoic acid, 15-hydroxy-octacosa-17,20-dienoic acid, 16-hydroxy-octacosa-18,21-dienoic acid, 17-hydroxy-octacosa-19,22-dienoic acid, 18-hydroxy-octacosa-20,23-dienoic acid, 19-hydroxy-octacosa-21,24-dienoic acid, 20-hydroxy-octacosa-22,25-dienoic acid, 21-hydroxy-octacosa-23,26-dienoic acid, 10-hydroxy-nonacosa-12,15-dienoic acid, 11-hydroxy-nonacosa-13,16-dienoic acid, 12-hydroxy-nonacosa-14,17-dienoic acid, 13-hydroxy-nonacosa-15,18-dienoic acid, 14-hydroxy-nonacosa-16,19-dienoic acid, 15-hydroxy-nonacosa-17,20-dienoic acid, 16-hydroxy-nonacosa-18,21-dienoic acid, 17-hydroxy-nonacosa-19,22-dienoic acid, 18-hydroxy-nonacosa-20,23-dienoic acid, 19-hydroxy-nonacosa-21,24-dienoic acid, 20-hydroxy-nonacosa-22,25-dienoic acid, 21-hydroxy-nonacosa-23,26-dienoic acid, 22-hydroxy-nonacosa-24,27-dienoic acid, 10-hydroxy-triaconta-12,15-dienoic acid, 11-hydroxy-triaconta-13,16-dienoic acid, 12-hydroxy-triaconta-14,17-dienoic acid, 13-hydroxy-triaconta-15,18-dienoic acid, 14-hydroxy-triaconta-16,19-dienoic acid, 15-hydroxy-triaconta-17,20-dienoic acid, 16-hydroxy-triaconta-18,21-dienoic acid, 17-hydroxy-triaconta-19,22-dienoic acid, 18-hydroxy-triaconta-20,23-dienoic acid, 19-hydroxy-triaconta-21,24-dienoic acid, 20-hydroxy-triaconta-22,25-dienoic acid, 21-hydroxy-triaconta-23,26-dienoic acid, 22-hydroxy-triaconta-24,27-dienoic acid, and 23-hydroxy-triaconta-25,28-dienoic acid.

Preferred dihydroxy fatty acids with a C=C double bond are 10,13-dihydroxy-heptadec-15-enoic acid, 10,13-dihydroxy-octadec-15-enoic acid, 11,14-dihydroxy-octadec-16-enoic acid, 10,13-dihydroxy-nonadec-15-enoic acid, 11,14-dihydroxy-nonadec-16-enoic acid, 12,15-dihydroxy-nonadec-17-enoic acid, 10,13-dihydroxy-icosan-15-enoic acid, 11,14-dihydroxy-icosan-16-enoic acid, 12,15-dihydroxy-icosan-17-enoic acid, 13,16-dihydroxy-icosan-18-enoic acid, 10,13-dihydroxy-heneicos-15-enoic acid, 11,14-dihydroxy-heneicos-16-enoic acid, 12,15-dihydroxy-heneicos-17-enoic acid, 13,16-dihydroxy-heneicos-18-enoic acid, 14,17-dihydroxy-heneicos-19-enoic acid, 10,13-dihydroxy-docos-15-enoic acid, 11,14-dihydroxy-docos-16-enoic acid, 12,15-dihydroxy-docos-17-enoic acid, 13,16-dihydroxy-docos-18-enoic acid, 14,17-dihydroxy-docos-19-enoic acid, 15,18-dihydroxy-docos-20-enoic acid, 10,13-dihydroxy-tricos-15-enoic acid, 11,14-dihydroxy-tricos-16-enoic acid, 12,15-dihydroxy-tricos-17-enoic acid, 13,16-dihydroxy-tricos-18-enoic acid, 14,17-dihydroxy-tricos-19-enoic acid, 15,18-dihydroxy-tricos-20-enoic acid, 16,19-dihydroxy-tricos-21-enoic acid, 10,13-dihydroxy-tetracos-15-enoic acid, 11,14-dihydroxy-tetracos-16-enoic acid, 12,15-dihydroxy-tetracos-17-enoic acid, 13,16-dihydroxy-tetracos-18-enoic acid, 14,17-dihydroxy-tetracos-19-enoic acid, 15,18-dihydroxy-tetracos-20-enoic acid, 16,19-dihydroxy-tetracos-21-enoic acid, and 17,20-dihydroxy-tetracos-22-enoic acid.

Among the hydroxy fatty acids mentioned herein, the $C_{14-24}$ hydroxy fatty acids are preferred, the $C_{16-20}$ hydroxy fatty acids are more preferred, the $C_{16}$ or $C_{18}$ hydroxy fatty acids are even more preferred, and the $C_{18}$ hydroxy fatty acids are most preferred.

Furthermore, among the hydroxy fatty acids mentioned herein, the $C_{14-24}$ hydroxy fatty acids are preferred, the $C_{16-20}$ hydroxy fatty acids are more preferred, the $C_{16}$ or $C_{18}$ hydroxy fatty acids are even more preferred, and the $C_{18}$ hydroxy fatty acids are most preferred, in which the first hydroxy group is located at $C_{10}$ to $C_{18}$, $C_{10}$ to $C_{16}$, $C_{10}$ to $C_{14}$, more preferably at $C_{10}$ to $C_{13}$.

Preferably, for example, linoleic acid ((cis, cis)-octadeca-9,12-dienoic acid) can be reacted in the method of the present invention to (cis)-10-hydroxyoctadec-12-enoic acid. One of the two double bonds is hydrated, while the other double bond is preserved.

In addition, for example, linolenic acid ((cis, cis, cis)-octadeca-9,12,15-trienoic acid) can preferably be reacted to (cis, cis)-10-hydroxyoctadeca-12,15-dienoic acid in the method of the present invention. In that process, one of the three double bonds is hydrated, while the other two double bonds are preserved.

To obtain products that are liquid at room temperature, it is preferred that the one or more hydroxy fatty acids are a mixture of two or more hydroxy fatty acids, preferably three or more, four or more, or even five or more hydroxy fatty acids. In this mixture, at least 50 mol-%, 60 mol-%, 70 mol-%, 80 mol-%, 90 mol-%, of the hydroxy fatty acids are preferably selected from 10-hydroxystearic acid, (cis)-10-hydroxyoctadec-12-enoic acid and (cis,cis)-10-hydroxyoctadeca-12,15-dienoic acid.

It is preferred that the mixture comprises at least 40 mol-%, at least 50 mol-% or even at least 60 mol-%, but 90 mol-% or less, preferably 80 mol-% or less of 10-hydroxystearic acid, based on all hydroxy fatty acids.

Preferably, the mixture of hydroxy fatty acids can also comprise 10,13-dihydroxystearic acid.

Hydroxy fatty acids with 24 or less, preferably 22 or less, carbon atoms are preferred, wherein the (single or most distant from the carboxyl group) hydroxy group is preferably located at C18 or closer to the carboxyl group (but preferably not closer to the carboxyl group than C10) and is preferably not a terminal hydroxy group.

Accordingly, the one or more hydroxy fatty acids are preferably selected from hydrated undecylenic acid, myristoleic acid, palmitoleic acid, margaroleic acid, petroselinic acid, oleic acid, elaidic acid, vaccenic acid, gadoleic acid, gondoic acid, cetoleic acid, erucic acid, vemolic acid, cis-5-eicosenoic acid, brassidic acid, and nervonic acid, and/or from the group consisting of hydrated linoleic acid, linolenic acid, calendulic acid, punicic acid, eleostearic acid, arachidonic acid, timnodonic acid, clupanodonic acid, lesquerolic acid, licanoic acid, and cervonic acid.

Among these, the one or more hydroxy fatty acids are preferably selected from hydrated undecylenic acid, myristoleic acid, palmitoleic acid, margaroleic acid, petroselinic acid, oleic acid, elaidic acid, vaccenic acid, gadoleic acid, gondoic acid, cetoleic acid, erucic acid, vemolic acid, cis-5-eicosenoic acid, brassidic acid, and nervonic acid.

Hydroxy fatty acids obtained by hydration of a monounsaturated fatty acid are especially preferred.

It is even more preferred that the one or more hydroxy fatty acids are selected from hydrated oleic acid, linoleic acid, linolenic acid, and palmitoleic acid, wherein the hydroxy fatty acid is preferably selected from hydrated oleic acid, linoleic acid, linolenic acid, and combinations thereof, and more preferred it is hydrated oleic acid.

Preferably, the one or more hydroxy fatty acids are selected from the group of 7-hydroxy, 8-hydroxy, 9-hydroxy, 10-hydroxy, 11-hydroxy, 12-hydroxy and 13-hydroxy fatty acids, wherein the fatty acid is preferably a $C_{6-40}$ alkanoic acid, more preferably a $C_{10-30}$ alkanoic acid, and more preferably a $C_{12-24}$ alkanoic acid. More preferably, the one or more hydroxy fatty acids are selected from the group of 9-hydroxy, 10-hydroxy, 11-hydroxy, 12-hydroxy and 13-hydroxy fatty acids, wherein the fatty acid is preferably a $C_{6-40}$ alkanoic acid, more preferably a $C_{10-30}$ alkanoic acid, and more preferably a $C_{12-24}$ alkanoic acid. More preferably, the one or more hydroxy fatty acids are selected from the group of 10-hydroxy and 13-hydroxy fatty acids (particularly preferred 10-hydroxy fatty acids or 10,13-dihydroxy fatty acids), wherein the fatty acid is preferably a $C_{6-40}$ alkanoic acid, more preferably a $C_{10-30}$ alkanoic acid, and more preferably a $C_{12-24}$-alkanoic acid. The hydroxy fatty acid preferably comprises one or two (more preferably one) hydroxy group(s). Optionally, the hydroxy fatty acid can have one or two C=C double bonds. It is preferred that the hydroxy fatty acid has a hydroxy group and no C=C double bond.

It is preferred that the one or more hydroxy fatty acids are a mixture of two or more hydroxy fatty acids, preferably three or more, four or more, or even five or more hydroxy fatty acids, wherein the mixture comprises at least 40 mol-%, at least 50 mol-% or even at least 60 mol-%, but 90 mol-% or less, preferably 80 mol-% or less of one or more saturated hydroxy fatty acids, preferably 10-hydroxystearic acid, based on all the hydroxy fatty acids. The mixture preferably comprises at least 5 mol-%, at least 7 mol-% or even at least 10 mol-%, but 70 mol-% or less, preferably 50 mol-% or less, more preferably 30 mol-% or less, more preferably 20 mol-% or less, of one or more monounsaturated hydroxy fatty acids, preferably (cis)-10-hydroxyoctadec-12-enoic acid, based on all hydroxy fatty acids. The mixture preferably comprises at least 0.1 mol-%, at least 0.5 mol-% or even at least 1 mol-%, but 20 mol-% or less, preferably 15 mol-% or less, more preferably 10 mol-% or less, even more preferably 5 mol-% or less, of one or more di-unsaturated hydroxy fatty acids, preferably (cis,cis)-10-hydroxyoctadeca-12,15-dienoic acid, based on all hydroxy fatty acids.

Reaction of the One or More Hydroxy Fatty Acids

The reaction of the one or more hydroxy fatty acids with one or more at least divalent linker groups is preferably a biotechnological reaction.

The biotechnological reaction of the one or more hydroxy fatty acids with one or more at least divalent linker groups for the purposes of the present invention preferably refers to the esterification and/or amidation of one or more hydroxy fatty acids with one or more at least divalent linker groups under mediation (especially catalysis) of a protein.

In particular if the one or more at least divalent linker groups are or contain (poly)amino(poly)alcohols or polyamines, the reaction can of course be carried out according to any conventional amidation methods which are well known to the person skilled in the art.

alkanediols, alkanetriols and combinations thereof. Even more preferably, the one or more at least divalent linker groups are selected from 2-butyl-2-ethyl-1,3-propanediol, 2-ethyl-2-(hydroxymethyl)1,3-propanediol, 1,2-propanediol, 1,3-propanediol, 1,4-butanediol, 1,3-butanediol, 2-methyl-1,3-propanediol, 1,5-pentanediol and combinations thereof. The lipase is preferably supported and particularly preferably selected from Addzyme CalB 165G, CalB immo 8285 and CalB immo 8806.

In the reaction of the one or more hydroxy fatty acids with one or more at least divalent linker groups, at least two, preferably two, three or four, of the hydroxy or amino groups of the at least divalent linker groups are condensed with hydroxy fatty acid.

As is clear to the person skilled in the art, the hydroxy fatty acids also comprise hydroxy groups capable of reacting with carboxylic acids. In the case of a conventional chemical esterification, it would therefore be expected that a distinction could not, or only to a limited extent, be made between the secondary alcohol of the hydroxy group and the hydroxy group of the polyol, and therefore a mixture of numerous different esters would form. By the biotechnological reaction on the other hand, in particular by means of a lipase, the ester bonds between the alcohol groups of the polyols and the carboxylic acid groups of the hydroxy fatty acids can be formed in a targeted manner.

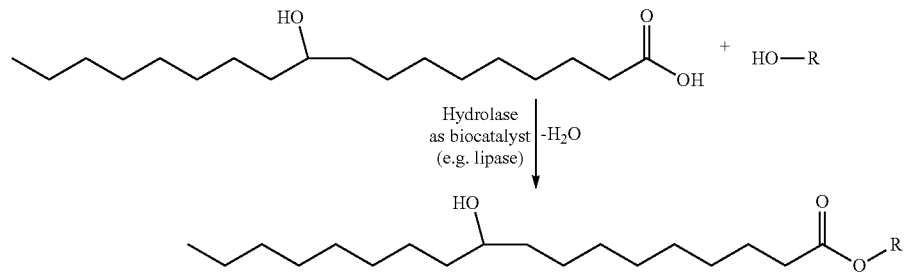

The biotechnological reaction of the one or more hydroxy fatty acids with one or more at least divalent linker groups for the purposes of the present invention relates more preferably to the esterification of one or more hydroxy fatty acids with one or more at least divalent linker groups under mediation of an enzyme selected from the group consisting of hydroxylases, preferably esterases, lipases and/or proteases, more preferably lipases. If the one or more at least divalent linker groups contain (poly)amino(poly)alcohols and/or polyamines, the reaction is preferably carried out under mediation of an enzyme selected from the group consisting of proteases and amidases.

The enzyme for the biotechnological reaction of the one or more hydroxy fatty acids with one or more at least divalent linker groups is preferably a lipase, more preferably a lipase of Candida antarctica, especially preferred lipase B of Candida antarctica.

It is particularly preferred that the reaction of the one or more hydroxy fatty acids with one or more at least divalent linker groups is carried out by means of a lipase of Candida antarctica, more preferably lipase B of Candida antarctica, wherein the one or more at least divalent linker groups are selected from alkanediols, alkanetriols, alkanetetraoles and combinations thereof. It is further preferred that the one or more at least divalent linker groups are selected from where R is a polyol group with which the functionality, branching, molecular weight and other properties of the end product are adjusted. Appropriate procedures and correlations are known to the person skilled in the art.

Preferably, 1 to 100 mg of hydroxylase(s), more preferably 2 to 70 mg, even more preferably to 50 mg per mmol of substrate (i.e. the totality of fatty acids to be hydrated) are used.

As a medium, a solvent mixture of one or more $C_{1-6}$ nitriles, $C_{1-6}$ alcohols and/or $C_{1-6}$ ethers, such as MTBE, with one or more aliphatic and/or aromatic hydrocarbons such as n-hexane or toluene, is usually used. The volume ratio of the one or more $C_{1-6}$ nitriles, $C_{1-6}$ alcohols and/or $C_{1-6}$ ethers to the one or more aliphatic and/or aromatic hydrocarbons is preferably 5:1 to 1:5, more preferably 2:1 to 1:2, in particular about 1:1. In addition, molecular sieve (0.3 to 0.5 nm, preferably 4 nm) is usually used in an amount of 0.1 to 10 g/mmol substrate, preferably 0.2 to 1 g/mmol substrate, more preferably 0.4 g/mmol substrate.

Preferably, the hydroxylase(s) is/are immobilized on a carrier and the reaction is carried out at a temperature in the range of 30 to 90° C., more preferably 50 to 85° C., even more preferably 60 to 80° C. Based on the information available in the literature, a person skilled in the art is able to adjust the conditions suitable for the respective hydroxylase(s) accordingly.

Typical reaction conditions are CAL-B with (30 mg/mmol substrate) in a 1:1 (v v) mixture of MTBE and n-hexane or toluene with molecular sieve (0.4 nm, 0.4 g/mmol substrate) and stirring for 14 h at 35 or 60° C. The optimal reaction conditions for CAL-B when the lipase is immobilized are 60-80° C. The use of immobilized enzymes is often preferred because of the simple recovery of the enzyme and the products. In addition, immobilization often has a stabilizing effect on the enzyme and allows the catalyst to be used in organic solvents (apolar, with high log P, such as hexane and/or iso-octane). Polar solvents (tert-butanol, acetonitrile) are also accepted (E. M. Anderson, K. M. Larsson, O. Kirk, One Biocatalyst-Many Applications: The Use of *Candida antarctica* B-Lipase in Organic Synthesis, Biocatalysis and Biotransformation 1998, 16, 181-204).

The One or More at Least Divalent Linker Groups

The one or more at least divalent linker groups refer to one or more compounds, each comprising two or more groups that can react with a carboxylic acid to form a bond. In the following, reference is made to the at least divalent linker group in the singular, but this is not to be understood as meaning that the present invention is limited to that. Rather, it is to be understood that one or more at least bivalent linker groups can be used. In particular, mixtures of several at least divalent linker groups can be used. In a preferred embodiment, however, a single at least divalent linker group accounts for at least 90 wt.-% of the at least divalent linker group.

The at least divalent linker group is preferably a polyol, polyamine or (poly)amino(poly)alcohol (such as e.g. amino alcohol, poly amino alcohol, amino polyol or poly amino polyol). Preferably, the at least divalent linker group is a polyol, wherein the polyol is preferably a diol, triol, tetraol, pentaol or hexaol, more preferably a diol, triol or tetraol. It is preferred that the at least divalent linker group is obtained from renewable raw materials, i.e. that bio-based divalent linker groups, such as bio-based polyols, are used.

In the following, reference is made to the polyol, the polyamine or the (poly)amino(poly)alcohol in the singular, but this is not to be understood as meaning that the present invention is limited to that. Rather, it is to be understood that one or more polyols and/or polyamines and/or (poly)amino (poly)alcohols can be used, such as a mixture of polyols and (poly)amino(poly)alcohols, a mixture of polyamines and polyols, and/or a mixture of polyamines and (poly)amino (poly)alcohols. In a preferred embodiment, however, the at least divalent linker group contains at least 90 wt.-% polyols, preferably at least 90 wt.-% of a single polyol compound.

It is particularly preferred that the at least divalent linker group is a polyol. It is to be understood that the polyol can be either a single polyol or a mixture of polyols. Likewise, in the reaction of the at least divalent linker group, two or more types of linker groups can of course be added simultaneously or one after the other. The polyol preferably comprises at least two primary OH groups, i.e. OH groups, which are bound to a carbon atom to which two hydrogens are bound. In other words, the polyol preferably contains at least two partial structures of the following formula:

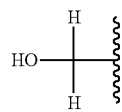

i.e. it preferably comprises at least two —CH$_2$OH groups.

The at least divalent linker group is preferably an aliphatic polyol, preferably an aliphatic C$_{2-40}$ polyol, wherein the aliphatic C$_{2-40}$ polyol is preferably an aliphatic alkanediol, alkanetriol, alkanetetraol, alkanepenatol or alkanehexaol.

Preferred examples of linker groups include ethanediol, propanediols, butanediols, pentanediols, hexanediols, heptanediols, octanediols, nonanediols, decanediols, undecanediols, dodecanediols, tridecanediols, tetradecanediols, propanetriols, butanetriols, pentanetriols, hexanetriols, heptanetriols, octanetriols, nonanetriols, decanetrioles, undecanetriols, dodecanetriols, tridecanetriols, tetradecanetriols, butanetetrols, pentanetetrols, hexanetetrols, heptanetetrols, octanetetrols, nonanetetrols, decanetetrols, undecanetetrols, dodecanetetrols, tridecanetetrols, tetradecanetetrols, pentanepentols, hexanepentols, heptanepentols, octanepentols, nonanepentols, decanepentols, undecanepentols, dodecanepentols, tridecanepentols, tetradecanepentols, hexanehexols, heptanehexols, octanehexols, nonanehexols, decanehexols, undecanehexols, dodecanehexols, tridecanehexols, tetradecanehexols, heptaneheptols, octaneheptols, nonaneheptols, decaneheptols, undecaneheptols, dodecaneheptols, tridecaneheptols, tetradecaneheptoles, octaneoctols, nonaneoctols, decaneoctols, undecaneoctols, dodecaneoctols, tridecaneoctols, tetradecaneoctols, nonanenonols, decanenonols, undecanenonols, dodecanenonols, tridecanenonols, tetradecanenonols, decanedecols, undecanedecols, dodecanedecols, tridecanedecols, tetradecanedecols, undecaneundecols, dodecaneundecols, tridecaneundecols, tetradecaneundecols, dodecanedodecols, tridecanedodecols, tetradecanedodecols, tridecanetridecols, tetradecanetridecols, and tetradecanetetradecols. It is to be understood that the carbon chains in these polyols can be linear or branched. Optionally, they can also be cyclic, especially in the case of carbon chains with more than 4 carbon atoms.

More preferred examples of linker groups include ethanediol, propanediols, butanediols, pentanediols, hexanediols, heptanediols, octanediols, propanetriols, butanetriols, pentanetriols, hexanetriols, heptanetriols, octanetriols, butanetetrols, pentanetetrols, hexanetetrols, heptanetetrols, octanetetrols, pentanepentols, hexanepentols, heptanepentols, and octanepentols. It is to be understood that the carbon chains in these polyols can be linear or branched. Optionally, they can also be cyclic, especially in the case of carbon chains with more than 4 carbon atoms.

It is to be understood that any mixtures of the mentioned polyols can be used. In addition, polyols which are obtained by the etherification of one or more of the above polyols are encompassed as well. These are preferably compounds in which 2 to 10, preferably 2 to 6, of the polyols mentioned herein are etherified with each other. For example, diols can be obtained by etherification (which can also be referred to as oligomerization by etherification) of 2 to 6 diols, such as for example 2 to 6 molecules of ethanediol (HOC$_2$H$_4$OH), to form HO(C$_2$H$_4$O)$_n$H, wherein n is a number of 2 to 6.

In all examples of linker groups, hydroxy groups are arranged in such a way that there is no more than one hydroxy group per carbon. Optionally, a >CHOH group may be replaced by a >C(=O) group (i.e. for example, the alcohol group may be oxidized to form an aldehyde or keto group). In this case, of course, the acetals and hemiacetals formed by ring closure are also included. In addition, one or more hydroxy groups in the linker groups may be etherified, for example, with C$_1$ to C$_{30}$ alkanol(s), provided that at least two hydroxy groups remain for the reaction with the hydroxycarboxylic acid(s). Furthermore, any two hydroxy groups may be connected to form a cyclic ether. In addition, the polyols can preferably contain secondary and/or tertiary amino groups, since these can act as catalysts in the polyurethane synthesis.

Moreover, by using nitrogenous and/or phosphorus containing polyols, polyurethanes with flame retardant properties can be obtained. In addition, polyols containing silane groups can also be used as so-called hybrids. Polyols with one or more ionic groups such as $NH_4^+$, $PO_4^{3-}$, $SO_4^{2-}$ per molecule are also of interest since hydrophilic and highly water-miscible products can be obtained this way.

The at least divalent linker group is furthermore preferably an aliphatic α-ω-alkanediol, α-ω-alkanetriol, α-ω-alkantetraol, α-ω-alkanepentaol or α-ω-alkanehexaol. Examples of aliphatic α-ω-alkanediols, α-ω-alkanetriols, α-ω-alkanetetraols, α-ω-alkanepentaols and α-ω-alkanehexaoles include in particular 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, glycerol, α-ω-butanetriols, α-ω-pentanetriols, α-ω-hexanetriols, α-ω-heptanetriols, α-ω-octanetriols, α-ω-nonanetriols, α-ω-decanetriols, α-ω-undecanetriols, α-ω-dodecanetriols, α-ω-tridecanetriols, α-ω-tetradecanetriols, α-ω-butanetetrols, α-ω-pentanetetrols, α-ω-hexanetetrols, α-ω-heptanetetrols, α-ω-octanetetrols, α-ω-nonanetetrols, α-ω-decanetetrols, α-ω-undecanetetrols, α-ω-dodecanetetrols, α-ω-tridecanetetrols, α-ω-tetradecanetetrols, α-ω-pentanepentols, α-ω-hexanepentols, α-ω-heptanepentols, α-ω-octanepentols, α-ω-nonanepentols, α-ω-decanepentols, α-ω-undecanepentols, α-ω-dodecanepentols, α-ω-tridecanepentols, α-ω-tetradecanepentols, α-ω-hexanehexols, α-ω-heptanehexols, α-ω-octanehexols, α-ω-nonanehexols, α-ω-decanehexols, α-ω-undecanehexols, α-ω-dodecanehexols, α-ω-tridecanehexols, and α-ω-tetradecanehexols. As is known to the person skilled in the art, "α-ω" means that there is an OH group at the end and at the beginning of the longest chain of carbon atoms. It is to be understood that the carbon chains in these polyols can be linear or branched. Optionally, they can also be cyclic, especially for carbon chains with more than 4 carbon atoms.

Preferred examples of polyols include 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecandiol, 1,13-tridecanediol, 1,14-tetradecanediol, glycerol, α-ω-butanetriols, α-ω-pentanetriols, α-ω-hexanetriols, α-ω-heptanetriols, α-ω-octanetriols, α-ω-nonanetriols, α-ω-decanetriols, α-ω-undecanetriols, α-ω-dodecanetriols, α-ω-tridecanetriols, α-ω-tetradecanetriols.

Further preferred examples of polyols include 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, as well as α-ω-pentanetriols and α-ω-hexanetriols.

Even more preferred examples of polyols include 1,3-propanediol, 1,4-butanediol, 1,5-pentanediol, 1,6-hexanediol, as well as α-ω-pentanetriols and α-ω-hexanetriols.

It is preferred that the one or more at least divalent linker groups are selected from alkanediols, alkanetriols, alkantetraoles, and combinations thereof. More preferably, the one or more at least divalent linker groups are selected from alkanediols, alkanetriols, and combinations thereof. Even more preferably, the one or more at least divalent linker groups are selected from 2-butyl-2-ethyl-1,3-propanediol, 2-ethyl-2-(hydroxymethyl)1,3-propanediol, 1,2-propanediol, 1,3-propanediol, 1,4-butanediol, 1,3-butanediol, 2-methyl-1,3-propanediol, 1,5-pentanediol, and combinations thereof.

Examples of polyamines are 1,2-diaminocyclohexane, 4,4'-diaminodiphenylsulfone, 1,5-diamino-2-methylpentane, diethylenetriamine, hexamethylenediamine, isophoronediamine, triethylenetetramine and trimethylhexamethylenediamine.

Examples of (poly)amino(poly)alcohols are 2-aminoethanol, diethanolamine, triethanolamine, 2-amino-2-methylpropanol, 2-(dimethylamino)ethanol, 2-(2-aminoethoxy)ethanol, methyldiethanolamine, 4-amino-1-butanol, (S)-3-amino-1,2-propanediol, 1-aminopropane-2-ol, 2-amino-2-methyl-1,3-propanediol, and polyamino-saccharides such as chitin (N-acetylation degree preferably less than 90%) and in particular chitosan, as well as aminosaccharides such as glucosamine. Preferred (poly)amino(poly)alcohols from renewable sources are polyaminosaccharides such as chitosan and aminosaccharides such as glucosamine.

It is particularly preferred that the at least divalent linker group is selected from 1,3-propanediol, 2-methyl-1,3-propanediol, 2,2-dimethyl-1,3-propanediol, 2-ethyl-2-hydroxymethyl-1,3-propanediol, 1,6-hexanediol, ethanolamine, and diethanolamine. Even more preferred, the at least divalent linker group is selected from 1,3-propanediol, 2-methyl-1,3-propanediol, 2,2-dimethyl-1,3-propanediol, 2-ethyl-2-hydroxymethyl-1,3-propanediol, and 1,6-hexanediol.

It is preferred that the at least divalent linker group is not glycerol.

The Hydroxy Fatty Acid Condensate or the Mixture of Hydroxy Fatty Acid Condensates In addition, the present invention relates to a hydroxy fatty acid condensate or a mixture of hydroxy fatty acid condensates obtainable by the method according to the invention. The term hydroxy fatty acid condensate as used herein may refer to a single or a plurality of hydroxy fatty acid condensates.

It is to be understood that these hydroxy fatty acid condensates are formed by esterification or amidation of the above-mentioned polyols, polyamines and/or (poly)amino (poly)alcohols with the above-mentioned hydroxy fatty acids. The hydroxy fatty acid condensates therefore have the thereby resulting specific chemical structures.

Preferably, all the primary hydroxy groups contained in the polyol (also referred to as primary alcohols, or —$CH_2OH$ groups) are esterified with one hydroxy fatty acid each. More preferably, all the hydroxy groups contained in the polyol are esterified with one hydroxy fatty acid each. It is preferred that at least two of the hydroxy groups contained in the polyol are esterified, each with one hydroxy fatty acid.

As a result, a hydroxy fatty acid condensate molecule preferably has at least two ester groups (or one ester and one amide group, or two amide groups), via which the at least two hydroxy fatty acid groups are bound to the polyol, the polyamine and/or the (poly)amino(poly)alcohol. Alternatively, preferred hydroxy fatty acid condensates may have only one ester group or amide group via which a hydroxy fatty acid group is bound to the polyol, the polyamine and/or the (poly)amino(poly)alcohol.

For the case of two hydroxy fatty acids and one diol, this can be schematically represented as follows:

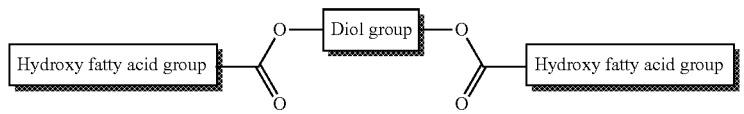

and for the case of three hydroxy fatty acids and one triol:

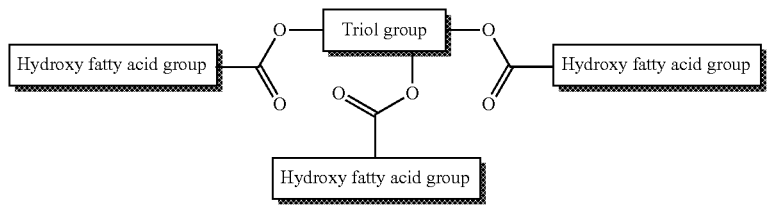

wherein "hydroxy fatty acid group" represents a partial structure which corresponds to a hydroxy fatty acid (preferably monohydroxy fatty acid) without the carboxyl group, and wherein "diol group" represents a diol without the two hydroxy groups, and "triol group" represents a triol without the three hydroxy groups.

Preferably, the resulting hydroxy fatty acid condensates have an average OH functionality per molecule of at least 1. Hydroxy fatty acid condensates with an OH functionality of exactly 1 form final, chain-ending bonds in a branched polyurethane framework. Such monofunctional molecules are also referred to as plasticizers or side-chain soft portions. Higher OH functionalities increase the ability of the respective molecule to further expand and/or crosslink a scaffold via additional urethane bonds.

The average OH functionality per molecule can be determined by methods known to the person skilled in the art, e.g. by determining the OH groups esterifiable with acetic anhydride, wherein the molecular weight (Mn) can be determined, for example, by gel permeation chromatography. Preferably, the average OH functionality per molecule can be determined according to DIN EN ISO 4629-2:2016-12.

The average OH functionality per molecule refers to mole OH groups/mole hydroxy fatty acid condensate. A hydroxy fatty acid condensate obtained by esterification of a diol with two hydroxy fatty acids thus has an average OH functionality per molecule of exactly 2.

More preferably, the resulting hydroxy fatty acid condensates have an average OH functionality per molecule of 1.5 to 2.5, preferably 1.7 to 2.3, more preferably 1.8 to 2.2, even more preferably 1.9 to 2.1, more preferably 1.95 to 2.05. Such hydroxy fatty acid condensates form meltable polymers with diisocyanates, so-called TPUs, which are used in hot glue, extrudable thermoplastics and as a thermoplastic portion of composite materials. The TPUs obtained according to the present invention have a significantly reduced proportion of gel-like oligomers, which often cause a deterioration of the melting behavior in established products of this type.

Precisely adjusted OH functionalities are particularly advantageous for high-melting TPUs: Extremely long-chain, unbranched linear polymers with a uniformly structured average chain length result in a thermoplastic with homogeneous and narrowly adjusted processing properties. The otherwise usual fluctuations in the softening temperature and the melt-flow index are thus advantageously avoided and allow precise, simpler and faster processing since a complex control to compensate for fluctuating TPU properties is no longer necessary.

A preferred variation of up to ±0.1 in the average OH functionality per molecule allows the bio-based component to be incorporated into simple, robust and cost-effective polymerization products. A preferred variation of up to ±0.05 in the average OH functionality per molecule allows for more uniform and adjustable bulk properties in the corresponding polymerization products. A preferred variation of up to ±0.011 in the average OH functionality per molecule provides access to precisely controllable bulk properties through narrowly adjusted properties of the component.

In other applications, however, it may also be desirable for a certain degree of cross-linking to occur. In that case, the resulting hydroxy fatty acid condensates have an average OH functionality per molecule of 2.0 to 7, particularly preferred 2.5 to 3. At an OH functionality of 2 and more, the bio-based component in a polyurethane scaffold will continue to form cross-linking and increase the average molecular mass of the polymer thus accessible. An average OH functionality of well over 2 has a cross-linking effect and increasingly solidifies a polyurethane polymer. Preferably, the modified, bio-based component of the polyurethane reactive mass has an OH functionality per molecule of 2.69 to 2.71. A hydroxy functionality thus adjusted by enzymatic $H_2O$ addition offers—advantageously in combination with an average molecular weight of about 950 g/mol with 10% fluctuation—a combination of extending and crosslinking OH groups, which results in very stable and resilient polyurethane polymers. Particularly preferably, the components used in the present invention—preferably in combination with the OH functionality described above—have a purity of 99 percent by weight. As a result, the material properties of the polyurethane polymers become more uniform, of higher quality and can also provide the desired function with a stable appearance in areas of regular loading permanently and durably.

It is to be understood that the hydroxy fatty acid condensate or the mixture of hydroxy fatty acid condensates can also serve as a starting material for polyethers, polyesters, polymers, esters, oils, lubricants, rheology-modifying additives, plasticizers, cosmetics, waxes or varnishes.

The Polyurethane

Furthermore, the present invention relates to a polyurethane which is obtainable by reacting a composition comprising the hydroxy fatty acid condensate or the mixture of hydroxy fatty acid condensates with a diisocyanate, triisocyanate, tetraisocyanate or other polyisocyanates commonly used in the preparation of polyurethanes.

It is to be understood that in addition to the hydroxy fatty acid condensate or mixture of hydroxy fatty acid condensates produced by the method of the present invention, other hydroxy fatty acid condensates or mixtures of hydroxy fatty acid condensates can also be used in the preparation of the polyurethane. Preferably, at least 30 wt.-%, more preferably at least 50 wt.-%, more preferably at least 70 wt.-% of the hydroxy fatty acid condensate or mixture of hydroxy fatty acid condensates produced by the method of the present invention, based on the total weight of the polyol component, are used in the preparation of the polyurethane.

In the case of the reaction of a diol esterified with two monohydroxy fatty acids with a diisocyanate, the polyurethane product can be represented, for example, as follows:

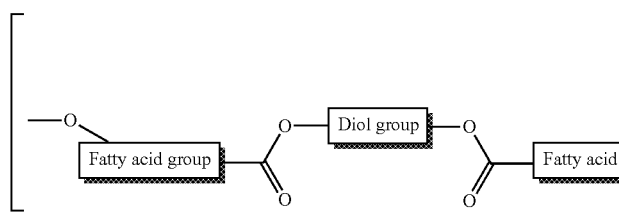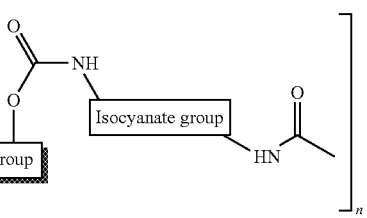

wherein "fatty acid group" represents a partial structure corresponding to a fatty acid without the carboxyl group, and "diol group" represents a diol without the two hydroxy groups, and "isocyanate group" represents a diisocyanate compound without the two NCO groups. "n" indicates the number of repeat units in the polyurethane. In the case of a linear polyurethane as shown here, "n" may, for example, be in the range of 10 to 1,000, in particular 50 to 200.

However, these values can also be significantly higher, in particular in branched polyurethanes, so that "n" in the polyurethanes of the present invention is not particularly limited and can be appropriately adjusted by the person skilled in the art based on their general technical knowledge, while a characterization of the polyurethanes on the basis of their degree of polymerization is not relevant.

As is obvious to the person skilled in the art, numerous linear and branched or cross-linked polyurethane products can be produced by varying the polyols, the hydroxy fatty acid and the isocyanates. For example, in order to introduce branches, a part of the diols can be replaced with higher-valence polyols, such as triols or tetraols, and/or a part of the monohydroxy fatty acids can be replaced with di- or trihydroxy fatty acids and/or a part of the diisocyanates can be replaced with tri- or tetraisocyanates.

Suitable diisocyanates, triisocyanates and tetraisocyanates are known to the person skilled in the art. Suitable diisocyanates are, for example, aliphatic, cycloaliphatic, aryliphatic, heterocyclic and aromatic diisocyanates, as described in Justus Liebig's Annals of Chemistry (1949), 562, pp. 75-136. Aliphatic and cycloaliphatic diisocyanates are preferred.

Aliphatic diisocyanates include, for example, hexamethylene diisocyanate, in particular 1,6-hexamethylene diisocyanate.

Cycloaliphatic diisocyanates include, for example, isophorone diisocyanate, 1,4-Cyclohexane diisocyanate, 1-methyl-2,4-cyclohexane diisocyanate and 1-methyl-2,6-cyclohexane diisocyanate and the corresponding isomer mixtures, 4,4'-dicyclohexylmethane diisocyanate, 2,4'-dicyclohexylmethane diisocyanate and 2,2'-dicyclohexylmethane diisocyanate and the corresponding isomer mixtures. A preferred cycloaliphatic diisocyanate is isophorone diisocyanate.

Aromatic diisocyanates include, for example, 2,4-toluene diisocyanate, mixtures of 2,4-toluene diisocyanate and 2,6-toluene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and 2,4'-diphenylmethane diisocyanates, 4,4'-diisocyanatodiphenyl-ethane-(1,2) and 1,5-naphthylene diisocyanate.

Examples of suitable aromatic asymmetric diisocyanates are all isomers of toluene diisocyanate (TDI) either in isomeric pure form or as a mixture of several isomers, naphthalene-1,5-diisocyanate (NDI), naphthalene-1,4-diisocyanate (NDI), diphenylmethane-2,4'-diisocyanate (MDI) and mixtures of the 4,4'-diphenylmethane diisocyanate with the 2,4'-MDI isomer and 1,3-phenylene diisocyanate.

Examples of aliphatic asymmetric diisocyanates are 1,6-diisocyanato-2,2,4-trimethylhexane, 1,6-diisocyanato-2,4,4-trimethylhexane and lysine diisocyanate.

Examples of preferred isocyanates are monomeric MDIs, polymeric MDI, TDIs, HDI and IPDI isomers, in particular also polymerized variants such as isocyanurates from HDI or IPDI (isophorone diisocyanate) as well as mixtures thereof and prepolymers obtainable therefrom.

Asymmetric polyisocyanates can be of particular interest in the step-by-step production of polyurethanes, since their use, under reaction of the more reactive isocyanate group, allows the production of prepolymers (in the case of the use of asymmetric diisocyanates), which can then be reacted with additional polyols in a subsequent step to form the desired polyurethanes, or (in the case of the use of asymmetric triisocyanates) thermoplastic linear polyurethanes can initially be formed, which can then be cross-linked by the addition of further polyols. The use of asymmetric polyisocyanates is known, for example, from EP 1 765 900 A1.

The reaction conditions suitable for the formation of polyurethanes from polyalcohols and polyisocyanates are well known to the person skilled in the art (see Oertel, Becker, Braun, *Kunststoffhandbuch*—volume 7, Polyurethanes, 1993; J. H. Saunders, K. C. Frisch Polyurethanes: Chemistry and Technology Part II, 1964; C. Defonseka, Flexible Polyurethane Foams: A Practical Guide, 2019; M. Szycher Syzchers Handbook of Polyurethanes 2017; and U. Meier-Westhues, K. Danielmeier, Polyurethanes: Coatings, Adhesives and Sealants 2019).

For example, 100 parts by mass of hydroxy fatty acid condensate (or mixtures of hydroxy fatty acid condensates) can be heated to 70° C. to 100° C., 0.5 to 5 parts by mass molecular sieve 3 Å and 0.001 to 0.5 parts by mass of a catalyst (e.g. a bismuth compound) are added and after homogenization, a diisocyanate, triisocyanate, tetraisocyanate, pentaisocyanate or a combination thereof are added to this mixture, wherein the ratio of the isocyanate groups to hydroxy groups is preferably 1.0 to 1.1 (in particular at about 1.05). After mixing, this mixture can be poured into a desired mold and cured at a temperature of 70° C. to 100° C.

In a concrete example, 100 g of hexane-1,6-diyl-bis-(10-hydroxyoctadecanoate) (OH number 164) are melted and 1.5 wt.-% molecular sieve 3 Å (UOP L powder) and 0.2 wt.-% Byk A 535 and 0.03 wt.-% of a bismuth catalyst (e.g. Borchi Cat 315 EU) are added at 85° C. This mixture is homogenized and degassed under vacuum for 2 min at 1,000 rpm. Then 58.3 g of an HDI-based difunctional diisocyanate are added (e.g. Desmodur N3400, NCO content: 21.8 wt.-%), wherein the ratio of NCO to OH groups is 1.05. This mixture is mixed for 30 sec under vacuum at 1,000 rpm and then poured into a rectangular mold at 85° C. and cured at that temperature. After 10 min at 85° C., the piece can be removed from the mold. The result is a transparent polyurethane body whose final physical properties are achieved after 7 days of storage at 23° C. and 50% RH.

If a subsequent undesired release or reaction of a local isocyanate excess is to be avoided or a coupling of the product in polyester systems is desired, the amount of isocyanates can be kept slightly smaller in the reactive mixture than the stoichiometric equivalent relative to the available OH groups of the hydrated carboxylic acids. Usually, however, a ratio of the isocyanate groups to hydroxy groups of 1.0 to 1.1 is preferred.

In a preferred embodiment, a polyurethane reactive mass comprises several components in addition to the subject matter of the present invention. The components include at least one alcohol, at least one isocyanate, residual suspending and auxiliary substances as well as unavoidable impurities.

Preferably, the preparation of the polyurethanes of the present invention is carried out as a one-pot process. In this case, control and auxiliary substances, such as mineral and/or inorganic fillers, such as e.g. chalk, clay, diatomaceous earth, wood-cellulose fibers or polyester packings and films, can be chemically integrated into the polyurethane structure. This addition of these suspending and auxiliary substances can be carried out before, during, or after polymerization.

As is clear to the person skilled in the art, the present invention allows the production of polyurethanes with excellent product properties from predominantly renewable raw materials, which are at least equal to the conventional petrochemically obtained polyurethanes. In addition, the process described here makes it possible for the first time to produce these polyurethanes with economically justifiable effort so that it can be expected that the demand for cost-efficient bio-based polyurethanes can finally be met. In addition, it is conceivable that the biodegradability of the polyurethanes obtained according to the present invention (e.g. by means of enzymes) is significantly improved compared to previously available polyurethanes. This is due, among other things, to the basic ester structure, which is a suitable starting material for numerous enzymes.

The present invention is described in more detail with reference to the following examples, but without being limited to these examples.

EXAMPLES

Example 1: Preparation of the Sn-Ohy Crude Extract

An Sn-Ohy crude extract was used in which Sn-Ohy was used with the sequence deposited in Uniprot as A0A172MLH9 with the only difference that in addition to this sequence of Sn-Ohy in pET28(a), an N-terminal $His_6$ tag (pET28-Sn-Ohy(N)$His_6$) with the sequence ATGGGCAGCAGCCATCATCATCATCATCAT-CACAGCAGCGGCCTGGTGCCGCGCGGCA GCCAT (SEQ ID NO.3) was added as well, resulting in a nucleotide sequence of 2022 bp (SEQ ID NO.1):

ATGGGCAGCAGCCATCATCATCATCATCACAGCAGCGGCCTGGTGCCGC

GCGGCAGCCATATGGAAGAAGTGAGTTATCCCAAAGCTGGACCGAGCAT

TGAAGCGAACGTAGGGGATGGGCACTGGCGAAAGGGGCCCTCGGATACG

CTGCCGCCTCCGGACACTGTTGGACCCTATATGCGCAACCGCCCCCTGC

CTGTGGATCAAGTGGAAGGCAGGAAAGCATGGATCATCGGAAGTGGAAT

CGCGGGTCTGGCCTCTGCCTTTTACTTGATCCGCGACGGGCGGATGAAG

GGGCAGGACATAACCATCCTCGATGCCGTGGGCACTCCAGGCGGATCAC

TGGACGGCTCAGGGAACGCCGAAGATGGCTACCTGATCCGAGGCGGGCG

CGAGATGAACTGGAACTACGATCACTTTTGGGATCTCTTCCAGGACATT

CCCGCGCTGGAGTACCCGTCCCCTTACTCGGTCTTGGATGAGTATCGGG

CGGTGAACGACAATGATCCTAATTGGTCCAAGTCCCGATTGATGCACAA

GCAAGGCCAAATTCGGGATTTCAGCACCTTGGGGCTTTCTTCCGCCCAC

CAATGGGAATTGATCAAGCTTCTCCTGAAGCGCAAGGAGGACCTCGATG

ACATCACCATCGAACAGTACTTCAGCGATAGCTTTCTGGAGACCAACTT

CTGGTACCTCTGGCGCTCGATGTTTGCGTTCCAGAACTGGCAAAGTCTG

CTGGAAGTGAAGTTGTACATGCATCGCTTTTTGGATGCAATCGACGGCT

TGACGGATATGTCAGCGCTCGTGTTCCCAAAATACAACCAGTACGACAG

CTTCGTCGTCCCCCTGGTCAACTACCTCAAGGGCCAAGGCGTCAACGTA

GAATTCGGCACGCGCGTCTACGACCTGGACATGACGGACAACAACGGCG

AGCGTACCGTGACCTCCATTCTTGCGAAGGTAGACGGGCGGGATCAGAA

GATTGACATCGGCGCGAAGGACGTGGTTTTTGCCCTGACTGGATCGATG

ACGGAGGGTACAGCCTACGGCGATCTGGATACTGCTCCCGACCTCACTC

GAGCCACCACGCCCCTGGCGACTCAAGCGATTGGGCGTTGTGGCAGAA

CCTGGCCAAGAAGTCCCACGTCTTTGGTAAGCCTGAAAAGTTCTGCGGG

CAACCCAGTCGCTCGATGTGGGAGTCTGCCACCCTGACGTGCAAGCCTT

CGCCGTTGACCGAGCGCCTCAAAGATCTCTCAATCAATGACCCTTATTC

GGGAAAAACGGTGACCGGTGGAATCATCACCTTTACCGACTGGAACTGG

GTTCTCAGCTTCACCTGCAATCGTCAACCGCATTTCCCCACACAACCAG

ACGACGTACTGGTGCTTTGGGTCTATGCCTTGGTCATGGACAGCAAAGG

-continued

```
CAACCATGTACTAAAACCAATGCCTGAGTGTACGGGCCGCGAAATTCTT

GCTGAGCTTTGCTACCACCTCGGCATTGTGGATCAGGTGGATGAAGTGG

CCAGACAGACCAAGGTTCGCCTTGCCCTGATGCCATTCATCACGGCTCA

ATTTATGCCACGAGCTGCTGGAGATCGACCGCGTGTTGTTCCAGCCGGG

TGCACCAATCTCGCTCTGCTGGGCCAATTCGTGGAGACGTCTAATGACA

TCATCTTCACCATGGAGAGTTCCGTCAGGACTGCGCGGATTGGCGTGTA

CACGCTTCTGGGGCTACGAAAGCAGGTCGCCGATATCAGCCCCACGCAA

TACGACGTCCGAAATCTGATCAAGGGTGCTCGTGCCCTGAACAACAACG

AGCCGTTCATGGGCGAGCGGCTGCTCCATCGACTGCTCGACAACACCTA

CTTCGCCCACATCCTCCCGCCGCTGCCAGCAGGAGACGGTGGATCCAGC

GATCAAGCGGCAAGCTCGCGTATGAAGGCCAACCACACTGCGGCGGCGG

CACTTGGAGCGGTGTCTGATTGGATCCATCATGTTCGGGATAAACTGAA

GCCGGGCGCCTGA
```

The corresponding amino acid sequence, which had 673 amino acids and a mass of 75.0 kDa, was thus as follows (SEQ ID NO.2):

MGSSHHHHHHSSGLVPRGSHMEEVSYPKAGPSIEANVGDGHWRKGPSDT

LPPPDTVGPYMRNRPLPVDQVEGRKAWIIGSGIAGLASAFYLIRDGRMK

GQDITILDAVGTPGGSLDGSGNAEDGYLIRGGREMNWNYDHFWDLFQDI

PALEYPSPYSVLDEYRAVNDNDPNWSKSRLMHKQGQIRDFSTLGLSSAH

QWELIKLLLKRKEDLDDITIEQYFSDSFLETNFWYLWRSMFAFQNWQSL

LEVKLYMHRFLDAIDGLTDMSALVFPKYNQYDSFVVPLVNYLKGQGVNV

EFGTRVYDLDMTDNNGERTVTSILAKVDGRDQKIDIGAKDVVFALTGSM

TEGTAYGDLDTAPDLTRATTPPGDSSDWALWQNLAKKSHVFGKPEKFCG

QPSRSMWESATLTCKPSPLTERLKDLSINDPYSGKTVTGGIITFTDSNW

VLSFTCNRQPHFPTQPDDVLVLWVYALVMDSKGNHVLKPMPECTGREIL

AELCYHLGIVDQVDEVARQTKVRLALMPFITAQFMPRAAGDRPRVVPAG

CTNLALLGQFVETSNDIIFTMESSVRTARIGVYTLLGLRKQVADISPTQ

YDVRNLIKGARALNNNEPFMGERLLHRLLDNTYFAHILPPLPAGDGGSS

DQAASSRMKANHTAAAALGAVSDWIHHVRDKLKPGA where the bold portion contains the His tag and the remaining sequence corresponds to the sequence stored in Uniprot as A0A172MLH9.

Preparation of Competent *E. coli* Cells

For the preparation of the main culture, 250 µL of an *E. coli* BL21(DE3) preculture was transferred to a sterile flask with 25 mL LB medium. For the pre-culture, 5 mL LB medium was placed in sterile test tubes. A single colony was isolated from an agar plate with *E. coli* BL21(DE3) cells and transferred to a test tube. The pre-culture was incubated overnight at 37° C. and 180 rpm. The main culture was harvested after having reached an OD of 0.35-0.4 and cooled to 4° C. The cells were transferred to sterile vessels and centrifuged (800×g and 4° C. for 15 minutes). The supernatant was discarded. The cell pellet was resuspended in 5 mL calcium chloride solution (100 mM) and the suspension was cooled to 4° C. for 20 minutes.

The suspension was then centrifuged (800×g and 4° C. for 10 minutes) and the supernatant was discarded. The cells were resuspended in 500 µL of a solution of calcium chloride (100 mM) and 15% aqueous glycerol solution. The resuspension was aliquoted in sterile vessels (50 µL) and stored at −80° C.

Transformation of pET28-Sn-Ohy(N)His6 to *E. coli* BL21 (DE3)

For the transformation of pET28 Sn-Ohy into *E. coli* BL21(DE3), the plasmid (pET28-Sn-Ohy(N)His$_6$, 0.5 µL) was added to the competent cells (50 µL) and incubated for 30 min at 4° C. After heat shock at 42° C. for 90 s, the cells were incubated for another 5 min at 4° C. LB medium (1 mL) was added to the transformation mixture and incubated for 1-2 h at 37° C. and 160-180 rpm. Subsequently, the cell suspension was plated on agar plates with the appropriate antibiotic (kanamycin 50 µg mL$^{-1}$) and incubated for 18 h at 37° C. for 18 h in the incubator.

Overexpression of Sn-Ohy in *E. coli* BL21(DE3)

For the overexpression of Sn-Ohy in *E. coli* BL21(DE3), pre-cultures were inoculated in test tubes. For this purpose, it was added to LB medium and kanamycin 50 µg mL$^{-1}$ (and a colony of the transformed *E. coli* (*E. coli* BL21(DE3)-pET28-Sn-Ohy(N)His$_6$,). The cultures were incubated for 17-21 h at 37° C. and 170-180 rpm.

For the main cultures, TB medium and kanamycin (50 µg mL$^{-1}$) were presented in an Erlenmeyer flask and inoculated with 1% of the preculture. The cultures were incubated at 37° C. and 180 rpm. At an optical density (OD) of 0.6-1.0, IPTG (0.5 mM mL$^{-1}$) was induced and the incubation temperature was lowered to 20° C. 18-20 h after induction, the bacteria were pelletized by centrifuging the main cultures (4000x·g, 4° C., 30 min). The cell pellets were then stored at −20° C.

Cell Disruption and Extraction of the Crude Extract

For cell disruption, the cell pellets were resuspended in KPi buffer (50 mM, pH 6.3) (25% cell suspension). The cells were disrupted by ultrasound (3×3-5 min, approx. 20% power) at 4° C. By subsequent centrifugation (20 min, 20000x·g, 4° C.) of the cell lysate, the cell debris was separated from the soluble protein.

Bradford Assay

To determine the protein concentration, the protein solution was applied to the microtiter plate in different dilutions (1:10 to 1:100, 5 µL each) and, as a reference, the BSA standard series with known protein concentrations (5 µL each) was applied. Subsequently, Bradford reagent (250 µL) was added and after an incubation period of 15 min at 25° C., the absorption was measured at 595 nm. The concentration measurement was carried out as a three-fold determination.

Example 2: Hydration of Oleic Acid

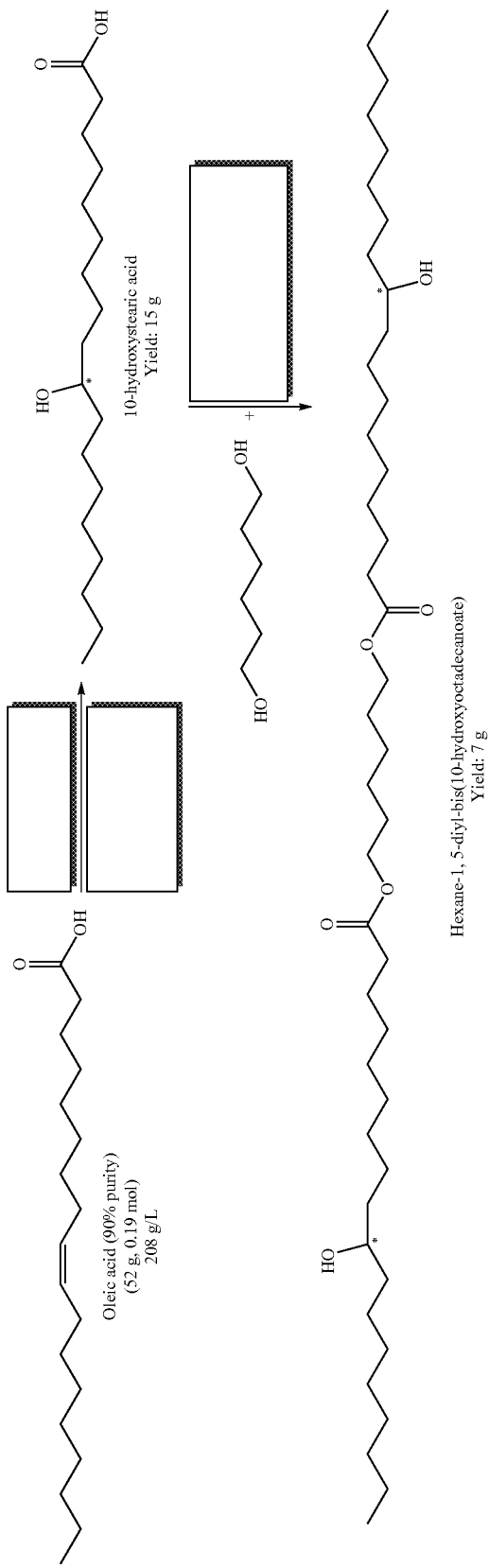

Oleic acid (90% purity, 52 g, 0.18 mol) was prepared with DMSO (12.5 mL), 237.5 mL KPi buffer (pH 6.5, 100 mM), and 20 mL Sn-Ohy crude extract (disruption by ultrasound, 25% cell suspension, 5×5 min, 5×5 cycles, 20%; protein concentration of the crude extract 15 mg/mL). Sn-Ohy is a hydratase of the organism *Stenotrophomonas nitritireducens* and was described, for example, by Kim et al. in 2010 (Conversion of oleic acid to 10-hydroxystearic acid by whole cells of *Stenotrophomonas nitritireducens*, Biotechnology letters, vol 33, pp. 993-997, May 2010).

The reaction solution was stirred at 35° C. for six days, then filtered, washed with MTBE and finally recrystallized from MTBE. After drying, 15 g (0.05 mol) of 10-hydroxystearic acid was isolated and characterized by means of $^1$H-NMR spectroscopy.

$^1$H-NMR (500 MHz, CDCl$_3$) δ/ppm=3.61 (m, 1H), 2.37 (t, $^3$J=7.5 Hz, 2H), 1.66 (q, $^3$J=7.2 Hz, 2H), 1.47 (m, 4H) 1.31 (m, 22H), 0.90 (t, $^3$J=6.8 Hz, 3H)

Example 3: Hydration of Linoleic Acid

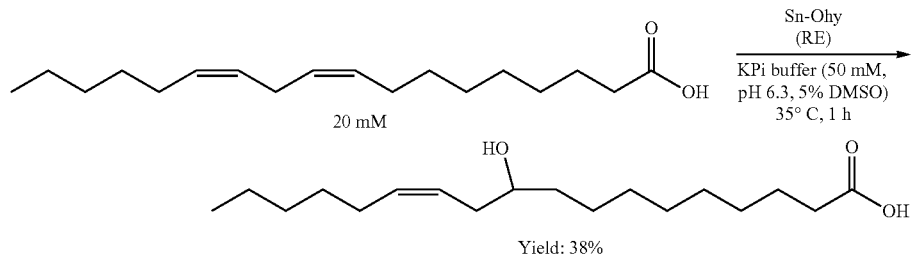

Yield: 38%

Linoleic acid (5.6 mg, 0.02 mmol, 20 mM) was dissolved in DMSO (50 µL). Thereafter, KPi buffer (pH 6.3, 50 mM, 850 µL), Sn-Ohy crude extract (100 µL, 15 mg mL$^{-1}$ protein concentration) were added to the reaction mixture and stirred at 35° C. and 850 rpm for 1 h. The crude product was extracted with CDCl$_3$ (2×700 µL) and analyzed using $^1$H-NMR spectroscopy. A yield of (Z)-10-Hydroxyoctadec-12-enoic acid of 38% could be obtained.

(Z)-10-Hydroxyoctadec-12-enoic acid $^1$H-NMR (500 MHz, CDCl$_3$): [ppm]=5.64-5.54 (m, 1H), 5.48-5.38 (m, 1H), 3.64 (p, $^3$J=6.1 Hz, 1H), 2.37 (t, $^3$J=7.5 Hz, 2H), 2.24 (t, $^3$J=6.8 Hz, 2H), 2.07 (m, 2H), 1.66 (p, $^3$J=7.6 Hz, 2H), 1.48 (h, $^3$J=8.2, 6.8 Hz, 2H), 1.43-1.31 (m, 16H), 0.91 (t, $^3$J=6.8 Hz, 3H).

Example 4: Hydration of Linolenic Acid

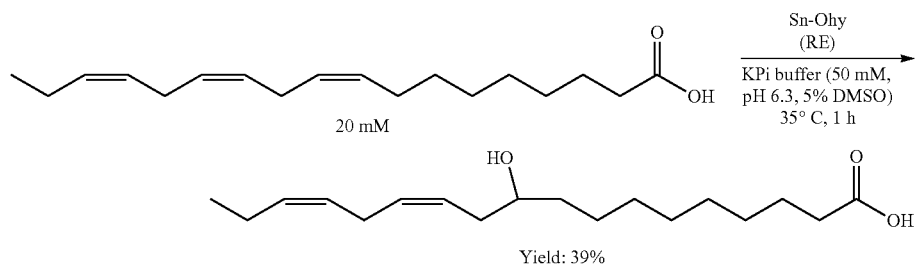 [SMILES: CC/C=C\C/C=C\C/C=C\CCCCCCCC(=O)O ; CC/C=C\C/C=C\CC(O)CCCCCCCCC(=O)O]

Yield: 39%

Linoleic acid (5.6 mg, 0.02 mmol, 20 mM) was dissolved in DMSO (50 µL). Thereafter, KPi buffer (pH 6.3, 50 mM, 850 µL), Sn-Ohy crude extract (100 µL, 15 mg mL$^{-1}$ protein concentration) were added to the reaction mixture and stirred at 35° C. and 850 rpm for 1 h. The crude product was extracted with CDCl$_3$ (2×700 µL) and analyzed using $^1$H-NMR spectroscopy. A yield of (12Z,15Z)-10-Hydroxyoctadeca-12,15-dienoic acid of 39% could be obtained.

(12Z,15Z)-10-Hydroxyoctadeca-12,15-dienoic acid $^1$H-NMR (500 MHz, CDCl$_3$): [ppm]=5.64-5.40 (m, 4H), 3.64 (p, $^3$J=6.1 Hz, 1H), 2.37 (t, $^3$J=7.5 Hz, 2H), 2.86-2.75 (m, 2H), 2.24 (t, $^3$J=6.8 Hz, 2H), 1.66 (p, $^3$J=7.6 Hz, 2H), 1.48 (h, $^3$J=8.2, 6.8 Hz, 2H), 1.43-1.31 (m, 12H), 0.91 (t, $^3$J=6.8 Hz, 3H).

Example 5: Formation of an Ester Polyol from Hydrated Oleic Acid and a Diol

The resulting 10-hydroxystearic acid (15 g (0.05 mol)) was dissolved in equal volumes of MTBE and n-heptane.

Subsequently, hexane-1,6-diol (5.61 g, 0.05 mmol), CAL-B (1.5 g) and molecular sieve (0.4 nm, 20 g) were added and stirred for 14 h at 35° C. in the SpinChem® reactor.

CAL-B is the lipase B of the organism *Candida antarctica* and has been described, for example, by Haeffner et al. in 1998 (F. Haeffner, T. Norin and K. Hult 'Molecular modeling of the enantioselectivity in lipase-catalyzed transestrifications reactions', *Biophys. J.*, 74(3), p. 1251-1262, March 1998). The lipase CAL-B used in this experimental example is commercially available in immobilized form (54326 Sigma-Aldrich Lipase B *Candida antarctica* immobilized on Immobead 150, recombinant from *Aspergillus oryzae*).

The solvent was removed under vacuum and the crude product was isolated by column chromatography (cy clohexane:EtOAc, 3:1).

7 g Hexane-1,6-diyl-bis(10-hydroxyoctadecanoate) was separated; the compound was characterized by NMR and MS.

1H-NMR (500 MHz, CDCl$_3$) δ/ppm=4.08 (t, $^3$J=6.7 Hz, 4H), 3.60 (q, $^3$J=5.8, 5.1 Hz, 2H), 2.31 (t, $^3$J=7.5 Hz, 4H), 1.69-1.59 (m, 8H), 1.46-1.38 (m, 16H), 1.31 (d, $^3$J=9.2 Hz, 40H), 0.90 (t, $^3$J=6.7 Hz, 6H); $^{13}$C-NMR (126 MHz, CDCl$_3$) δ/ppm=$^{13}$C NMR (126 MHz, CDCl$_3$) a/ppm=173.96, 72.00, 64.17, 29.73, 29.64, 29.61, 29.43, 29.29, 29.21, 29.14, 28.56, 25.66, 24.99, 22.68, 14.12; MS (ESI): m/z=706.2 [M+Na$^+$].

Compared to established diols, the resulting ester polyol has a much stronger tendency to form crystalline, continuous structures when reaching a solidification point narrowly defined in temperature, which indicates a very low fluctuation range and high purity. Mixed with an equimolar amount of purified castor oil, a concordantly pure and emulsion-stable mixing component with an OH functionality of 2.37+−0.01 is obtained.

With an optical reference dye (1.2% reactive dye with hydroxy-functional integration into PU structures; the OH functionality is thereby reduced by 0.01), the uniformity of the PU reactive mass visually already proves to be much more uniform after the addition of HMDI and established suspending and auxiliary agents. Streaks or fluctuating brightness during stirring and homogenizing are not visible.

Example 6: Formation of Further Ester Polyols from Hydrated Oleic Acid and Polyols

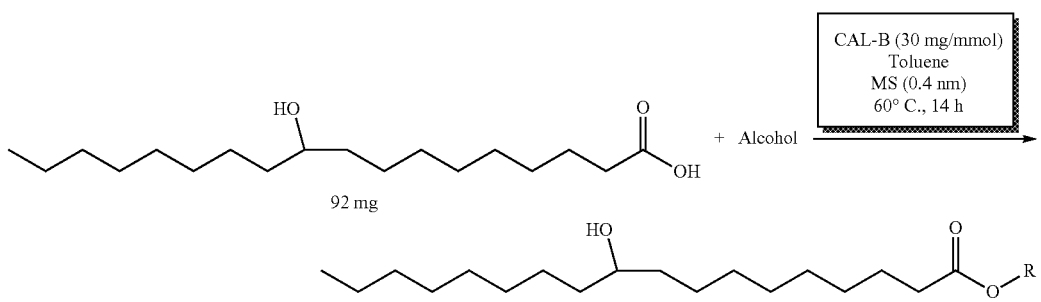

10-Hydroxystearic acid (92 mg, 0.25 mmol) was dissolved in toluene (3 mL) and then the respective alcohol component as well as the biocatalyst (lipase B from *Candida antarctica* in immobilized form, CAL-B) and the molecular sieve were added. Thereafter, the resulting reaction mixture was stirred for 14 hours at a reaction temperature of 60° C. Subsequently, the solvent was removed under reduced pressure and the resulting crude product was analyzed by mass spectrometry. Here, both the starting material and the mono-, di- or tri-, tetraesters were detected in the crude products. An overview of the alcohol components used and the amounts of molecular sieve and biocatalyst (lipase CAL-B) associated with these tests are listed in Table 1 below.

TABLE 1

Overview of the esterification experiments according to the alcohol components used in this example and the amounts of molecular sieve and biocatalyst (lipase CAL-B) associated with these experiments

| Reaction no. | Alcohol component | Alcohol | MS (0.4 nM)/mg | Lipase CAL-B/mg |
|---|---|---|---|---|
| 6-1 | 1,3-propanediol | 12.1 μL (0.50 eq) | 136 | 11 |
| 6-2 | 2-methyl-1,3-propanediol | 14.7 μL (0.50 eq) | 101 | 13 |
| 6-3 | 2,2-dimethyl-1,3-propanediol | 18.0 mg (0.50 eq) | 128 | 12 |

TABLE 1-continued

Overview of the esterification experiments according to the alcohol components used in this example and the amounts of molecular sieve and biocatalyst (lipase CAL-B) associated with these experiments

| Reaction no. | Alcohol component | Alcohol | MS (0.4 nM)/mg | Lipase CAL-B/mg |
|---|---|---|---|---|
| 6-4 | HOCH₂-C(CH₂OH)(CH₂OH)-C₂H₅ 2-ethyl-2-hydroxymethyl-1,3-propanediol | 15.1 mg (0.33 eq) | 105 | 12 |

In these experiments, the formation of the following desired products was verified by mass spectrometry:

Example 6-1

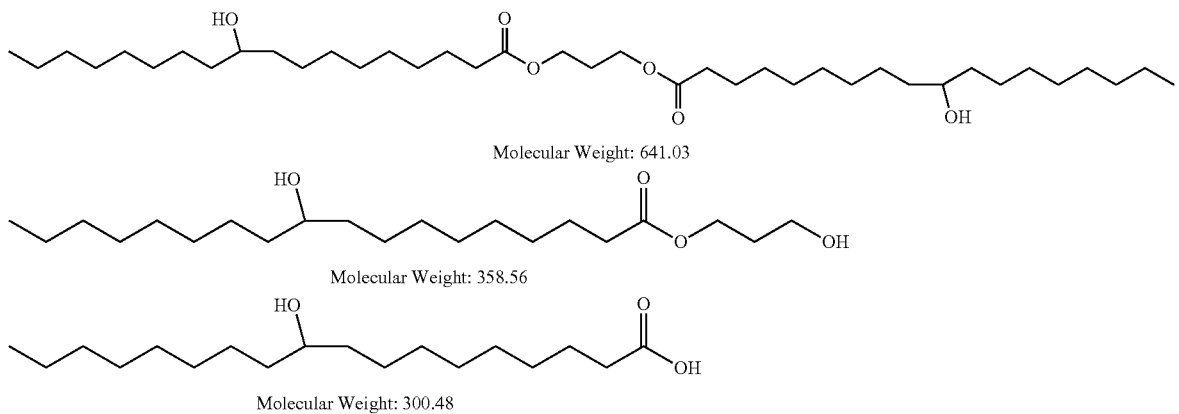

Molecular Weight: 641.03

Molecular Weight: 358.56

Molecular Weight: 300.48

Example 6-2

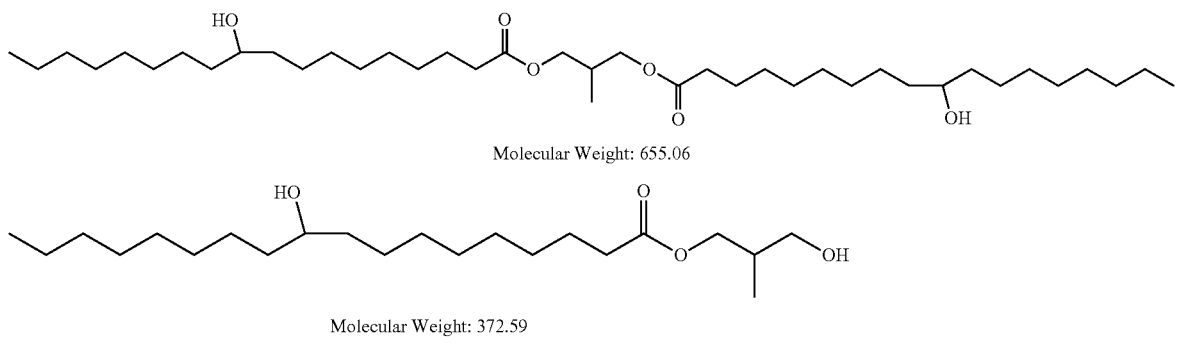

Molecular Weight: 655.06

Molecular Weight: 372.59

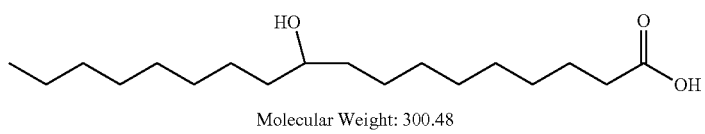

Molecular Weight: 300.48

Example 6-3

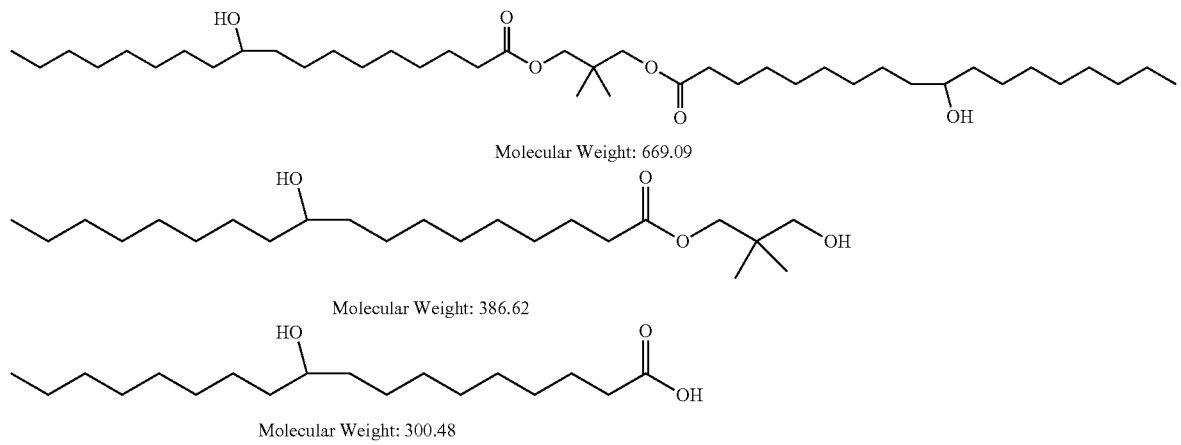

Example 6-4

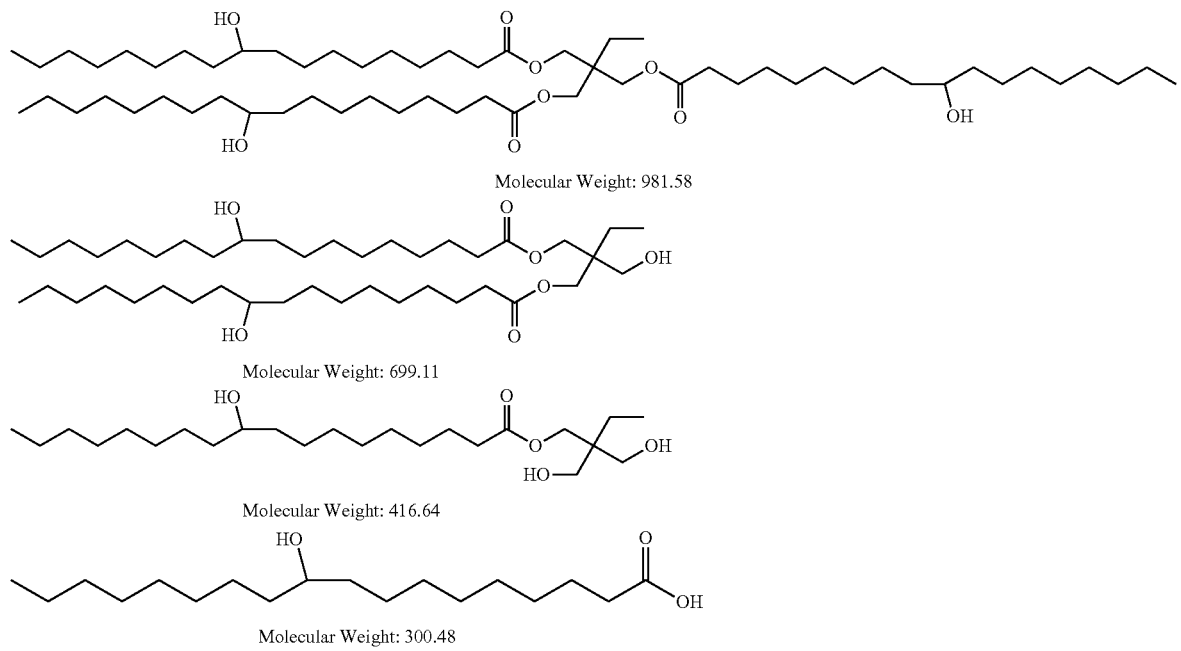

Based on these experiments, it can be seen that the purposeful formation of the following desired ester diols (i.e. diols with at least two ester bonds in the molecule) or ester triols by means of biotechnological reaction of diols or triols and hydroxy fatty acids is feasible.

Corresponding reactions with polyamines or (poly)amino (poly)alcohols are also feasible by means of amidases or synthetically for the person skilled in the art based on their general technical knowledge.

Example 7: Reaction of 12-Hydroxystearic Acid with Different Linkers

Due to better availability, the subsequent reactions were carried out with 12-hydroxystearic acid (12-HSS) instead of 10-hydroxystearic acid, which is generated by the Sn-Ohy. However, the results for esterification of 10-hydroxystearic acid and 12-hydroxystearic acid are comparable.

The reaction of 12-hydroxystearic acid with CAL-B shows that the enzyme-catalyzed reaction does not lead to self-condensation, as can be seen from both the $^1$H-NMR spectrum and the mass spectrum. Therefore, a clear advantage in enzyme-catalyzed esterification can be shown here, since neither an oligomerization reaction nor any other undesirable reaction takes place.

Various immobilization forms of lipase CAL-B are suitable for the enzymatically catalyzed esterification of 12-HSS with 1,6-hexanediol. Thus, after only six hours, both the mono- and the diester could be detected.

In further experiments, the lipase CalB 165G was used to esterify 12-HSS with different linkers. For this purpose, reactions were carried out for six and for 14 hours. It was shown that the esterification was successful, which in turn can be seen in the $^1$H-NMR spectrum as well as in the mass spectrum. Here, too, after only six hours, the mono- and diester, and in 2-ethyl-2-(hydroxymethyl)-1,3-propanediol the triester, could be detected. 2-Ethyl-2-(hydroxymethyl)-1,3-propanediol (0.11 mol) was again esterified in the 100 g scale with 12-HSS (0.33 mol). After the reaction, an OH number of 172 mgKOH/g could be determined. This triol (M=981.6 g/mol) was used to produce a polyurethane. For its preparation, the triol obtained above was stoichiometrically mixed with a mixture of aliphatic isocyanates (HDI isocyanurate and IPDI isocyanurate), spread with a doctor knife and cured at 83-85° C. A transparent film was obtained, which was colorless at a thickness of 150 μm.

Example 7a: Chemically Catalyzed Self-Condensation of 12-Hydroxystearic Acid A mixture of 12-hydroxystearic acid (10.00 g, 33.28 mmol), MTBE (20 mL) and sulfuric acid (98%, 0.3 mL, 5.63 mmol) was stirred with molecular sieve (4 Å, 1.00 g) for 6 h or 14 h at 60° C. The resulting crude product was mixed with MTBE (40 mL), washed with saturated sodium chloride solution (2×25 mL) and dried over sodium sulfate. The solvent was evaporated under reduced pressure and the product was isolated as a solid (8.36 g, 27.85 mmol, 84%).

Example 7b: Enzymatically Catalyzed Self-Condensation of 12-Hydroxystearic Acid A mixture of 12-hydroxystearic acid (10.00 g, 33.28 mmol), MTBE (20 mL) and CAL-B (1.00 g) was stirred with molecular sieve (4 Å, 1.00 g) for 6 h or 14 h at 60° C. The resulting crude product was mixed with MTBE (40 mL), washed with saturated sodium chloride solution (2×25 mL) and dried over sodium sulfate. The solvent was evaporated under reduced pressure and the product was quantitatively isolated. The $^1$H-NMR spectrum as well as the mass spectrum showed that there was no oligomerization of the 12-hydroxystearic acid during catalysis with CAL-B.

Example 7c: Esterification of 12-Hydroxystearic Acid with Hexane-1,6-Diol and Various Lipases 12-Hydroxystearic acid (0.20 g, 0.67 mmol) was dissolved in MTBE (6 mL). Thereafter, hexane-1,6-diol (0.04 g, 0.34 mmol), lipase (24 mg) and molecular sieve (4 Å, 240 mg) were added to the reaction solution and stirred at 60° C. After 6 h and 14 h, a sample (2 mL) was taken, centrifuged and the organic phase was isolated. The solvent was removed. Analysis using $^1$H-NMR spectroscopy and mass spectrometry was performed.

TABLE 2

Esterification of 12-hydroxystearic acid with hexane-1,6-diol and various lipases

| Reaction No. | Lipase | Reaction took place |
|---|---|---|
| 1 | Addzyme CalB 165G | Yes |
| 2 | CalB immo 8285 | Yes |
| 3 | CalB immo 8806 | Yes |

12-Hydroxystearic Acid (for Comparison)

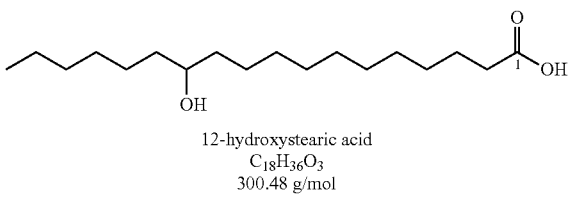 [SMILES: CCCCCCC(O)CCCCCCCCCCC(=O)O]

12-hydroxystearic acid
$C_{18}H_{36}O_3$
300.48 g/mol $^1$H-NMR (500 MHz, DMSO-d6) δ/ppm=4.18 (d, $^3$J=5.4 Hz, 1H, OH), 3.34 (m, (C12)H), 2.18 (t, $^3$J=7.4 Hz, 2H, (C2)H), 1.48 (t, $^3$J=7.2 Hz, 2H, (C3)H), 1.31 (m, 26H, $H_{alkyl}$), 0.90 (t, $^3$J=6.9 Hz, 3H, C(18)H); MS (ESI): m/z=323.48 [M+Na$^+$], 623.96 [2M+Na$^+$].

Hexane-1,6-diyl-bis(12-hydroxyoctadecanoate)

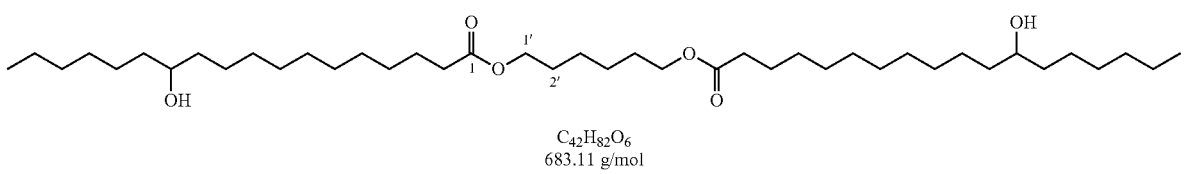 [SMILES: CCCCCCC(O)CCCCCCCCCCC(=O)OCCCCCCOC(=O)CCCCCCCCCCC(O)CCCCCC]

$C_{42}H_{82}O_6$
683.11 g/mol $^1$H-NMR (500 MHz, CDCl$_3$) δ/ppm=4.06 (d, $^3$J=6.7 Hz, (C1')H), 3.58 (m, (C12)H), 2.28 (t, $^3$J=7.6 Hz, (C2)H), 1.62 (m, (C3,2')H), 1.40 (m, $H_{alkyl}$), 1.28 (m, $H_{alkyl}$), 0.89 (m, C(18)H); MS (ESI): m/z=423.4 [M+Na$^+$] (monoester), 705.6 [M+Na$^+$] (diester).

Example 7d: Esterification of 12-Hydroxystearic Acid with CAL-B and Various Alcohol Linkers 12-Hydroxystearic acid (0.20 g, 0.67 mmol) was dissolved in MTBE (6 mL). Then, alcohol, Addzyme CalB 165G (24 mg) and molecular sieve (4 Å, 240 mg) were transferred to the reaction solution and stirred at 60° C. After 6 h and 14 h, a sample (2 mL) was taken, centrifuged and the organic phase was isolated. The solvent was removed. Analysis using $^1$H-NMR spectroscopy and mass spectrometry was performed.

TABLE 3

Esterification of 12-hydroxystearic acid with CAL-B and various alcohol linkers

| Reaction No. | Alcohol | mg | mmol | Reaction took place |
|---|---|---|---|---|
| 1 | 2-Butyl-2-ethyl-1,3-propanediol | 53.5 | 0.33 | Yes |
| 2 | 2-Ethyl-2-(hydroxymethyl)1,3-propanediol | 30.0 | 0.22 | Yes |
| 3 | 1,2-Propanediol | 25.3 | 0.33 | Yes |
| 4 | 1,3-Propanediol | 25.3 | 0.33 | Yes |
| 5 | 1,4-Butanediol | 30.0 | 0.33 | Yes |
| 6 | 1,3-Butanediol | 30.0 | 0.33 | Yes |
| 7 | 2-Methyl-1,3-propanediol | 30.0 | 0.33 | Yes |
| 8 | 1,5-Pentanediol | 34.7 | 0.33 | Yes |

2-Butyl-2-ethylpropane-1,3-diyl-bis(12-hydroxyoctadecanoate)

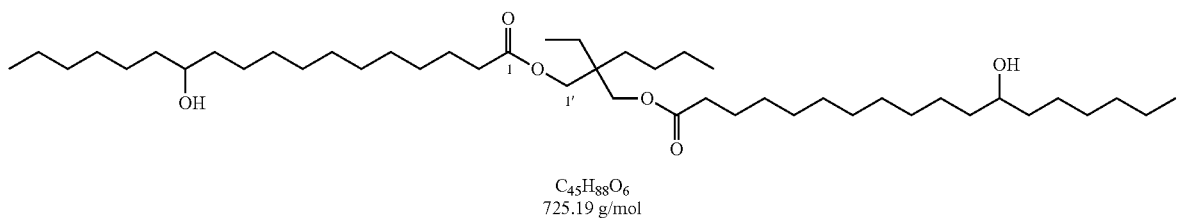 [SMILES: CCCCCCC(O)CCCCCCCCCCC(=O)OCC(CC)(CCCC)COC(=O)CCCCCCCCCCC(O)CCCCCC]

$C_{45}H_{88}O_6$
725.19 g/mol $^1$H-NMR (500 MHz, CDCl$_3$) δ/ppm=3.97 (s, (C1')H), 3.59 (m, (C12)H), 2.34 (m, (C2)H), 1.62 (m, (C3)H), 1.43 (m, H$_{alkyl}$), 1.29 (m, H$_{alkyl}$), 0.89 (m, C(18)H); MS (ESI): m/z=465.7 [M+Na$^+$] (monoester), 748.2 [M+Na$^+$] (diester).

2-Ethyl-2-(((12-hydroxyoctadecanoyl)oxy)methyl)propane-1,3-diyl-bis(12-hydroxyoctadecanoate)

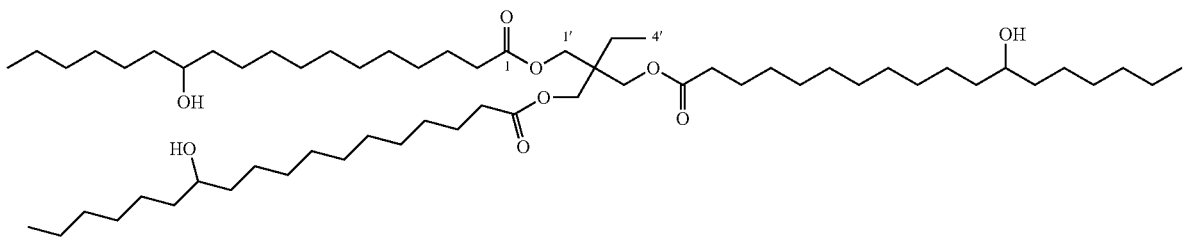 [SMILES: CCCCCCC(O)CCCCCCCCCCC(=O)OCC(CC)(COC(=O)CCCCCCCCCCC(O)CCCCCC)COC(=O)CCCCCCCCCCC(O)CCCCCC]

$^1$H-NMR (500 MHz, CDCl$_3$) δ/ppm=4.03 (s, (C1')H), 3.58 (m, (C12)H), 2.33 (m, (C2)H), 1.63 (m, (C3)H), 1.42 (m, H$_{alkyl}$), 1.28 (m, H$_{alkyl}$), 0.88 (t, $^3$J=6.7 Hz, C(18, 4')H); MS (ESI): m/z=439.6 [M+Na$^+$] (monoester), 722.1 [M+Na$^+$] (diester), 1004.6 (triester). Theoretical OH number: 171.5, experimentally determined: 172, melting range: 50-53° C.

Propane-1,2-diyl-bis(12-hydroxyoctadecanoate)

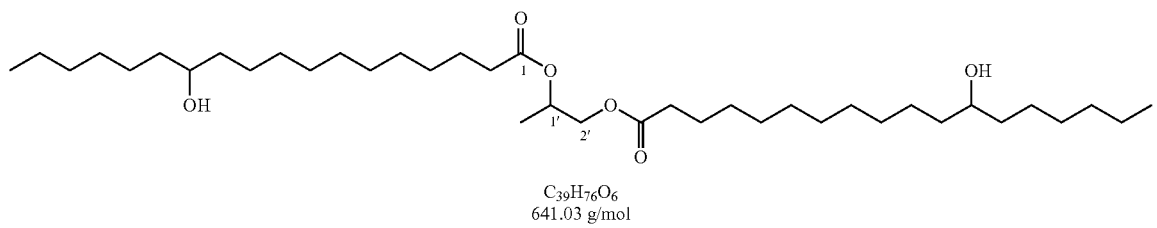 [SMILES: CCCCCCC(O)CCCCCCCCCCC(=O)OCC(C)OC(=O)CCCCCCCCCCC(O)CCCCCC]

$C_{39}H_{76}O_6$
641.03 g/mol

¹H-NMR (500 MHz, CDCl₃) δ/ppm=5.13 (qd, ³J=6.7 Hz, ⁴J=3.7 Hz, C(1')H), 4.22 (dd, ⁴J=11.7, 3.6 Hz, C(2')H) 4.05 (dd, ³J=6.6, ⁴J=11.7, C(2')H), 3.58 (m, (C12)H), 2.30 (m, C(2)H), 1.62 (m, (C3)H), 1.42 (m, H$_{alkyl}$), 1.28 (m, H$_{alkyl}$), 0.88 (m, C(18)H); MS (ESI): m/z=381.5 [M+Na⁺] (monoester), 664.0 [M+Na⁺] (diester).

Propane-1,3-diyl-bis(12-hydroxyoctadecanoate)

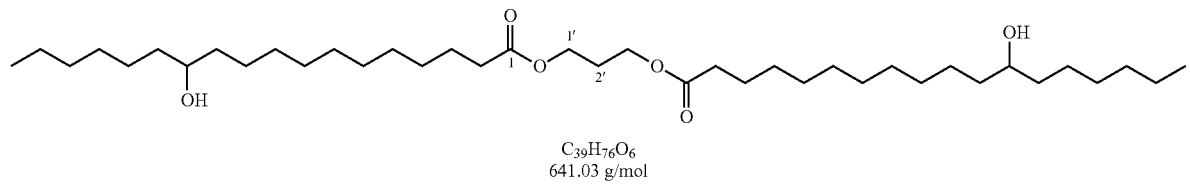 [SMILES: CCCCCCC(O)CCCCCCCCCCC(=O)OCCCOC(=O)CCCCCCCCCCC(O)CCCCCC ; "C39H76O6641.03 g/mol"]

C₃₉H₇₆O₆
641.03 g/mol

¹H-NMR (500 MHz, CDCl₃) a/ppm=4.15 (t, ³J=6.3 Hz, (C1')H), 3.58 (m, (C12)H), 2.29 (t, ³J=7.6 Hz (C2)H), 1.96 (q, ³J=6.3 Hz, (C3,2')H), 1.61 (m, (C3)H), 1.42 (m, H$_{alkyl}$), 1.27 (m, H$_{alkyl}$), 0.89 (m, C(18)H); MS (ESI): m/z=381.5 [M+Na⁺] (monoester), 664.0 [M+Na⁺](diester).

Butane-1,4-diyl-bis(12-hydroxyoctadecanoate)

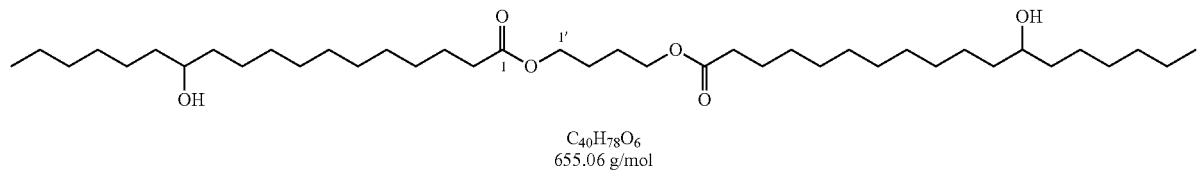 [SMILES: CCCCCCC(O)CCCCCCCCCCC(=O)OCCCCOC(=O)CCCCCCCCCCC(O)CCCCCC]

C₄₀H₇₈O₆
655.06 g/mol

¹H-NMR (500 MHz, CDCl₃) δ/ppm=4.09 (m, (C1')H), 3.58 (m, (C12)H), 2.29 (t, ³J=7.6 Hz, (C2)H), 1.69 1.62 (m, (C3)H), 1.42 (m, H$_{alkyl}$), 1.28 (m, H$_{alkyl}$), 0.88 (t, ³J=7.0 Hz, C(18)H); MS (ESI): m/z=395.6 [M+Na⁺] (monoester), 678.0 [M+Na⁺] (diester).

Butane-1,3-diyl-bis(12-hydroxyoctadecanoate)

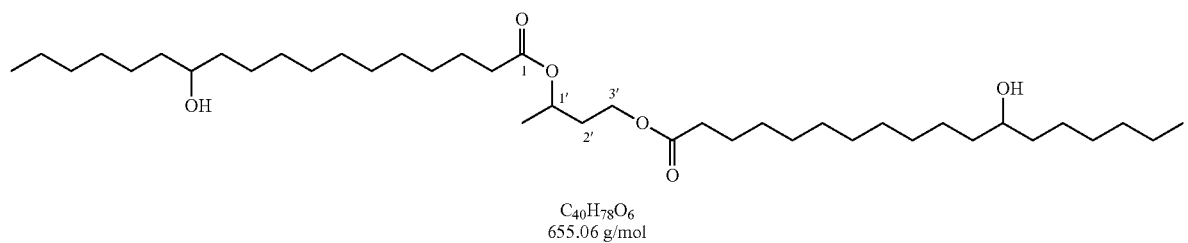 [SMILES: CCCCCCC(O)CCCCCCCCCCC(=O)OCCC(C)OC(=O)CCCCCCCCCCC(O)CCCCCC]

C₄₀H₇₈O₆
655.06 g/mol

¹H-NMR (500 MHz, CDCl₃) δ/ppm=5.01 (m, (C1')H), 4.11 (m, (C3')H)), 3.57 (m, (C12)H), 2.27 (m, (C2)H), 1.87 (m, (C4')H)), 1.59 (m, (C3)H), 1.42 (m, H$_{alkyl}$), 1.27 (m, H$_{alkyl}$), 0.88 (m, C(18)H); MS (ESI): m/z=395.6 [M+Na⁺] (monoester), 678.0 [M+Na⁺] (diester).-

2-Methylpropane-1,3-diyl-bis(12-hydroxyoctade-canoate)

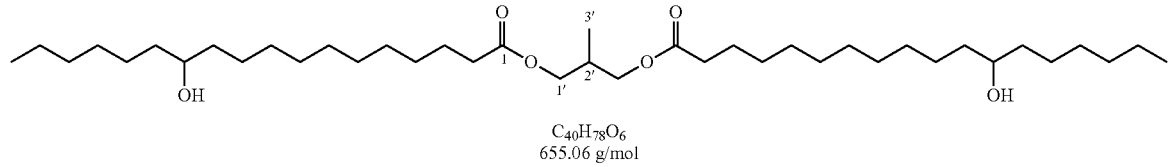 [SMILES: CCCCCCC(O)CCCCCCCCCCC(=O)OCC(C)COC(=O)CCCCCCCCCCC(O)CCCCCC]

C₄₀H₇₈O₆
655.06 g/mol

¹H-NMR (500 MHz, CDCl₃) δ/ppm=4.01 (m, C(1')H), 3.58 (m, (C12)H), 2.30 (t, ³J=7.6 Hz, (C2)H), 2.16 (m, C(2')H), 1.62 (t, ³J=7.2 Hz, (C3)H), 1.43 (m, $H_{alkyl}$), 1.28 (m, $H_{alkyl}$), 0.88 (m, C(18)H); MS (ESI): m/z=395.6 [M+Na⁺] (monoester), 678.0 [M+Na⁺] (diester).

Pentane-1,5-diyl-bis(12-hydroxyoctadecanoate)

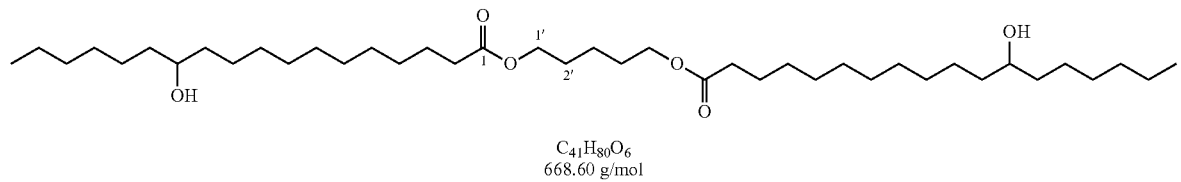 [SMILES: CCCCCCC(O)CCCCCCCCCCC(=O)OCCCCCOC(=O)CCCCCCCCCCC(O)CCCCCC]

C₄₁H₈₀O₆
668.60 g/mol

¹H-NMR (500 MHz, CDCl₃) δ/ppm=4.06 (d, ³J=5.2; 6.7 Hz, (C1')H), 3.58 (m, (C12)H), 2.28 (m, (C2)H), 1.62 (m, (C3,2')H), 1.40 (m, $H_{alkyl}$), 1.28 (m, $H_{alkyl}$), 0.89 (m, C(18) H); MS (ESI): m/z=409.3 [M+Na⁺] (monoester), 692.06 [M+Na⁺] (diester).

Example 7e: Esterification of 12-hydroxystearic acid with CAL-B and 2-ethyl-2-(hydroxymethyl)-1,3-propanediol 12-Hydroxystearic acid (100 g, 0.33 mol) was dissolved in MTBE (500 mL). Then, 2-ethyl-2-(hydroxymethyl)-1,3-propanediol (14.9 g, 0.11 mol), Addzyme CalB 165G (12 g) and molecular sieve (4 Å, 50 g) were added to the reaction solution and stirred at 60° C. for 16 h. The sample was centrifuged, the organic phase was isolated and the solvent was removed. The OH number was determined on the basis of the DIN 53240-2 standard.

Example 7f: Preparation of a Polyurethane

The triol of 2-ethyl-2-(hydroxymethyl)-1,3-propanediol and 12-hydroxystearic acid described above, OH number 172, was reacted with a mixture of aliphatic isocyanates (HDI isocyanurate, IPDI isocyanurate, isocyanate content: 21%) to form a clear, uncolored, bubble-free polyurethane.

For this purpose, 5 g of triol were weighed and heated to 60° C. After melting, the material was vented in a centrifugal mixer under vacuum. Subsequently, 3.17 g of the polyisocyanate described above (also preheated to 60° C.) were added and mixed intensively in the centrifugal mixer under vacuum. The mixture thus obtained was applied to a heating table by means of a doctor knife and cured at 83-85° C. After 150 sec, a solid polymer was obtained. To complete the reaction, the film was stored for 7 days at 23° C. and 50% RH. The Shore hardness measurement yielded Shore A 60 and Shore D 15. The infrared spectrum showed the expected absorption bands of an aliphatic polyurethane.

The invention claimed is:

1. A method for producing a hydroxy fatty acid condensate or a mixture of hydroxy fatty acid condensates, the method comprising the steps of:
providing one or more fatty acids having at least one C=C double bond functionality,
biotechnologically adding $H_2O$ to at least one C=C double bond functionality of the one or more fatty acids and thus obtaining one or more hydroxy fatty acids,
reacting the one or more hydroxy fatty acids with one or more at least divalent linker groups and thus obtaining a hydroxy fatty acid condensate or a mixture of hydroxy fatty acid condensates.

2. The method according to claim 1, wherein the one or more at least divalent linker groups are selected from polyols, polyamines and (poly)amino(poly)alcohols.

3. The method according to claim 1, wherein the one or more at least divalent linker groups are one or more aliphatic polyols.

4. The method according to claim 1, wherein the one or more at least divalent linker groups are selected from aliphatic α-ω-alkanediol, α-ω-alkanetriol, α-ω-alkantetraol, α-ω-alkanepentaol or α-ω-alkanehexaol, or combinations thereof.

5. The method according to claim 1, wherein the one or more at least divalent linker groups are selected from 1,3-propanediol, 2-methyl-1,3-propanediol, 2,2-dimethyl-1,3-propanediol, 2-ethyl-2-hydroxymethyl-1,3-propanediol and 1,6-hexanediol, and combinations thereof.

6. The method according to claim 1, wherein at least one hydroxy group of the at least divalent linker groups is esterified with a hydroxy fatty acid.

7. The method according to claim 1, wherein the one or more fatty acids having at least one C=C double bond functionality are selected from the group consisting of aliphatic $C_{6-40}$ carboxylic acids having one, two or three C=C double bond functionalities.

8. The method according to claim 1, wherein the one or more fatty acids having at least one C=C double bond functionality are selected from the group consisting of monounsaturated fatty acids and polyunsaturated fatty acids.

9. The method according to claim 1, wherein the one or more fatty acids having at least one C=C double bond functionality are selected from oleic acid, linoleic acid, linolenic acid, palmitoleic acid, and combinations thereof.

10. The method according to claim 1, wherein the one or more fatty acids having at least one C=C double bond functionality comprise at least 70 mol-% of one or more fatty acid selected from oleic acid, linoleic acid, and linolenic acid.

11. The method according to claim 1, wherein the biotechnological addition of $H_2O$ is carried out by means of a hydratase.

12. The method according to claim 1, wherein the reaction with one or more at least divalent linker groups is carried out with at least one hydroxylase enzyme.

13. The method according to claim 12, wherein the reaction with one or more at least divalent linker groups is carried out with at least one lipase.

14. The method according to claim 1, wherein the reaction of the one or more hydroxy fatty acids with one or more at least divalent linker groups is carried out with a lipase of *Candida antarctica*, and the one or more at least divalent linker groups are selected from alkanediols, alkanetriols, alkantetraols, and combinations thereof.

15. The method according claim 14, wherein the one or more at least divalent linker groups are selected from alkanediols, alkanetriols, and combinations thereof.

16. The method according claim 14, wherein the one or more at least divalent linker groups are selected from ethanediol, propanediols, butanediols, pentanediols, hexanediols, heptanediols, octanediols, butanetriols, pentanetriols, hexanetriols, heptanetriols, octanetriols, butanetetrols, pentanetetrols, hexanetetrols, heptanetetrols, octanetetrols, and combinations thereof.

17. The method according claim 14, wherein the one or more at least divalent linker groups are selected from ethanediol, propanediols, butanediols, pentanediols, hexanediols, heptanediols, octanediols, butanetriols, pentanetriols, hexanetriols, heptanetriols, octanetriols, and combinations thereof.

18. A hydroxy fatty acid condensate or a mixture of hydroxy fatty acid condensates, obtained by the method according to claim 1.

19. A polyurethane obtained by reacting a composition comprising the hydroxy fatty acid condensate or the mixture of hydroxy fatty acid condensates according to claim 18 with a diisocyanate, triisocyanate, tetraisocyanate, pentaisocyanate, or hexaisocyanate, or combinations thereof.

* * * * *

SEQUENCE LISTING

```
<160> NUMBER OF SEQ ID NOS: 3

<210> SEQ ID NO 1
<211> LENGTH: 2022
<212> TYPE: DNA
<213> ORGANISM: Artificial Sequence
<220> FEATURE:
<223> OTHER INFORMATION: Synthetic Sn-Ohy with N-terminal His6 Tag

<400> SEQUENCE: 1
atgggcagca gccatcatca tcatcatcac agcagcggcc tggtgccgcg cggcagccat      60
atggaagaag tgagttatcc caaagctgga ccgagcattg aagcgaacgt aggggatggg     120
```

```
cactggcgaa aggggccctc ggatacgctg ccgcctccgg acactgttgg accctatatg      180
cgcaaccgcc ccctgcctgt ggatcaagtg gaaggcagga aagcatggat catcggaagt      240
ggaatcgcgg gtctggcctc tgccttttac ttgatccgcg acgggcggat gaaggggcag      300
gacataacca tcctcgatgc cgtgggcact ccaggcggat cactggacgg ctcagggaac      360
gccgaagatg gctacctgat ccgaggcggg cgcgagatga actggaacta cgatcacttt      420
tgggatctct tccaggacat tcccgcgctg gagtacccgt cccttactc ggtcttggat       480 gagtatcggg cggtgaacga caatgatcct aattggtcca gtcccgatt gatgcacaag       540 caaggccaaa ttcgggattt cagcaccttg gggctttctt ccgcccacca atgggaattg      600
atcaagcttc tcctgaagcg caaggaggac ctcgatgaca tcaccatcga acagtacttc      660
agcgatagct ttctggagac caacttctgg tacctctggc gctcgatgtt tgcgttccag      720
aactggcaaa gtctgctgga agtgaagttg tacatgcatc gcttttggga tgcaatcgac      780
ggcttgacgg atatgtcagc gctcgtgttc caaaataca accagtacga cagcttcgtc      840 gtcccctgg tcaactacct caaggcaa ggcgtcaacg tagaattcgg cacgcgcgtc       900
tacgacctgg acatgacgga caacaacggc gagcgtaccg tgacctccat tcttgcgaag      960
gtagacgggc gggatcagaa gattgacatc ggcgcgaagg acgtggtttt tgccctgact     1020
ggatcgatga cggagggtac agcctacggc gatctggata ctgctcccga cctcactcga     1080
gccaccacgc ccctggcga ctcaagcgat gggcgttgt ggcagaacct ggccaagaag      1140
tcccacgtct ttggtaagcc tgaaaagttc tgcgggcaac ccagtcgctc gatgtgggag     1200
tctgccaccc tgacgtgcaa gccttcgccg ttgaccgagc gcctcaaaga tctctcaatc     1260
aatgacccct tattcgggaaa aacggtgacc ggtggaatca tcacctttac cgactcgaac     1320
tgggttctca gcttcacctg caatcgtcaa ccgcatttcc ccacacaacc agacgacgta     1380
ctggtgcttt gggtctatgc cttggtcatg gacagcaaag gcaaccatgt actaaaacca     1440
atgcctgagt gtacgggccg cgaaattctt gctgagcttt gctaccacct cggcattgtg     1500
gatcaggtgg atgaagtggc cagacagacc aaggttcgcc ttgccctgat gccattcatc     1560
acggctcaat ttatgccacg agctgctgga gatcgaccgc gtgttgttcc agccgggtgc     1620
accaatctcg ctctgctggg ccaattcgtg gagacgtcta atgacatcat cttcaccatg     1680
gagagttccg tcaggactgc gcggattggc gtgtacacgc ttctggggct acgaaagcag     1740
gtcgccgata tcagccccac gcaatacgac gtccgaaatc tgatcaaggg tgctcgtgcc     1800
ctgaacaaca acgagccgtt catgggcgag cggctgctcc atcgactgct cgacaacacc     1860
tacttcgccc acatcctccc gccgctgcca gcaggagacg gtggatccag cgatcaagcg     1920
gcaagctcgc gtatgaaggc caaccacact cggcggcgg cacttggagc ggtgtctgat      1980
tggatccatc atgttcggga taaactgaag ccgggcgcct ga                         2022
```

<210> SEQ ID NO 2
<211> LENGTH: 673
<212> TYPE: PRT
<213> ORGANISM: Artificial Sequence
<220> FEATURE:
<223> OTHER INFORMATION: Synthetic Sn-Ohy with N-terminal His6 Tag

<400> SEQUENCE: 2

Met Gly Ser Ser His His His His His His Ser Ser Gly Leu Val Pro
1               5                   10                  15

Arg Gly Ser His Met Glu Glu Val Ser Tyr Pro Lys Ala Gly Pro Ser
            20                  25                  30

```
Ile Glu Ala Asn Val Gly Asp Gly His Trp Arg Lys Gly Pro Ser Asp
         35                  40                  45

Thr Leu Pro Pro Pro Asp Thr Val Gly Pro Tyr Met Arg Asn Arg Pro
         50                  55                  60

Leu Pro Val Asp Gln Val Glu Gly Arg Lys Ala Trp Ile Ile Gly Ser
 65                  70                  75                  80

Gly Ile Ala Gly Leu Ala Ser Ala Phe Tyr Leu Ile Arg Asp Gly Arg
                 85                  90                  95

Met Lys Gly Gln Asp Ile Thr Ile Leu Asp Ala Val Gly Thr Pro Gly
                100                 105                 110

Gly Ser Leu Asp Gly Ser Gly Asn Ala Glu Asp Gly Tyr Leu Ile Arg
                115                 120                 125

Gly Gly Arg Glu Met Asn Trp Asn Tyr Asp His Phe Trp Asp Leu Phe
        130                 135                 140

Gln Asp Ile Pro Ala Leu Glu Tyr Pro Ser Pro Tyr Ser Val Leu Asp
145                 150                 155                 160

Glu Tyr Arg Ala Val Asn Asp Asn Asp Pro Asn Trp Ser Lys Ser Arg
                165                 170                 175

Leu Met His Lys Gln Gly Gln Ile Arg Asp Phe Ser Thr Leu Gly Leu
        180                 185                 190

Ser Ser Ala His Gln Trp Glu Leu Ile Lys Leu Leu Leu Lys Arg Lys
        195                 200                 205

Glu Asp Leu Asp Asp Ile Thr Ile Glu Gln Tyr Phe Ser Asp Ser Phe
210                 215                 220

Leu Glu Thr Asn Phe Trp Tyr Leu Trp Arg Ser Met Phe Ala Phe Gln
225                 230                 235                 240

Asn Trp Gln Ser Leu Leu Glu Val Lys Leu Tyr Met His Arg Phe Leu
                245                 250                 255

Asp Ala Ile Asp Gly Leu Thr Asp Met Ser Ala Leu Val Phe Pro Lys
                260                 265                 270

Tyr Asn Gln Tyr Asp Ser Phe Val Val Pro Leu Val Asn Tyr Leu Lys
        275                 280                 285

Gly Gln Gly Val Asn Val Glu Phe Gly Thr Arg Val Tyr Asp Leu Asp
        290                 295                 300

Met Thr Asp Asn Asn Gly Glu Arg Thr Val Thr Ser Ile Leu Ala Lys
305                 310                 315                 320

Val Asp Gly Arg Asp Gln Lys Ile Asp Ile Gly Ala Lys Asp Val Val
                325                 330                 335

Phe Ala Leu Thr Gly Ser Met Thr Glu Gly Thr Ala Tyr Gly Asp Leu
                340                 345                 350

Asp Thr Ala Pro Asp Leu Thr Arg Ala Thr Thr Pro Pro Gly Asp Ser
        355                 360                 365

Ser Asp Trp Ala Leu Trp Gln Asn Leu Ala Lys Lys Ser His Val Phe
370                 375                 380

Gly Lys Pro Glu Lys Phe Cys Gly Gln Pro Ser Arg Ser Met Trp Glu
385                 390                 395                 400

Ser Ala Thr Leu Thr Cys Lys Pro Ser Pro Leu Thr Glu Arg Leu Lys
                405                 410                 415

Asp Leu Ser Ile Asn Asp Pro Tyr Ser Gly Lys Thr Val Thr Gly Gly
                420                 425                 430

Ile Ile Thr Phe Thr Asp Ser Asn Trp Val Leu Ser Phe Thr Cys Asn
                435                 440                 445
```

```
Arg Gln Pro His Phe Pro Thr Gln Pro Asp Asp Val Leu Val Leu Trp
    450                 455                 460
Val Tyr Ala Leu Val Met Asp Ser Lys Gly Asn His Val Leu Lys Pro
465                 470                 475                 480
Met Pro Glu Cys Thr Gly Arg Glu Ile Leu Ala Glu Leu Cys Tyr His
                485                 490                 495
Leu Gly Ile Val Asp Gln Val Asp Glu Val Ala Arg Gln Thr Lys Val
                500                 505                 510
Arg Leu Ala Leu Met Pro Phe Ile Thr Ala Gln Phe Met Pro Arg Ala
            515                 520                 525
Ala Gly Asp Arg Pro Arg Val Val Pro Ala Gly Cys Thr Asn Leu Ala
        530                 535                 540
Leu Leu Gly Gln Phe Val Glu Thr Ser Asn Asp Ile Ile Phe Thr Met
545                 550                 555                 560
Glu Ser Ser Val Arg Thr Ala Arg Ile Gly Val Tyr Thr Leu Leu Gly
                565                 570                 575
Leu Arg Lys Gln Val Ala Asp Ile Ser Pro Thr Gln Tyr Asp Val Arg
            580                 585                 590
Asn Leu Ile Lys Gly Ala Arg Ala Leu Asn Asn Asn Glu Pro Phe Met
        595                 600                 605
Gly Glu Arg Leu Leu His Arg Leu Leu Asp Asn Thr Tyr Phe Ala His
    610                 615                 620
Ile Leu Pro Pro Leu Pro Ala Gly Asp Gly Ser Ser Asp Gln Ala
625                 630                 635                 640
Ala Ser Ser Arg Met Lys Ala Asn His Thr Ala Ala Ala Leu Gly
                645                 650                 655
Ala Val Ser Asp Trp Ile His His Val Arg Asp Lys Leu Lys Pro Gly
            660                 665                 670
Ala

<210> SEQ ID NO 3
<211> LENGTH: 60
<212> TYPE: DNA
<213> ORGANISM: Artificial Sequence
<220> FEATURE:
<223> OTHER INFORMATION: N-terminaler His6-Tag (pET28-Sn-Ohy(N)His6)

<400> SEQUENCE: 3
atgggcagca gccatcatca tcatcatcac agcagcggcc tggtgccgcg cggcagccat    60
```